United States Patent
Moore et al.

(10) Patent No.: US 8,255,810 B2
(45) Date of Patent: Aug. 28, 2012

(54) PORTABLE TOUCH SCREEN DEVICE, METHOD, AND GRAPHICAL USER INTERFACE FOR USING EMOJI CHARACTERS WHILE IN A LOCKED MODE

(75) Inventors: Bradford Allen Moore, Palo Alto, CA (US); Bas Ording, San Francisco, CA (US); Elizabeth Caroline Furches, San Francisco, CA (US); Stephen J. Chick, Mountain View, CA (US); Kenneth L. Kocienda, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 693 days.

(21) Appl. No.: 12/365,887

(22) Filed: Feb. 4, 2009

(65) Prior Publication Data
US 2010/0125785 A1 May 20, 2010

Related U.S. Application Data

(63) Continuation of application No. 12/274,346, filed on Nov. 19, 2008.

(51) Int. Cl.
*G06F 3/00* (2006.01)
*G06F 3/033* (2006.01)
*G06F 3/14* (2006.01)
*G06F 15/16* (2006.01)
*H04W 4/00* (2009.01)

(52) U.S. Cl. ........ 715/752; 715/863; 715/864; 455/466; 709/206

(58) Field of Classification Search .................. 715/702, 715/863, 752, 268, 263; 455/466; 707/922
See application file for complete search history.

(56) References Cited

U.S. PATENT DOCUMENTS 6,145,083 A * 11/2000 Shaffer et al. ..................... 726/7
6,256,008 B1 * 7/2001 Sparks et al. ................. 345/618
(Continued)

FOREIGN PATENT DOCUMENTS
WO   WO 2006/019639 A2   2/2006

OTHER PUBLICATIONS

Cerulean Studios, "Trillian Online User Manual," http://www.ceruleanstudios.com/support/manual.php?hchap=4&hsub=1&hsect=5, 2008.

(Continued)

*Primary Examiner* — Tadeese Hailu
*Assistant Examiner* — Nicholas Ulrich
(74) *Attorney, Agent, or Firm* — Morgan, Lewis & Bockius LLP

(57) ABSTRACT

In some embodiments, a computer-implemented method performed at a portable electronic device with a touch screen display includes simultaneously displaying a character input area operable to display text character input and emoji character input selected by a user, a keyboard display area, and a plurality of emoji category icons. In response to detecting a gesture on a respective emoji category icon, the method also includes simultaneously displaying: a first subset of emoji character keys for the respective emoji category in the keyboard display area and a plurality of subset-sequence-indicia icons for the respective emoji category. The method also includes detecting a gesture in the keyboard display area and, in response: replacing display of the first subset of emoji character keys with display of a second subset of emoji character keys for the respective emoji category, and updating the information provided by the subset-sequence-indicia icons.

14 Claims, 52 Drawing Sheets

U.S. PATENT DOCUMENTS

| | | | |
|---|---|---|---|
| 6,629,793 B1 | 10/2003 | Miller | 400/472 |
| 6,727,916 B1* | 4/2004 | Ballard | 715/758 |
| 6,987,991 B2 | 1/2006 | Nelson | 455/566 |
| 6,990,452 B1 | 1/2006 | Ostermann et al. | |
| 7,167,731 B2 | 1/2007 | Nelson | 455/566 |
| 7,221,933 B2* | 5/2007 | Sauer et al. | 455/412.1 |
| 7,603,105 B2* | 10/2009 | Bocking et al. | 455/411 |
| 7,657,252 B2* | 2/2010 | Futami | 455/412.1 |
| 7,669,135 B2* | 2/2010 | Cunningham et al. | 715/758 |
| 7,720,893 B2 | 5/2010 | Boudreau et al. | |
| 2002/0188948 A1 | 12/2002 | Florence | |
| 2004/0041849 A1* | 3/2004 | Mock et al. | 345/867 |
| 2004/0093582 A1* | 5/2004 | Segura | 717/102 |
| 2005/0156873 A1* | 7/2005 | Walter et al. | 345/156 |
| 2005/0169527 A1 | 8/2005 | Longe et al. | |
| 2006/0026170 A1 | 2/2006 | Kreitler et al. | |
| 2006/0053386 A1 | 3/2006 | Kuhl et al. | |
| 2006/0105814 A1* | 5/2006 | Monden et al. | 455/566 |
| 2006/0117197 A1* | 6/2006 | Nurmi | 713/323 |
| 2006/0148526 A1* | 7/2006 | Kamiya et al. | 455/566 |
| 2007/0132789 A1 | 6/2007 | Ording et al. | |
| 2007/0157089 A1 | 7/2007 | van Os et al. | |
| 2007/0200713 A1 | 8/2007 | Weber et al. | |
| 2007/0204218 A1 | 8/2007 | Weber et al. | |
| 2007/0233695 A1 | 10/2007 | Boudreau et al. | |
| 2008/0132252 A1 | 6/2008 | Altman et al. | |
| 2008/0139176 A1* | 6/2008 | Kim | 455/412.1 |
| 2008/0171555 A1 | 7/2008 | Oh et al. | |
| 2008/0182598 A1 | 7/2008 | Bowman | |
| 2008/0184052 A1* | 7/2008 | Itoh et al. | 713/324 |
| 2008/0189108 A1* | 8/2008 | Atar | 704/235 |
| 2008/0268882 A1* | 10/2008 | Moloney | 455/466 |
| 2008/0310602 A1* | 12/2008 | Bhupati | 379/88.12 |
| 2009/0222765 A1 | 9/2009 | Ekstrand | |
| 2009/0254799 A1 | 10/2009 | Unger | |
| 2009/0288032 A1* | 11/2009 | Chang et al. | 715/776 |
| 2010/0179991 A1 | 7/2010 | Lorch et al. | |

OTHER PUBLICATIONS

Dearman et al., "Rendezvousing with Location-Aware Devices: Enhancing Social Coordination," Interacting with Computers, vol. 17, Issue 5, Sep. 2005, pp. 542-566, http://www.dgp.toronto.edu/~dearman/publications/dearman_IWC05.pdf.

emesene forum, "Autocomplete plugin," Jun. 20, 2008, http://emeseme.org/smf/index.php?topic=1276.0.

Foxit, "Foxit Reader ver. 1.3 Feature Description," http://www.foxitsoftware.com/pdf/reader_2/verhistory.htm, 2008.

ImageShack—Hosting, http://img129.imageshack.us/my.php?image=autocompleteemoticonprexw0.jpg, Nov. 10, 2008.

NTT docomo, "i-mode Compatible Pictograms," http://www.nttdocomo.co.jp/english/service/imode/make/content/pictograph/index.html, 2008.

PocketGear.com, "Software Keyboards: Effy-Japanese (Eng/Jp) 4.0," updated Sep. 23, 2008, http://classic.pocketgear.com/software_detail.asp?id=9115.

potter, "Graffiti Smilies," PalmInfocenter Forums, 6 pages, http://www.palminfocenter.com/forum/viewtopic.php?t=11307, Nov. 4, 2008.

Sharewareconnection, "Handy Animated Emoticons," http://www.sharewareconnection.com/handy-animated-emoticons.htm, Nov. 10, 2008.

Smiley Conversion Table, 8 pages, http://surf-style.us/manual3.htm, Dec. 5, 2008.

Office Action dated Aug. 26, 2011, received in U.S. Appl. No. 12/274,346 (Moore).

Office Action dated Nov. 10, 2011, received in U.S. Appl. No. 12/365,888 (Moore).

* cited by examiner

PORTABLE TOUCH SCREEN DEVICE, METHOD, AND GRAPHICAL USER INTERFACE FOR USING EMOJI CHARACTERS WHILE IN A LOCKED MODE

RELATED APPLICATIONS

This application is a continuation of U.S. patent application Ser. No. 12/274,346, filed Nov. 19, 2008, entitled "Portable Touch Screen Device, Method, and Graphical User Interface for Using Emoji Character," which application is incorporated by reference herein in its entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U. S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No: 10/903,964, "Gestures For Touch Sensitive Input Devices," filed Jul. 30,2004; (7) U.S. patent application No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; (10) U.S. patent application Ser. No. 11/850,635, "Touch Screen Device, Method, and Graphical User Interface for Determining Commands by Applying Heuristics," filed Sep. 5, 2007; (11) U.S. patent application Ser. No. 11/322,549, "Unlocking a Device by Performing Gestures on an Unlock Image," filed Dec. 23, 2005; (12) U.S. patent application Ser. No. 11/459,602, "Portable Electronic Device with Interface Reconfiguration Mode," filed Jul. 24, 2006; (13) U.S. Patent application Ser. No. 12/365,888, "Portable Touch Screen Device, Method, and Graphical User Interface for Entering and Using Emoji Characters," filed Feb. 4, 2009, and (14) U.S. patent application Ser. No. 12/274,346, "Portable Touch Screen Device, Method, and Graphical User Interface for Using Emoji Characters," filed Nov. 19, 2008. All of these applications are incorporated by reference herein in their entirety.

TECHNICAL FIELD

The disclosed embodiments relate generally to portable electronic devices that provide emoji characters for electronic messages and documents, and more particularly, to portable electronic devices with touch screen displays that provide emoji characters for electronic messages and documents.

BACKGROUND

As portable electronic devices become more compact, and the number of functions performed by a given device increase, it has become a significant challenge to design a user interface that allows users to easily interact with a multifunction device. This challenge is particularly significant for handheld portable devices with touch-sensitive displays, which have much smaller screens than desktop or laptop computers. This situation is unfortunate because the user interface is the gateway through which users receive not only content, but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Recently, portable electronic devices have been developed that support the use of emoji characters. Emoji characters are often used in web forums, email messages, instant messages (e.g., SMS text messages), notes, and on-line games. A large and growing number of emoji characters exist. But it is quite cumbersome to display, organize, and use a large number of emoji characters in existing portable electronic devices with small display screens.

Accordingly, there is a need for portable electronic devices with touch screen displays that have more transparent and efficient user interfaces for using emoji characters. Such interfaces allow tasks involving emoji characters to be performed faster and more efficiently by users, thereby conserving power and increasing the time between battery charges in portable electronic devices. In addition, such interfaces increase the effectiveness of and user satisfaction with portable electronic devices.

SUMMARY

The above deficiencies and other problems associated with user interfaces for providing and using emoji on portable devices are reduced by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors (e.g., a computer readable storage medium with instructions stored therein).

In accordance with some embodiments, a computer-implemented method is performed at a portable electronic device with a touch screen display. The computer-implemented method includes simultaneously displaying a character input area operable to display text character input and emoji character input selected by a user, a keyboard display area, and a plurality of emoji category icons. As used in the specification and claims, text characters refer to alphanumeric characters, sinographs, Japanese kanji or kana symbols, and/or other written human language characters. As used in the specification and claims, emoji characters refer to still and animated picture characters that are not text characters in written human languages. The emoji category icons correspond to a plurality of emoji categories. The computer-implemented method also includes detecting a gesture on a respective emoji category icon in the plurality of emoji category icons; and, in response to detecting the gesture on the respective emoji category icon, simultaneously displaying: a first subset of emoji character keys for the respective emoji category in the keyboard display area, wherein the respective emoji category contains a number of subsets of emoji character keys that are configured to be separately displayed as a sequence of subsets of emoji character keys in the keyboard display area, and a plurality of subset-sequence-indicia icons for the respective emoji category, wherein the subset-sequence-indicia icons provide information about the number of subsets in the respective emoji category and a position of a displayed subset in the sequence of subsets of emoji character keys in the keyboard display area. While displaying the first subset of emoji character keys for the respective emoji category in the keyboard display area, the computer implemented method also includes detecting a gesture in the keyboard display area; and, in response to detecting the gesture in the keyboard display area: replacing display of the first subset of emoji character keys for the respective emoji category with display of a second subset of emoji character keys for the respective emoji category in the keyboard display area, and updating the information provided by the subset-sequence-indicia icons to reflect the replacement of the displayed first subset of emoji character keys by the second subset of emoji character keys.

In accordance with some embodiments, a portable electronic device, includes: a touch screen display; one or more processors; memory; and one or more programs. The one or more programs are stored in the memory and configured to be executed by the one or more processors. The one or more programs include instructions for: simultaneously displaying: a character input area operable to display text character input and emoji character input selected by a user, a keyboard display area, and a plurality of emoji category icons, wherein the emoji category icons correspond to a plurality of emoji categories. The one or more programs also include instructions for: detecting a gesture on a respective emoji category icon in the plurality of emoji category icons; in response to detecting the gesture on the respective emoji category icon, simultaneously displaying: a first subset of emoji character keys for the respective emoji category in the keyboard display area, wherein the respective emoji category contains a number of subsets of emoji character keys that are configured to be separately displayed as a sequence of subsets of emoji character keys in the keyboard display area, and a plurality of subset-sequence-indicia icons for the respective emoji category, wherein the subset-sequence-indicia icons provide information about the number of subsets in the respective emoji category and a position of a displayed subset in the sequence of subsets of emoji character keys in the keyboard display area. The programs also include instructions for, while displaying the first subset of emoji character keys for the respective emoji category in the keyboard display area, detecting a gesture in the keyboard display area; and, in response to detecting the gesture in the keyboard display area: replacing display of the first subset of emoji character keys for the respective emoji category with display of a second subset of emoji character keys for the respective emoji category in the keyboard display area, and updating the information provided by the subset-sequence-indicia icons to reflect the replacement of the displayed first subset of emoji character keys by the second subset of emoji character keys.

In accordance with some embodiments, a computer readable storage medium has stored therein instructions, which when executed by a portable electronic device with a touch screen display, cause the portable electronic device to: simultaneously display: a character input area operable to display text character input and emoji character input selected by a user, a keyboard display area, and a plurality of emoji category icons, wherein the emoji category icons correspond to a plurality of emoji categories; detect a gesture on a respective emoji category icon in the plurality of emoji category icons; and, in response to detecting the gesture on the respective emoji category icon, simultaneously display: a first subset of emoji character keys for the respective emoji category in the keyboard display area, wherein the respective emoji category contains a number of subsets of emoji character keys that are configured to be separately displayed as a sequence of subsets of emoji character keys in the keyboard display area, and a plurality of subset-sequence-indicia icons for the respective emoji category, wherein the subset-sequence-indicia icons provide information about the number of subsets in the respective emoji category and a position of a displayed subset in the sequence of subsets of emoji character keys in the keyboard display area; while displaying the first subset of emoji character keys for the respective emoji category in the keyboard display area, detect a gesture in the keyboard display area; and, in response to detecting the gesture in the keyboard display area: replace display of the first subset of emoji character keys for the respective emoji category with display of a second subset of emoji character keys for the respective emoji category in the keyboard display area, and update the information provided by the subset-sequence-indicia icons to reflect the replacement of the displayed first subset of emoji character keys by the second subset of emoji character keys.

In accordance with some embodiments, a graphical user interface on a portable electronic device with a touch screen display includes a character input area operable to display text character input and emoji character input selected by a user; a keyboard display area; and a plurality of emoji category icons. The emoji category icons correspond to a plurality of emoji categories. A respective emoji category contains a number of subsets of emoji character keys that are configured to be separately displayed as a sequence of subsets of emoji character keys in the keyboard display area. The graphical user interface also includes: a first subset of emoji character keys for the respective emoji category; a second subset of emoji character keys for the respective emoji category; and a plurality of subset-sequence-indicia icons for the respective emoji category. The subset-sequence-indicia icons provide information about the number of subsets in the respective emoji category and a position of a displayed subset in the sequence of subsets of emoji character keys in the keyboard display area. The character input area, the keyboard display area, and the plurality of emoji category icons are simultaneously displayed. In response to detecting a gesture on a respective emoji category icon in the plurality of emoji category icons, the first subset of emoji character keys for the respective emoji category in the keyboard display area are simultaneously displayed with the plurality of subset-sequence-indicia icons for the respective emoji category. In response to detecting a gesture in the keyboard display area while displaying the first subset of emoji character keys for the respective emoji category in the keyboard display area, display of the first subset of emoji character keys for the respective emoji category is replaced with display of a second subset of emoji character keys for the respective emoji category in the keyboard display area and the information provided by the subset-sequence-indicia icons is updated to reflect the replacement of the displayed first subset of emoji character keys by the second subset of emoji character keys.

In accordance with some embodiments, a portable electronic device, comprises: a touch screen display; means for simultaneously displaying: a character input area operable to display text character input and emoji character input selected by a user, a keyboard display area, and a plurality of emoji category icons, wherein the emoji category icons correspond to a plurality of emoji categories. The device also includes means for detecting a gesture on a respective emoji category icon in the plurality of emoji category icons; means for, in response to detecting the gesture on the respective emoji category icon, simultaneously displaying: a first subset of emoji character keys for the respective emoji category in the keyboard display area, wherein the respective emoji category contains a number of subsets of emoji character keys that are configured to be separately displayed as a sequence of subsets of emoji character keys in the keyboard display area, and a plurality of subset-sequence-indicia icons for the respective emoji category. The subset-sequence-indicia icons provide information about the number of subsets in the respective emoji category and a position of a displayed subset in the sequence of subsets of emoji character keys in the keyboard display area. The device also includes means for, while displaying the first subset of emoji character keys for the respective emoji category in the keyboard display area, detecting a gesture in the keyboard display area; and means for, in response to detecting the gesture in the keyboard display area: replacing display of the first subset of emoji character keys for the respective emoji category with display of a second subset of emoji character keys for the respective emoji category in the keyboard display area, and updating the information provided by the subset-sequence-indicia icons to reflect the replacement of the displayed first subset of emoji character keys by the second subset of emoji character keys.

In accordance with some embodiments, a computer-implemented method is performed at a portable electronic device with a touch screen display while the portable electronic device is in a user-interface locked mode. The method includes: receiving an incoming message from a party to a user of the portable electronic device while the touch screen display is in a power-conserving state; and, in response to receiving the incoming message: powering up the touch screen display, and displaying at least part of the incoming message from the party to the user on the touch screen display. The method also includes: detecting one or more predefined finger gestures on the touch screen display that correspond to an emoji character; detecting a predefined user action to initiate sending a response to the incoming message; and, in response to detecting the predefined user action to initiate sending the response to the incoming message, sending the response to the incoming message. The response comprises the emoji character that corresponds to the one or more predefined finger gestures detected on the touch screen display.

In accordance with some embodiments, a portable electronic device includes: a touch screen display; one or more processors; memory; and one or more programs. The one or more programs are stored in the memory and configured to be executed by the one or more processors. The one or more programs include: instructions for, while the portable electronic device is in a user-interface locked mode: receiving an incoming message from a party to a user of the portable electronic device while the touch screen display is in a power-conserving state; in response to receiving the incoming message: powering up the touch screen display, and displaying at least part of the incoming message from the party to the user on the touch screen display; detecting one or more predefined finger gestures on the touch screen display that correspond to an emoji character; detecting a predefined user action to initiate sending a response to the incoming message; and, in response to detecting the predefined user action to initiate sending the response to the incoming message, sending the response to the incoming message. The response comprises the emoji character that corresponds to the one or more predefined finger gestures detected on the touch screen display.

In accordance with some embodiments, a computer readable storage medium has stored therein instructions, which when executed by a portable electronic device with a touch screen display, cause the device to, while the portable electronic device is in a user-interface locked mode: receive an incoming message from a party to a user of the portable electronic device while the touch screen display is in a power-conserving state. The instructions also cause the device, while the portable electronic device is in a user-interface locked mode, to: in response to receiving the incoming message: power up the touch screen display, and display at least part of the incoming message from the party to the user on the touch screen display; detect one or more predefined finger gestures on the touch screen display that correspond to an emoji character; detect a predefined user action to initiate sending a response to the incoming message; and, in response to detecting the predefined user action to initiate sending the response to the incoming message, send the response to the incoming message. The response comprises the emoji character that corresponds to the one or more predefined finger gestures detected on the touch screen display.

In accordance with some embodiments, a graphical user interface on a portable electronic device with a touch screen display includes at least part of an incoming message from a party to a user of the portable electronic device. While the portable electronic device is in a user-interface locked mode, in response to receiving the incoming message from the party to the user of the portable electronic device while the touch screen display is in a power-conserving state: the touch screen display is powered up, and at least part of the incoming message from the party to the user is displayed on the touch screen display. While the portable electronic device is in the user-interface locked mode, one or more predefined finger gestures on the touch screen display are detected that correspond to an emoji character. While the portable electronic device is in the user-interface locked mode, in response to detecting a predefined user action to initiate sending a response to the incoming message, the response to the incoming message is sent. The response comprises the emoji character that corresponds to the one or more predefined finger gestures detected on the touch screen display.

In accordance with some embodiments, a portable electronic device, includes: a touch screen display and, while the portable electronic device is in a user-interface locked mode: means for receiving an incoming message from a party to a user of the portable electronic device while the touch screen display is in a power-conserving state; in response to receiving the incoming message: means for powering up the touch screen display, and means for displaying at least part of the incoming message from the party to the user on the touch screen display; means for detecting one or more predefined finger gestures on the touch screen display that correspond to an emoji character; means for detecting a predefined user action to initiate sending a response to the incoming message; and, in response to detecting the predefined user action to initiate sending the response to the incoming message, means for sending the response to the incoming message. The response comprises the emoji character that corresponds to the one or more predefined finger gestures detected on the touch screen display.

In accordance with some embodiments, a computer-implemented method, includes: at a portable electronic device with a touch screen display, while the portable electronic device is in a user-interface locked mode: receiving an incoming message from a party to a user of the portable electronic device while the touch screen display is in a power-conserving state; in response to receiving the incoming message: powering up the touch screen display, displaying at least part of the incoming message from the party to the user on the touch screen display, and displaying a plurality of predefined responses to the incoming message, wherein the predefined responses include a plurality of emoji characters; detecting a predefined user action for selecting a predefined response in the plurality of predefined responses; detecting a predefined user action to initiate sending the selected predefined response to the incoming message; and, in response to detecting the predefined user action to initiate sending the selected predefined response to the incoming message, sending the selected predefined response to the incoming message. The selected predefined response comprises an emoji character in the plurality of emoji characters.

In accordance with some embodiments, a portable electronic device, includes: a touch screen display; one or more processors; memory; and one or more programs, wherein the one or more programs are stored in the memory and configured to be executed by the one or more processors. The one or more programs include instructions for, while the portable electronic device is in a user-interface locked mode: receiving an incoming message from a party to a user of the portable electronic device while the touch screen display is in a power-conserving state; in response to receiving the incoming message: powering up the touch screen display, displaying at least part of the incoming message from the party to the user on the touch screen display, and displaying a plurality of predefined responses to the incoming message, wherein the predefined responses include a plurality of emoji characters; detecting a predefined user action for selecting a predefined response in the plurality of predefined responses; detecting a predefined user action to initiate sending the selected predefined response to the incoming message; and, in response to detecting the predefined user action to initiate sending the selected predefined response to the incoming message, sending the selected predefined response to the incoming message. The selected predefined response comprises an emoji character in the plurality of emoji characters.

In accordance with some embodiments, a computer readable storage medium has stored therein instructions, which when executed by a portable electronic device with a touch screen display, cause the device to, while the portable electronic device is in a user-interface locked mode: receive an incoming message from a party to a user of the portable electronic device while the touch screen display is in a power-conserving state; in response to receiving the incoming message: power up the touch screen display, display at least part of the incoming message from the party to the user on the touch screen display, and display a plurality of predefined responses to the incoming message, wherein the predefined responses include a plurality of emoji characters; detect a predefined user action for selecting a predefined response in the plurality of predefined responses; detect a predefined user action to initiate sending the selected predefined response to the incoming message; and, in response to detecting the predefined user action to initiate sending the selected predefined response to the incoming message, send the selected predefined response to the incoming message. The selected predefined response comprises an emoji character in the plurality of emoji characters.

In accordance with some embodiments, a graphical user interface on a portable electronic device with a touch screen display includes at least part of an incoming message from a party to a user of the portable electronic device, and a plurality of predefined responses to the incoming message. The predefined responses include a plurality of emoji characters. While the portable electronic device is in a user-interface locked mode: in response to receiving the incoming message from the party to the user of the portable electronic device while the touch screen display is in a power-conserving state: the touch screen display is powered up, at least part of the incoming message from the party to the user is displayed on the touch screen display, and the plurality of predefined responses to the incoming message are displayed; a predefined user action for selecting a predefined response in the plurality of predefined responses is detected; and, in response to detecting a predefined user action to initiate sending the selected predefined response to the incoming message, the selected predefined response to the incoming message is sent. The selected predefined response comprises an emoji character in the plurality of emoji characters.

In accordance with some embodiments, a portable electronic device includes: a touch screen display; and, while the portable electronic device is in a user-interface locked mode: means for receiving an incoming message from a party to a user of the portable electronic device while the touch screen display is in a power-conserving state; in response to receiving the incoming message: means for powering up the touch screen display, means for displaying at least part of the incoming message from the party to the user on the touch screen display, and means for displaying a plurality of predefined responses to the incoming message, wherein the predefined responses includes a plurality of emoji characters; means for detecting a predefined user action for selecting a predefined response in the plurality of predefined responses; means for detecting a predefined user action to initiate sending a selected predefined response to the incoming message; and, in response to detecting the predefined user action to initiate sending the selected predefined response to the incoming message, means for sending the selected predefined response to the incoming message. The selected predefined response comprises an emoji character in the plurality of emoji characters.

In accordance with some embodiments, a computer-implemented method at a portable electronic device with a touch screen display includes, while the portable electronic device is in a user-interface locked mode: receiving an incoming message from a party to a user of the portable electronic device while the touch screen display is in a power-conserving state; in response to receiving the incoming message: powering up the touch screen display, and displaying at least part of the incoming message from the party to the user on the touch screen display; detecting a predefined user action to initiate display of a plurality of predefined responses to the incoming message, wherein the predefined responses include a plurality of emoji characters; in response to detecting the predefined user action to initiate display of the plurality of predefined responses to the incoming message, displaying the plurality of predefined responses; detecting a predefined user action for selecting a predefined response in the plurality of predefined responses; detecting a predefined user action to initiate sending the selected predefined response to the incoming message; and, in response to detecting the predefined user action to initiate sending the selected predefined response to the incoming message, sending the selected predefined response to the incoming message. The selected predefined response comprises an emoji character in the plurality of emoji characters.

In accordance with some embodiments, a portable electronic device, includes: a touch screen display; one or more processors; memory; and one or more programs, wherein the one or more programs are stored in the memory and configured to be executed by the one or more processors. The one or more programs include instructions for, while the portable electronic device is in a user-interface locked mode: receiving an incoming message from a party to a user of the portable electronic device while the touch screen display is in a power-conserving state; in response to receiving the incoming message: powering up the touch screen display, and displaying at least part of the incoming message from the party to the user on the touch screen display; detecting a predefined user action to initiate display of a plurality of predefined responses to the incoming message, wherein the predefined responses include a plurality of emoji characters; in response to detecting the predefined user action to initiate display of the plurality of predefined responses to the incoming message, displaying the plurality of predefined responses; detecting a predefined user action for selecting a predefined response in the plurality of predefined responses; detecting a predefined user action to initiate sending the selected predefined response to the incoming message; and, in response to detecting the predefined user action to initiate sending the selected predefined response to the incoming message, sending the selected predefined response to the incoming message. The selected predefined response comprises an emoji character in the plurality of emoji characters.

In accordance with some embodiments, a computer readable storage medium has stored therein instructions, which when executed by a portable electronic device with a touch screen display, cause the device to, while the portable electronic device is in a user-interface locked mode: receive an incoming message from a party to a user of the portable electronic device while the touch screen display is in a power-conserving state; in response to receiving the incoming message: power up the touch screen display, and display at least part of the incoming message from the party to the user on the touch screen display; detect a predefined user action to initiate display of a plurality of predefined responses to the incoming message, wherein the predefined responses include a plurality of emoji characters; in response to detecting the predefined user action to initiate display of the plurality of predefined responses to the incoming message, display the plurality of predefined responses; detect a predefined user action for selecting a predefined response in the plurality of predefined responses; detect a predefined user action to initiate sending the selected predefined response to the incoming message; and, in response to detecting the predefined user action to initiate sending the selected predefined response to the incoming message, send the selected predefined response to the incoming message. The selected predefined response comprises an emoji character in the plurality of emoji characters.

In accordance with some embodiments, a graphical user interface on a portable electronic device with a touch screen display includes at least part of an incoming message from a party to a user of the portable electronic device, and a plurality of predefined responses to the incoming message. The predefined responses include a plurality of emoji characters. While the portable electronic device is in a user-interface locked mode: in response to receiving the incoming message from the party to the user of the portable electronic device while the touch screen display is in a power-conserving state: the touch screen display is powered up, and at least part of the incoming message from the party to the user is displayed on the touch screen display; in response to detecting a predefined user action to initiate display of the plurality of predefined responses to the incoming message, the plurality of predefined responses are displayed; a predefined user action for selecting a predefined response in the plurality of predefined responses is detected; and, in response to detecting a predefined user action to initiate sending the selected predefined response to the incoming message, the selected predefined response to the incoming message is sent. The selected predefined response comprises an emoji character in the plurality of emoji characters.

In accordance with some embodiments, a portable electronic device, includes: a touch screen display, and while the portable electronic device is in a user-interface locked mode: means for receiving an incoming message from a party to a user of the portable electronic device while the touch screen display is in a power-conserving state; in response to receiving the incoming message: means for powering up the touch screen display, and means for displaying at least part of the incoming message from the party to the user on the touch screen display; means for detecting a predefined user action to initiate display of a plurality of predefined responses to the incoming message, wherein the predefined responses include a plurality of emoji characters; in response to detecting the predefined user action to initiate display of the plurality of predefined responses to the incoming message, means for displaying the plurality of predefined responses; means for detecting a predefined user action for selecting a predefined response in the plurality of predefined responses; means for detecting a predefined user action to initiate sending the selected predefined response to the incoming message; and, in response to detecting the predefined user action to initiate sending the selected predefined response to the incoming message, means for sending the selected predefined response to the incoming message. The selected predefined response comprises an emoji character in the plurality of emoji characters.

In accordance with some embodiments, a computer-implemented method at a portable electronic device with a touch screen display includes: detecting a user-defined gesture on the touch screen display while the portable electronic device is in a user-defined-gesture recording mode; creating a representation of the user-defined gesture; associating the representation of the user-defined gesture with an emoji character; and storing the representation of the user-defined gesture and the association of the representation of the user-defined gesture with the emoji character.

In accordance with some embodiments, a portable electronic device includes: a touch screen display; one or more processors; memory; and one or more programs, wherein the one or more programs are stored in the memory and configured to be executed by the one or more processors. The one or more programs include instructions for: detecting a user-defined gesture on the touch screen display while the portable electronic device is in a user-defined-gesture recording mode; creating a representation of the user-defined gesture; associating the representation of the user-defined gesture with an emoji character; and storing the representation of the user-defined gesture and the association of the representation of the user-defined gesture with the emoji character.

In accordance with some embodiments, a computer readable storage medium has stored therein instructions, which when executed by a portable electronic device with a touch screen display, cause a device to: detect a user-defined gesture on the touch screen display while the portable electronic device is in a user-defined-gesture recording mode; create a representation of the user-defined gesture; associate the representation of the user-defined gesture with an emoji character; and store the representation of the user-defined gesture and the association of the representation of the user-defined gesture with the emoji character.

In accordance with some embodiments, a portable electronic device includes: a touch screen display; means for detecting a user-defined gesture on the touch screen display while the portable electronic device is in a user-defined-gesture recording mode; means for creating a representation of the user-defined gesture; means for associating the representation of the user-defined gesture with an emoji character; and means for storing the representation of the user-defined gesture and the association of the representation of the user-defined gesture with the emoji character.

In accordance with some embodiments, a computer-implemented method at a portable electronic device with a touch screen display includes: receiving an electronic message. The electronic message includes: instructions for initiating a geographic mapping application, location data representing a location on a geographic map, and emoji data representing an emoji character. The emoji data is associated with the location data. The method also includes: displaying the electronic message on the touch screen display; detecting a predefined user action on the displayed electronic message to initiate the geographic mapping application; and, in response to detecting the predefined user action to initiate the geographic mapping application: displaying the geographic map in the geographic mapping application, and displaying the emoji character at the location on the geographic map that corresponds to the location data.

In accordance with some embodiments, a portable electronic device includes: a touch screen display; one or more processors; memory; and one or more programs, wherein the one or more programs are stored in the memory and configured to be executed by the one or more processors. The one or more programs include instructions for: receiving an electronic message, wherein the electronic message includes: instructions for initiating a geographic mapping application, location data representing a location on a geographic map, and emoji data representing an emoji character. The emoji data is associated with the location data. The one or more programs also include instructions for: displaying the electronic message on the touch screen display; detecting a predefined user action on the displayed electronic message to initiate the geographic mapping application; and, in response to detecting the predefined user action to initiate the geographic mapping application: displaying the geographic map in the geographic mapping application, and displaying the emoji character at the location on the geographic map that corresponds to the location data.

In accordance with some embodiments, a computer readable storage medium has stored therein instructions, which when executed by a portable electronic device with a touch screen display, cause a device to receive an electronic message. The electronic message includes: instructions for initiating a geographic mapping application, location data representing a location on a geographic map, and emoji data representing an emoji character. The emoji data is associated with the location data. The instructions also cause the device to: display the electronic message on the touch screen display; detect a predefined user action on the displayed electronic message to initiate the geographic mapping application; and, in response to detecting the predefined user action to initiate the geographic mapping application: display the geographic map in the geographic mapping application, and display the emoji character at the location on the geographic map that corresponds to the location data.

In accordance with some embodiments, a graphical user interface on a portable electronic device with a touch screen display includes: an electronic message, a geographic map, and an emoji character The electronic message is received by the portable electronic device. The electronic message includes: instructions for initiating a geographic mapping application, location data representing a location on the geographic map, and emoji data representing the emoji character. The emoji data is associated with the location data. The electronic message is displayed on the touch screen display. In response to detecting a predefined user action on the displayed electronic message to initiate the geographic mapping application: the geographic map is displayed in the geographic mapping application, and the emoji character is displayed at the location on the geographic map that corresponds to the location data.

In accordance with some embodiments, a portable electronic device includes: a touch screen display; means for receiving an electronic message, wherein the electronic message includes: instructions for initiating a geographic mapping application, location data representing a location on a geographic map, and emoji data representing an emoji character, wherein the emoji data is associated with the location data. The device also includes: means for displaying the electronic message on the touch screen display; means for detecting a predefined user action on the displayed electronic message to initiate the geographic mapping application; and, in response to detecting the predefined user action to initiate the geographic mapping application: means for displaying the geographic map in the geographic mapping application, and means for displaying the emoji character at the location on the geographic map that corresponds to the location data.

Thus, the invention provides simple, efficient, and easy-to-use interfaces for using emoji on portable electronic devices with a touch-sensitive display. Such interfaces conserve power by enabling a user to complete tasks faster, thereby increasing the time between battery charges. Such interfaces also increase user satisfaction with portable electronic devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
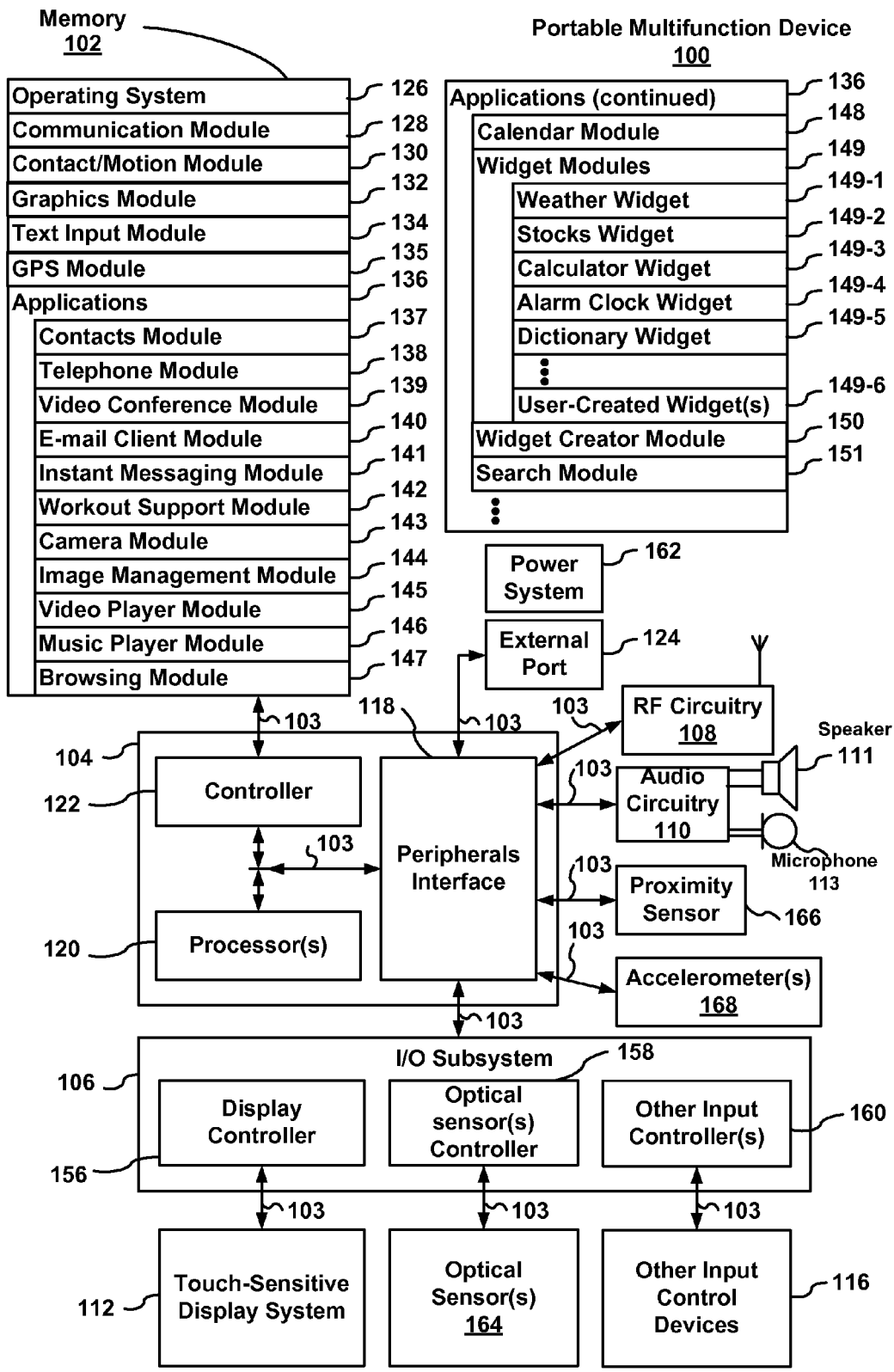
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA, and/or music player functions. Exemplary embodiments of portable multifunction devices include, without limitation, the iPhone® and iPod Touch® devices from Apple Computer, Inc. of Cupertino, Calif.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other portable devices.

The device may support a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include soft keyboard embodiments for inputting or operable to input text characters and emoji characters. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments. Soft keyboards for inputting or operable to input emoji characters are discussed in more detail below.

Figure 1B:
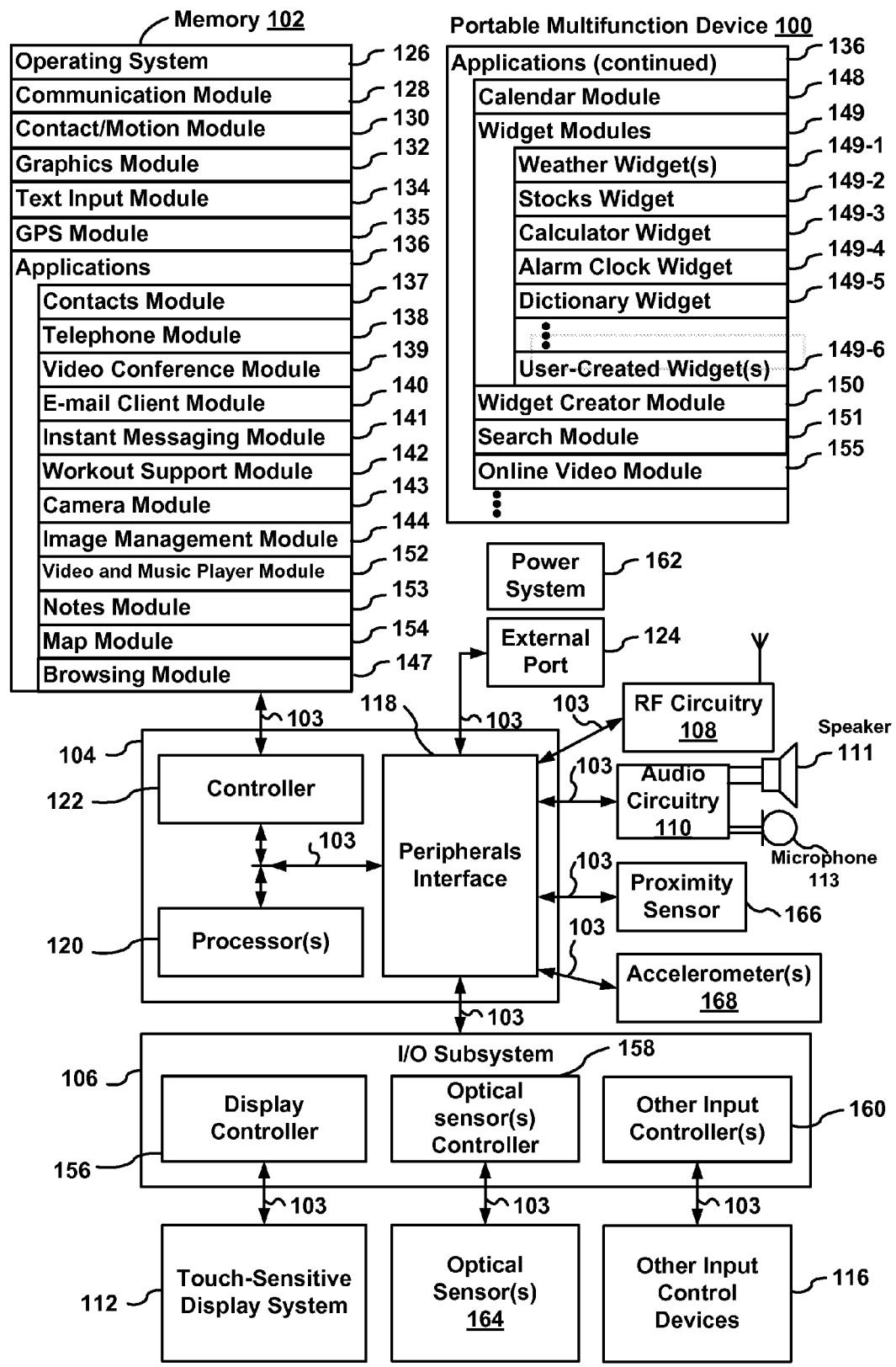

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch screen 112 (e.g., detecting one or more finger-dragging events), and determining if the contact has ceased (e.g., detecting a finger-up event or a break in contact). The contact/motion module 130 receives contact data from the touch screen 112. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The contact/motion module 130 may detect a gesture input by a user. Different gestures on the touch screen 112 have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of a button-style user interface object such as a text character key or an emoji character key in a soft keyboard). As another example, detecting a finger swipe gesture on the touch screen comprises detecting a finger-down event followed by detecting one or more finger-dragging events, and subsequently followed by detecting a finger-up event. In some embodiments, the contact/motion module 130 detects user-defined gestures.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input). The text input module 134 is also configured to provide emoji soft keyboards for entering emoji characters in various applications (e.g., e-mail 140, IM 141, and any other application that uses emoji character input). In some embodiments, the text input module 134 stores data representing soft keyboards for entering text and emoji soft keyboards.

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a workout support module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Further, text input module 134 works in conjunction with e-mail client module 140 to facilitate inserting emoji into e-mails.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Further, text input module 134 works in conjunction with instant messaging module 141 to facilitate inserting emoji into a respective instant message.

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Further, text input module 134 works in conjunction with calendar module 148 to facilitate inserting emoji into calendar entries, to do lists, etc.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like. Further, text input module 134 works in conjunction with notes module 153 to facilitate inserting emoji into notes, to do lists, etc.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Further, text input module 134 works in conjunction with map module 154 to facilitate inserting emoji into maps.

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application Ser. No. 60/936,562, "Portable Multifunction Device, Method, and Graphical User Interface for Playing Online Videos," filed Jun. 20, 2007, and U.S. patent application Ser. No. 11/968, 067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
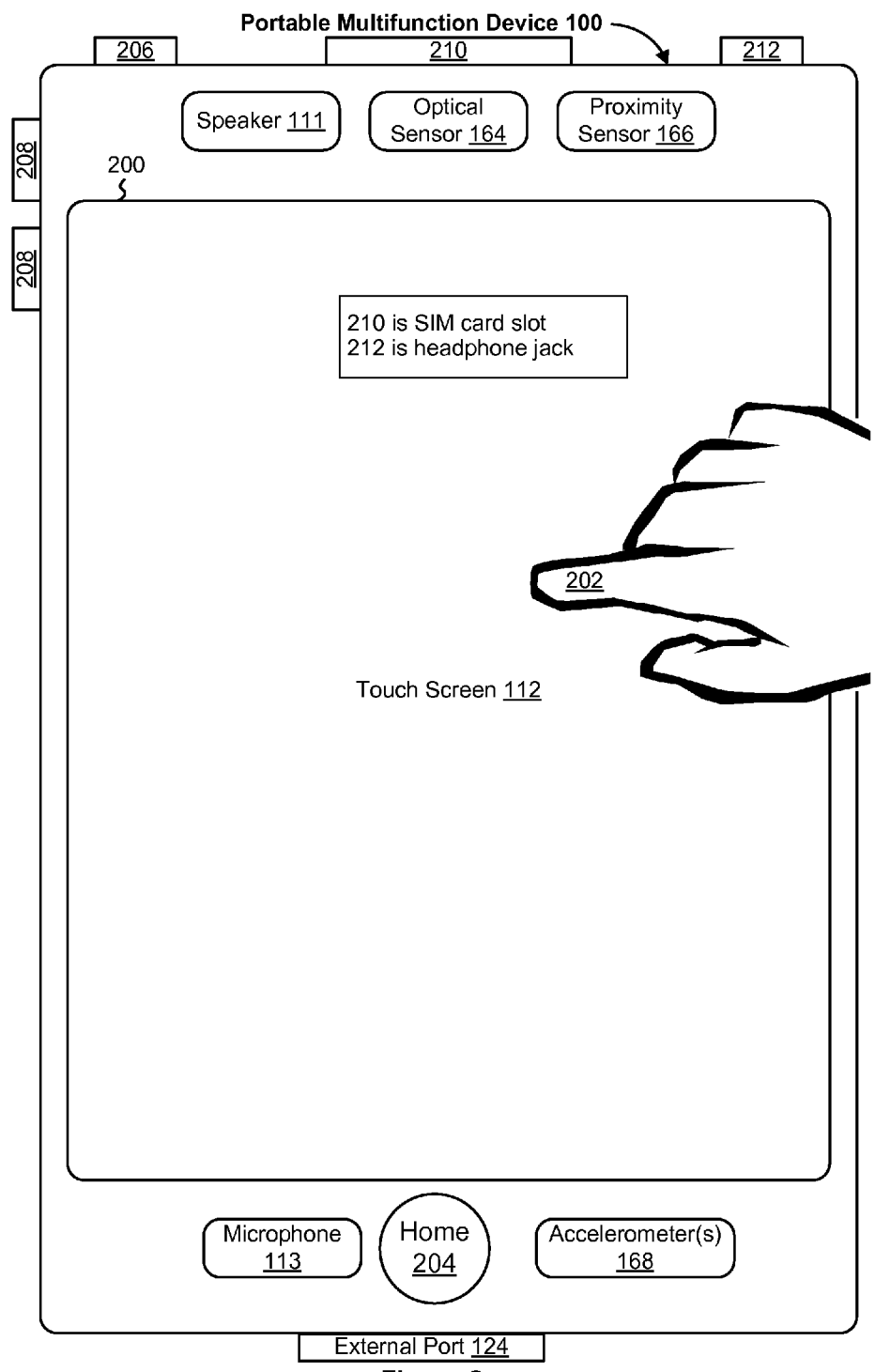
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
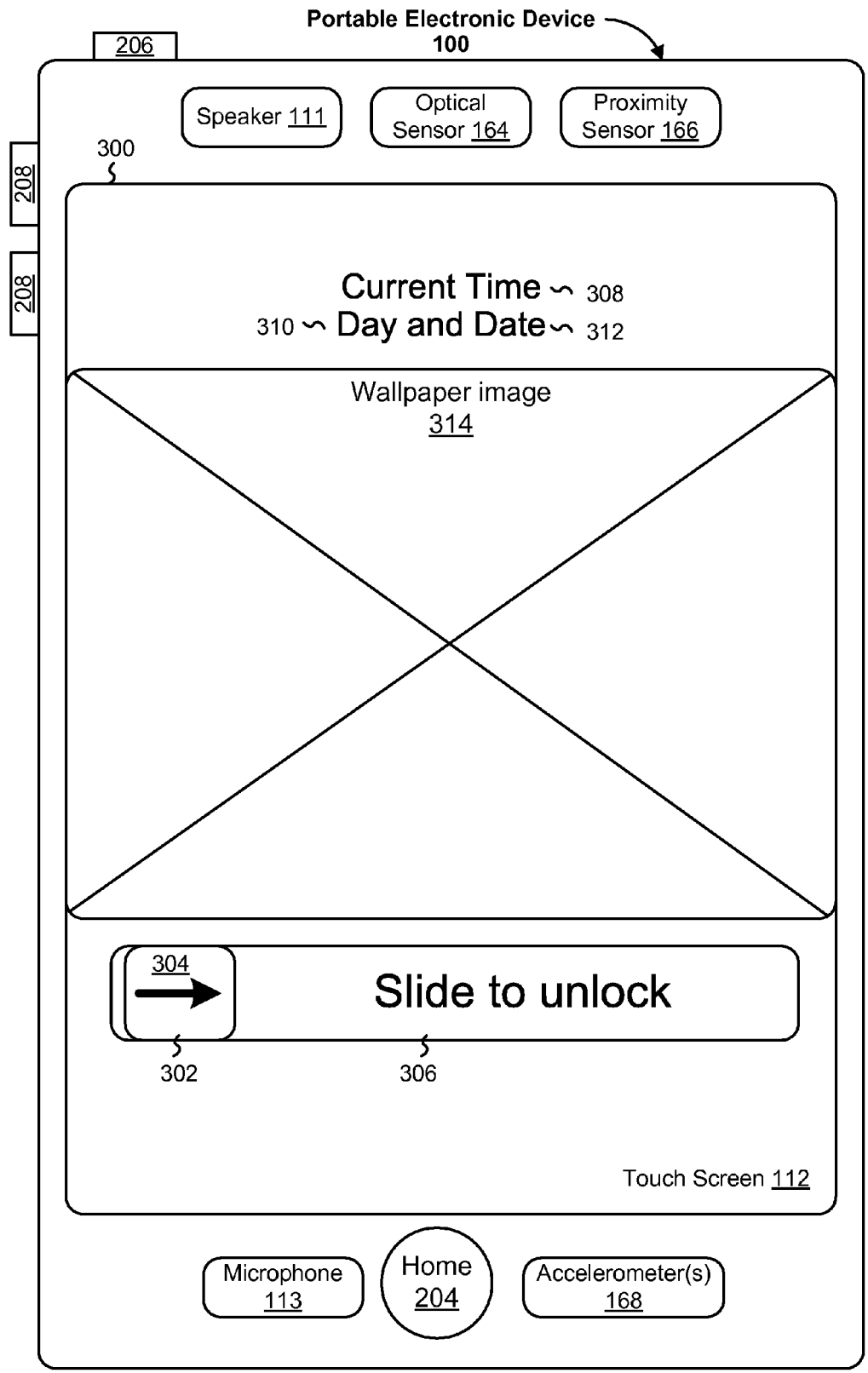
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
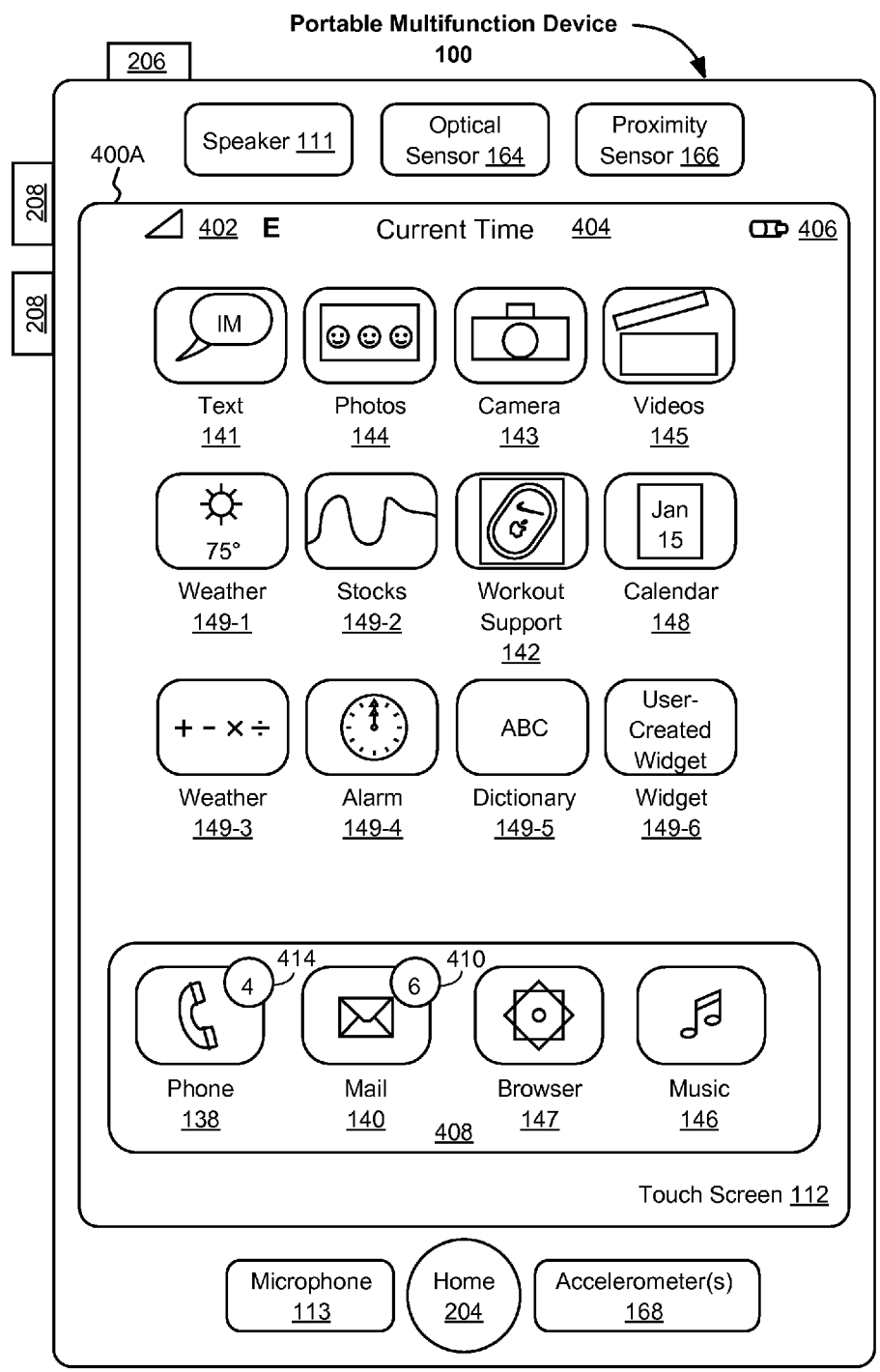
FIGS. 4A-4B illustrate exemplary user interfaces for a menu of applications on a portable multifunction device in accordance with some embodiments.
Figure 4B:
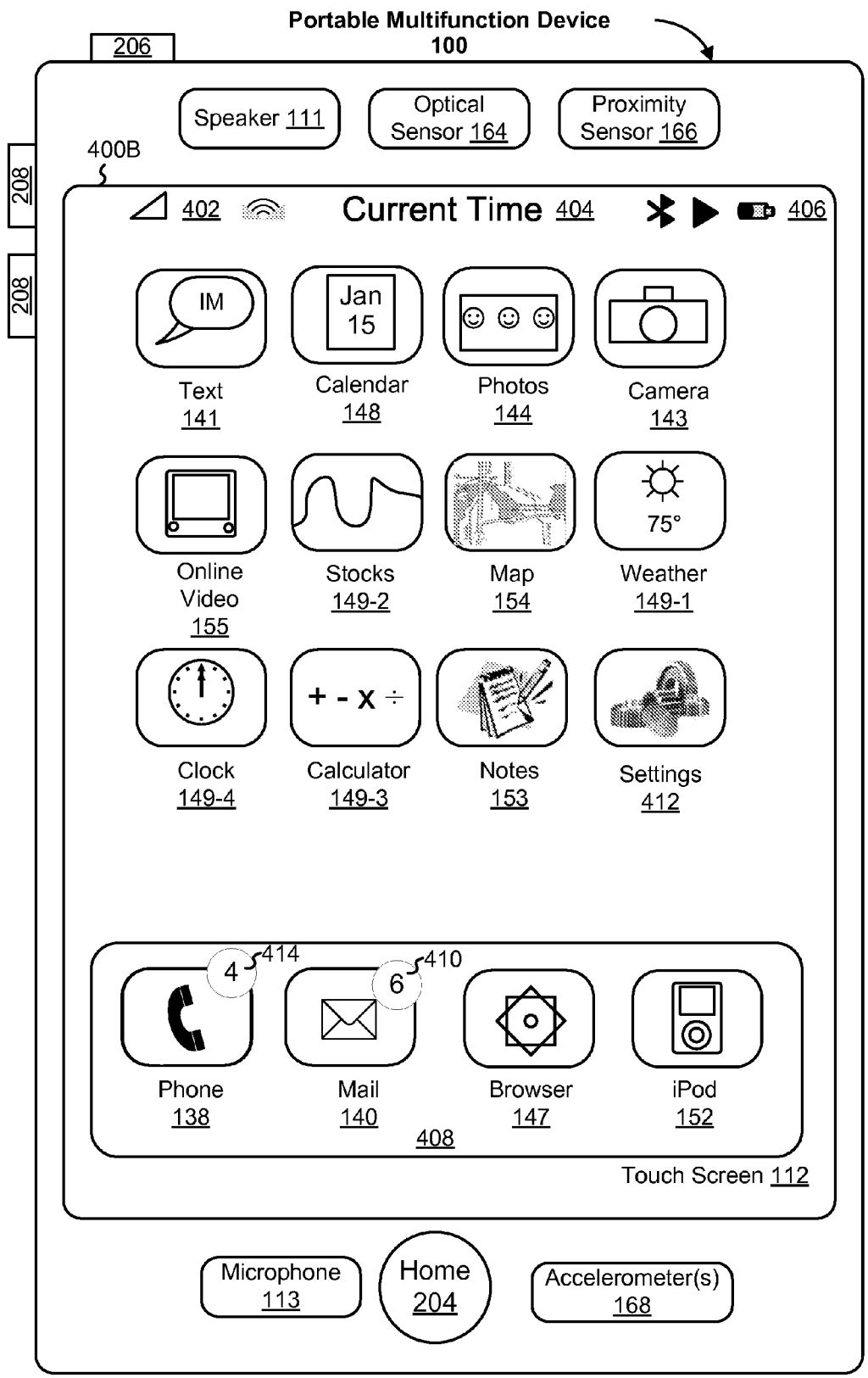

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:

402, 404, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

FIGS. 5A-5G illustrate exemplary user interfaces for providing and organizing emoji character keys on a portable electronic device 100 equipped with a touch-sensitive display 112 in accordance with some embodiments. An overview of these figures is provided here.

Figure 5A:
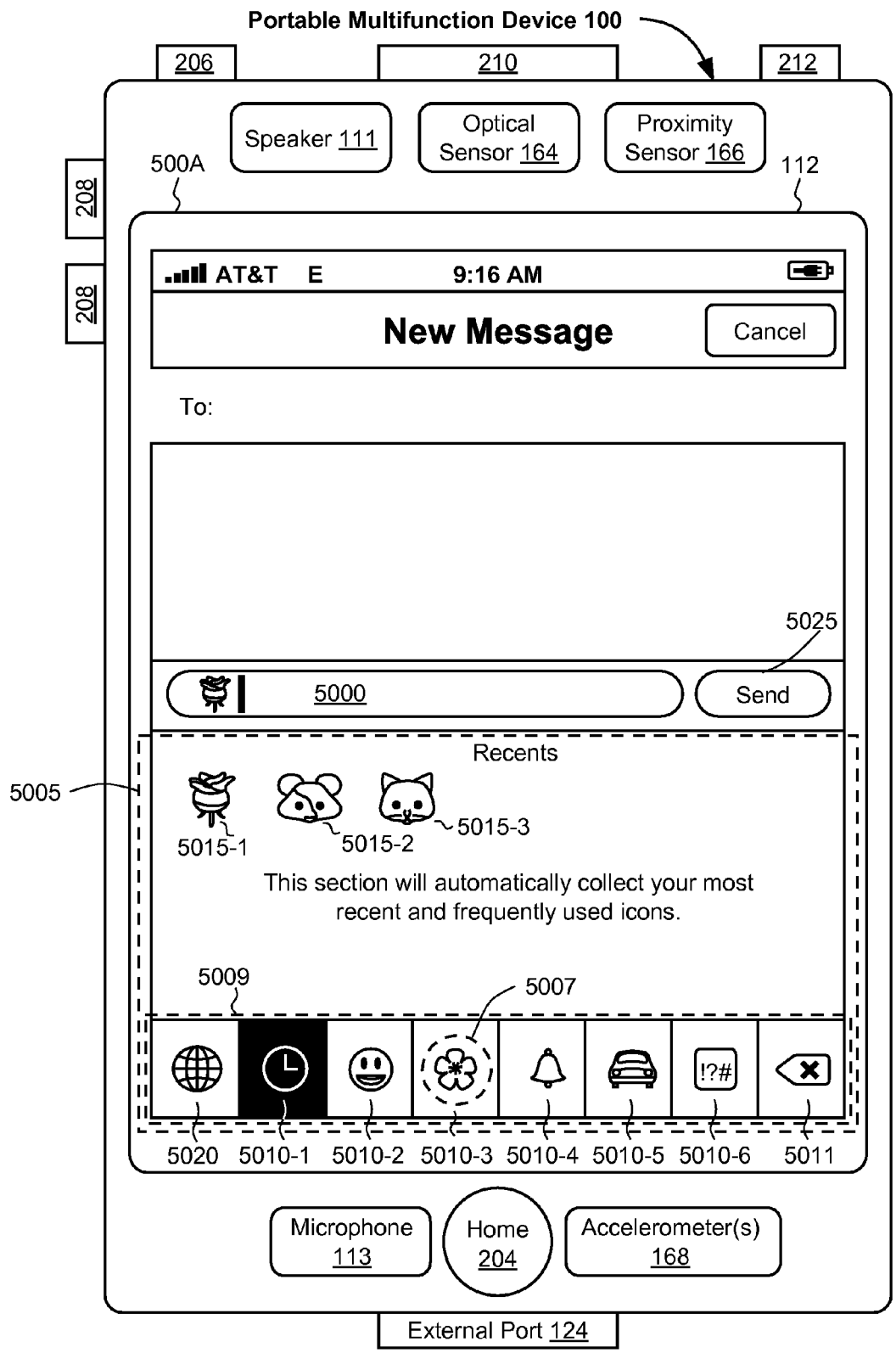
FIGS. 5A-5G illustrate exemplary user interfaces for providing and organizing emoji character keys on a portable electronic device equipped with a touch-sensitive display in accordance with some embodiments.
Figure 5B:
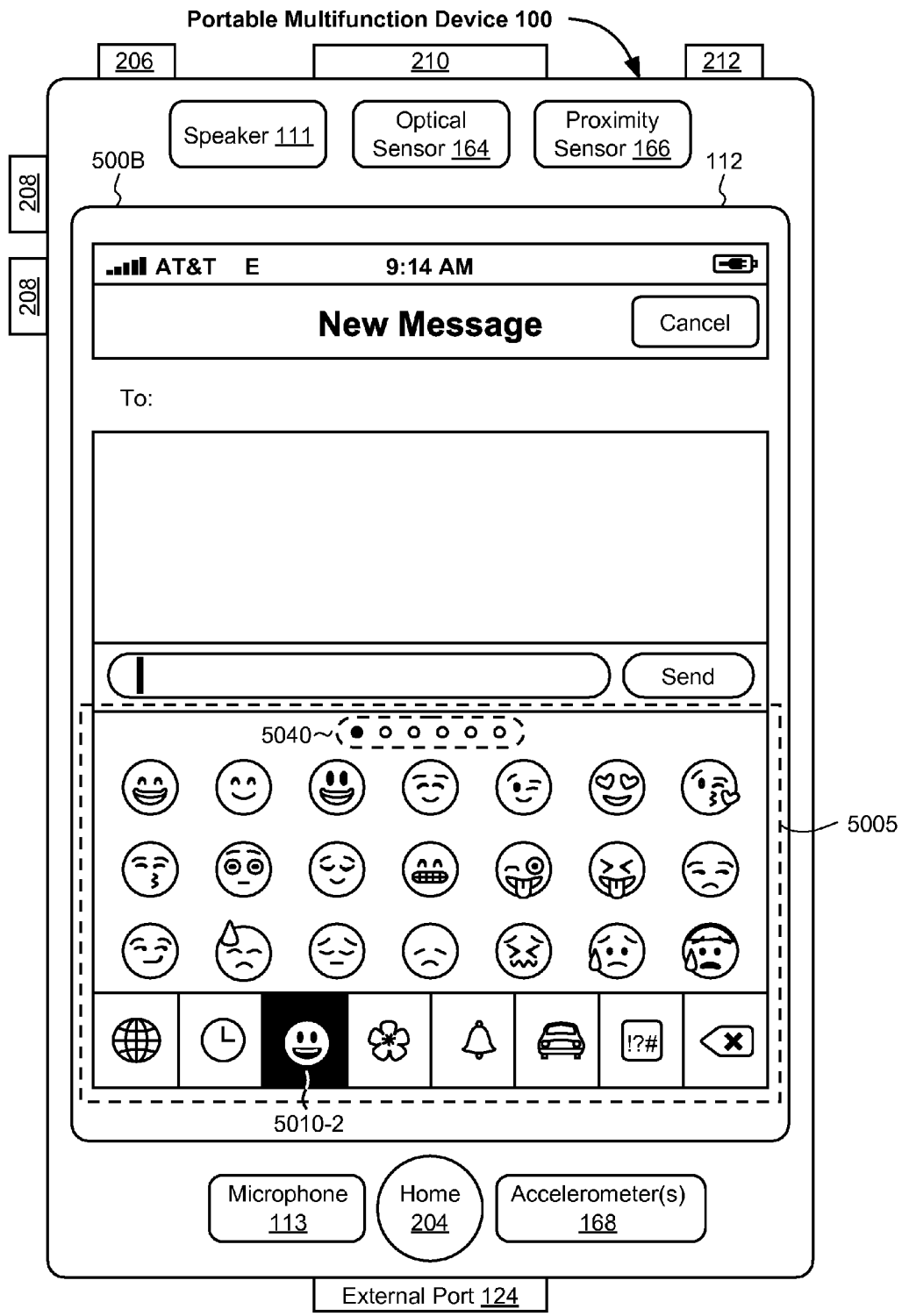
Figure 5C:
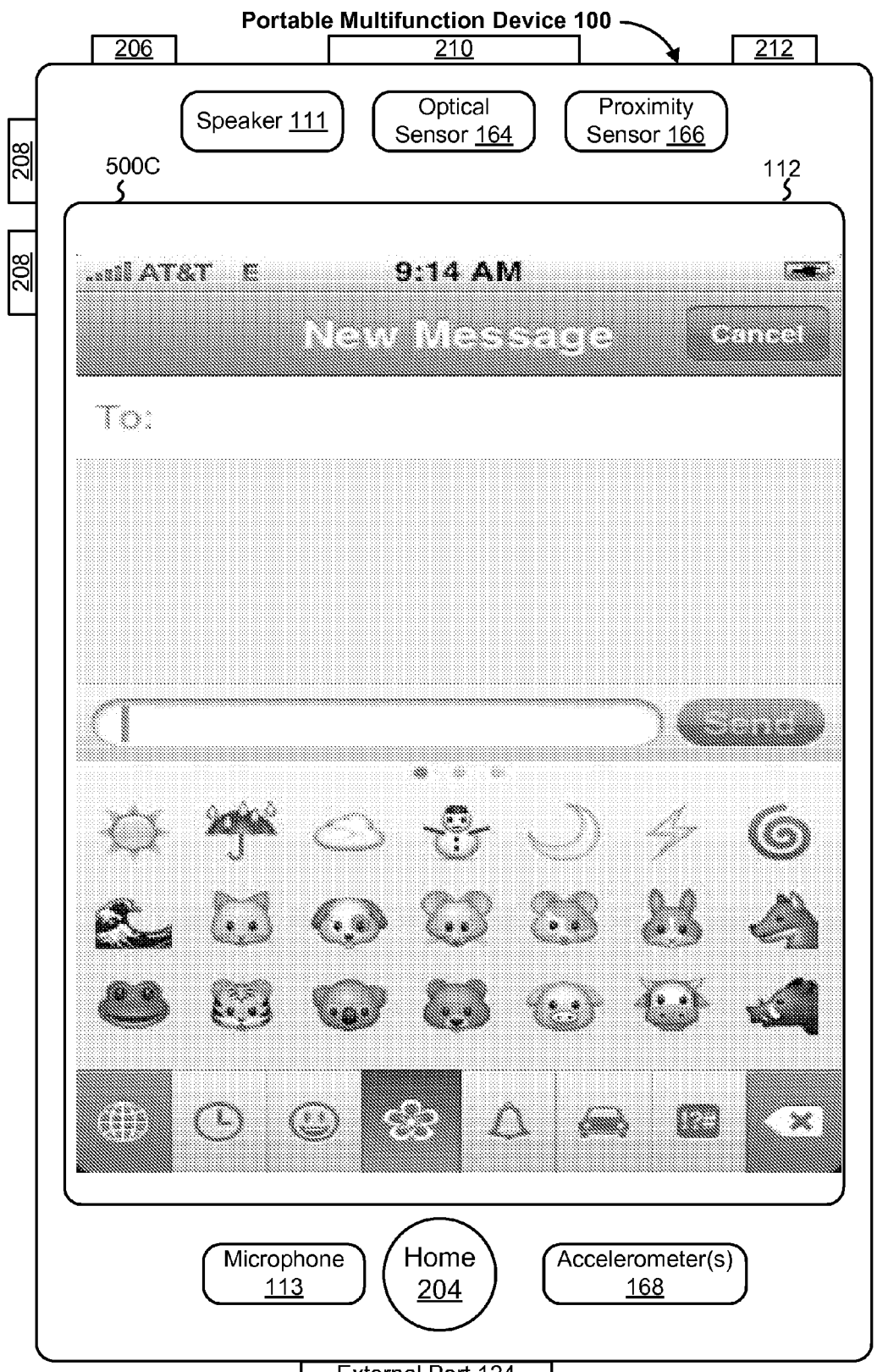
Figure 5D:
Figure 5E:
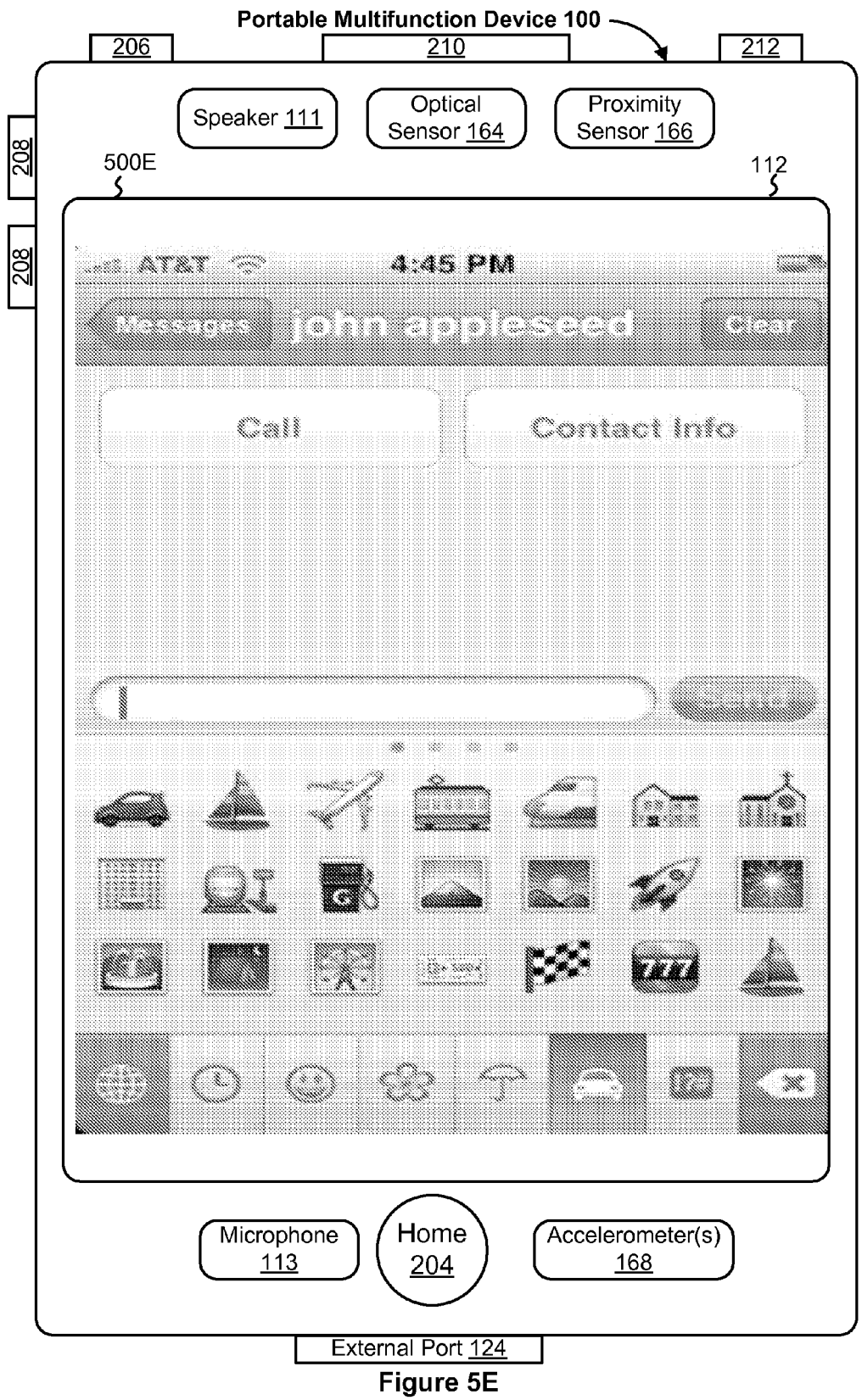
Figure 5F:
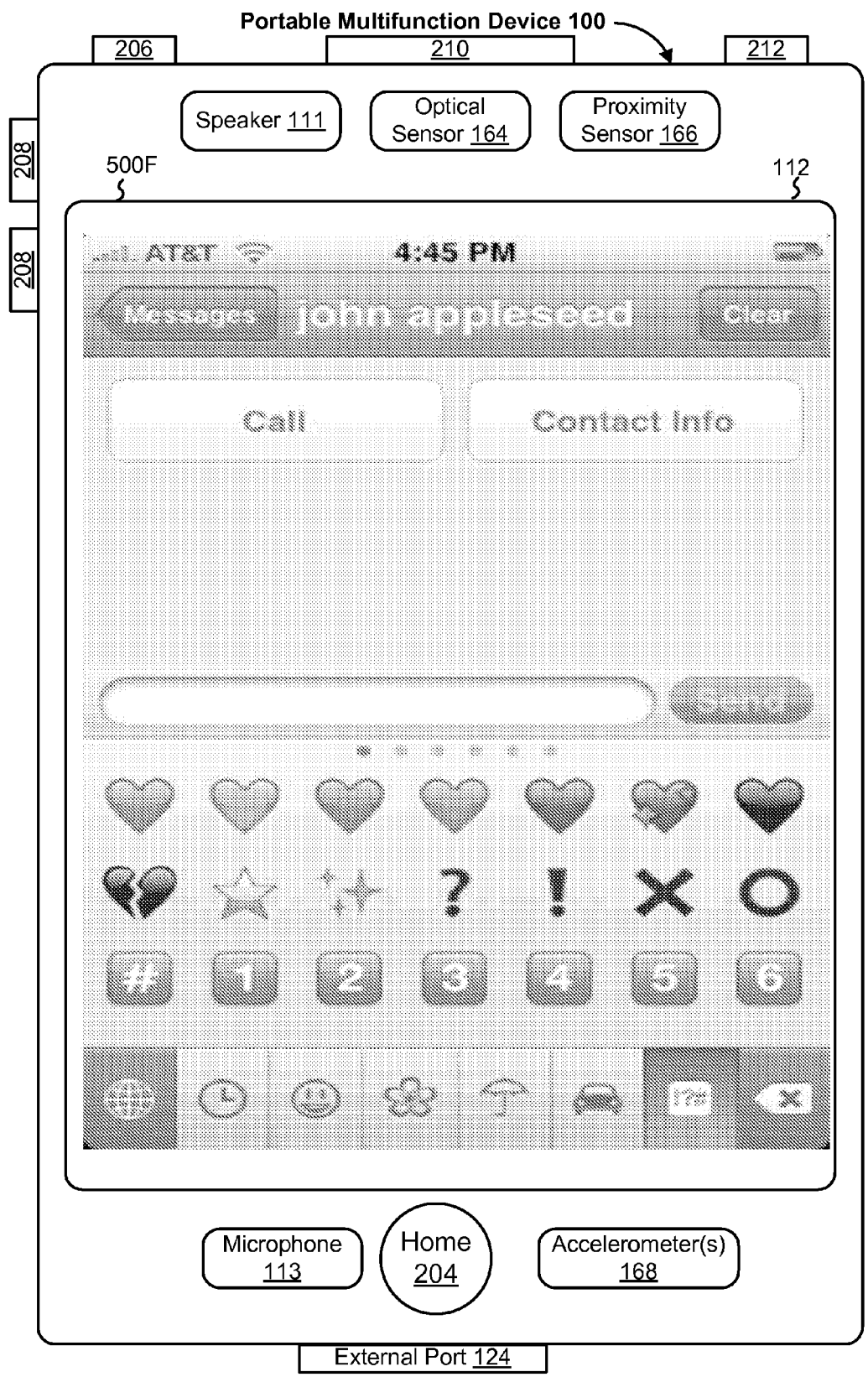

FIG. 5A illustrates a user interface 500A in an instant messaging application 141. As depicted in this example, a character input area 5000 is provided for displaying or being operable to display text character input and emoji character input selected by a user. As noted above, as used in the specification and claims, text characters refer to alphanumeric characters, sinographs, Japanese kanji or kana symbols, and/or other written human language characters, while emoji characters refer to still and animated picture characters that are not text characters in written human languages. A keyboard display area 5005 is also provided in user interface 500A, which may include a plurality of emoji category icons 5010. The emoji category icons 5010 correspond to a plurality of emoji categories, e.g., most recently and frequently used, people, nature, objects, travel, symbols, and/or seasonal categories of emoji. In the exemplary embodiment displayed in UI 500A, emoji category icon 5010-1 corresponds to most recently and frequently used, emoji category icon 5010-2 corresponds to people, emoji category icon 5010-3 corresponds to nature, emoji category icon 5010-4 corresponds to objects, emoji category icon 5010-5 corresponds to travel, and emoji category icon 5010-6 corresponds to symbols.

UI 500A also includes exemplary emoji character keys 5015 within the keyboard display area 5005 for the respective emoji category being displayed. In the example UI 500A, the emoji character keys being displayed (i.e., 5015-1, 5015-2, and 5015-3) correspond to the emoji category 'most recently and frequently used' because emoji category icon 5010-1, most recently and frequently used, is currently selected. The currently selected emoji category icon 5010 is typically visually distinguished from the unselected emoji category icons, e.g., by highlighting or changing its background color relative to the unselected emoji category icons.

In some embodiments, the emoji character keys in the emoji category corresponding to emoji category icon 5010-1, the most recent and frequently used emoji characters, are selected for display based on an algorithm that analyzes recency of use as well as frequency of use for emoji characters that have been used. The algorithm creates a historic list of emoji character usage. Each entry in the historic list is given a relative weight based on the position of the entry in the historic list. For example, the most recently used emoji character gets the highest weight, the second most recently used emoji character gets a weight that is less than the most recently used emoji character, the third most recently used emoji character gets a weight that is less than the second most recently used emoji character, and so on. Next, for each distinct emoji character, an overall score is determined by combining (e.g., summing) the relative weights for that emoji character. For example, for an emoji character that occupies the second, tenth, and twentieth positions in the historic list, the overall score for that emoji character is the sum of the relative weights given to the second, tenth, and twentieth positions in the historic list. The emoji characters with the highest overall scores are then displayed (e.g., in descending score order) in the emoji category 'most recently and frequently used'.

In this exemplary embodiment, UI 500A also includes a keyboard selection icon 5020. In some embodiments, the keyboard selection icon 5020 is simultaneously displayed with the plurality of emoji category icons 5010, e.g., in a predefined area 5009 along the bottom of the touch screen display. The keyboard selection icon 5020 is used in some embodiments to replace the display of emoji character keys with display of a text character input keyboard (e.g., 5055, FIG. 5G) in the keyboard display area 5005. Additionally, UI 500A includes a send icon 5025, which when activated (e.g., by a finger tap gesture) initiates sending of the electronic message input in area 5000. UI 500A also includes a delete icon 5011, which when activated (e.g., by a finger tap gesture) deletes one or more characters in input area 5000.

UI 500B (FIG. 5B) illustrates a keyboard display area 5005 that includes subset-sequence-indicia icons 5040 for the respective emoji category, here people, which is visually indicated as selected by the highlighting of emoji category icon 5010-2. The subset-sequence-indicia icons 5040 provide information about the number of subsets in the emoji category currently being displayed, as well as a position of a displayed subset in the sequence of subsets of emoji character keys in the keyboard display area 5005. Here, the subset-sequence-indicia icons 5040 indicate that there are six subsets of emoji character keys in the people emoji category and that the first subset in the people emoji category is currently being displayed. As another example, see the discussion below of subset-sequence-indicia icons 6000 in FIGS. 6A-6C.

UI 500C, UI 500D, UI 500E, and UI 500F, which are depicted in FIGS. 5C through 5F, respectively, illustrate examples of user interfaces with other exemplary emoji categories and emoji character keyboards.

UI 500G (FIG. 5G) illustrates a text character input keyboard 5055 in keyboard display area 5005. In some embodiments, keyboard 5055 includes a text character input category icon, 5060, that when activated (e.g., by a finger tap gesture on the icon) results in the display of an alternate text character keyboard with numbers keys and other text character input keys. In some embodiments, keyboard 5055 includes hybrid purpose key 5062 that is operable to input space characters, and is also operable to confirm auto-completion and/or auto-corrections when entering text characters. For example, when entering Japanese language text, some embodiments permit using phonetic text. As the device evaluates text characters input by a user, a recommended completion candidate of one or more words is presented for the text already entered. For example, if the user types the characters "ra," "rain" may be recommended as a completion candidate. Thereafter, while the "rain" completion candidate is displayed (not shown), activating hybrid purpose key 5062 (e.g., by a finger tap gesture on key 5062) will confirm "rain" is the intended text to be input, and the device will insert the string of characters "rain" into character input area 5000. In some embodiments, sinographs or Japanese kana characters may be presented as completion candidates. In some embodiments, keyboard 5055 includes hybrid purpose key 5063 that is operable to input a return character, and is also operable to confirm auto-completion for actions. For example, if the user types the characters "goo," the device may recommend going to the Google search engine as an action completion candidate. Thereafter, activating hybrid purpose key 5063 (e.g., by a finger tap gesture on key 5063) will cause the device to open a browsing module 147 and display a Web page for the Google search engine. Keyboard 5055 also includes keyboard selection icon 5020. Additionally, keyboard 5055 includes text character input keys 5065 such as 5065-1 ("Q"), 5065-2 ("A"), and 5065-3 ("S"), among others.

FIGS. 6A-6E illustrate exemplary user interfaces for navigating between emoji character subsets in a particular emoji category and inputting an emoji character on a portable electronic device 100 equipped with a touch-sensitive display 112 in accordance with some embodiments. An overview of these figures is provided here.

UI 600A (FIG. 6A) depicts subset-sequence-indicia icons 6000-1, 6000-2, and 6000-3 for the currently displayed emoji category, here nature, which is visually indicated as selected by the highlighting of emoji category icon 5010-3. The subset-sequence-indicia icons 6000-1, 6000-2, and 6000-3 provide information about the number of subsets in the emoji category currently being displayed, as well as a position of a displayed subset in the sequence of subsets of emoji character keys in the keyboard display area 5005. For example, in UI 600A, the number of indicia icons 6000 indicate that there are three subsets in this emoji category (nature). In addition, the visual highlighting of icon 6000-1 relative to icons 6000-2 and 6000-3 indicates that the first subset 6015 in this category is being displayed.

In some embodiments, upon detecting a gesture in the keyboard display area 5005 (e.g., gesture 6010 (FIG. 6A), a horizontal or substantially horizontal finger swipe gesture), the first subset of emoji character keys 6015 is replaced with display of a second subset of emoji character keys 6020 (FIG. 6B) in the keyboard display area 5005. Additionally, in some embodiments, the information provided by the subset-sequence-indicia icons is updated to reflect the replacement of the displayed first subset of emoji character keys 6015 by the second subset of emoji character keys 6020. In this example, subset-sequence-indicia icon 6000-1 is highlighted in UI 600A because the first subset of emoji character keys 6015 in the nature category is displayed. When the first subset of emoji character keys 6015 is replaced with the second subset of emoji character keys 6020 (FIG. 6B), subset-sequence-indicia icon 6000-2 is highlighted instead. In some embodiments, a subset-sequence-indicia icon that corresponds to a subset of emoji character keys currently being displayed is highlighted or otherwise visually distinguished, while ceasing to highlight or otherwise visually distinguish another subset-sequence-indicia icon that corresponds to the subset of emoji character keys that had been displayed.

UI 600B (FIG. 6B), already discussed to some extent above, shows detecting another gesture in the keyboard display area 5005 (e.g., gesture 6025, a horizontal or substantially horizontal finger swipe gesture). In response to detecting gesture 6025, the second subset of emoji character keys 6020 is replaced with a display of a third subset of emoji character keys 6040 (FIG. 6C) in the keyboard display area 5005. Correspondingly, as depicted in UI 600C (FIG. 6C), subset-sequence-indicia icon 6000-3 is highlighted instead of subset-sequence-indicia icon 6000-2.

UI 600C (FIG. 6C) shows detecting another gesture in the keyboard display area 5005 (e.g., gesture 6030, a horizontal or substantially horizontal finger swipe gesture that is substantially opposite the direction of gesture 6025). In response to detecting gesture 6030, the third subset of emoji character keys 6040 is replaced with a display of the second subset of emoji character keys 6020 (FIG. 6B) in the keyboard display area 5005. Correspondingly, subset-sequence-indicia icon 6000-2 is highlighted instead of subset-sequence-indicia icon 6000-3 (FIG. 6B).

UI 600C (FIG. 6C) also shows a user gesture 6045 (e.g., a finger tap gesture) on emoji key 6050. UI 600D (FIG. 6D) shows a key selection icon 6060 being displayed while the finger contact in user gesture 6045 is still on emoji key 6050 (which was depicted in FIG. 6C). Key selection icon 6060 shows the key that will be selected if the user's finger lifts off (ceases to contact) the touch screen display at the current position of the finger contact on the touch screen display. In some embodiments, an image 6061 of the selected emoji character, in this case the emoji character that corresponds to emoji key 6050, is displayed within key selection icon 6060.

UI 600E (FIG. 6E) shows an image 6070 of the selected emoji character, in this case the emoji character that corresponds to emoji key 6050, displayed within character input area 5000 in response to detecting gesture 6045.

FIGS. 7A-7E illustrate exemplary user interfaces for inputting an emoji character and sending an electronic message that includes the emoji character on a portable electronic device 100 equipped with a touch-sensitive display 112 in accordance with some embodiments. An overview of these figures is provided here.

UI 700A through UI 700C illustrate user selection of an emoji character in a fashion analogous to that described above. In UI 700A, emoji key 7000 is selected in response to detecting user gesture 7001 (e.g., a finger tap gesture). UI 700B (FIG. 7B) shows a key selection icon 7010 being displayed while the finger used for gesture 7001 is still in contact with the area that corresponds to emoji key 7000.

UI 700C (FIG. 7C) shows an image 7025 of the selected emoji character displayed within character input area 5000 in response to detecting gesture 7001. In response to detecting a user gesture (e.g., finger tap gesture 7026, FIG. 7D) on send icon 5025 (FIG. 7D), the text characters and emoji characters input in area 5000 are sent as an electronic message to another party (e.g., to john appleseed, FIGS. 7D and 7E).

In this example, the emoji character is input and sent in an instant message. But one of ordinary skill in the art would understand that the emoji character can also be input and sent in other types of electronic messages and documents, such as email 140.

Figure 8A:
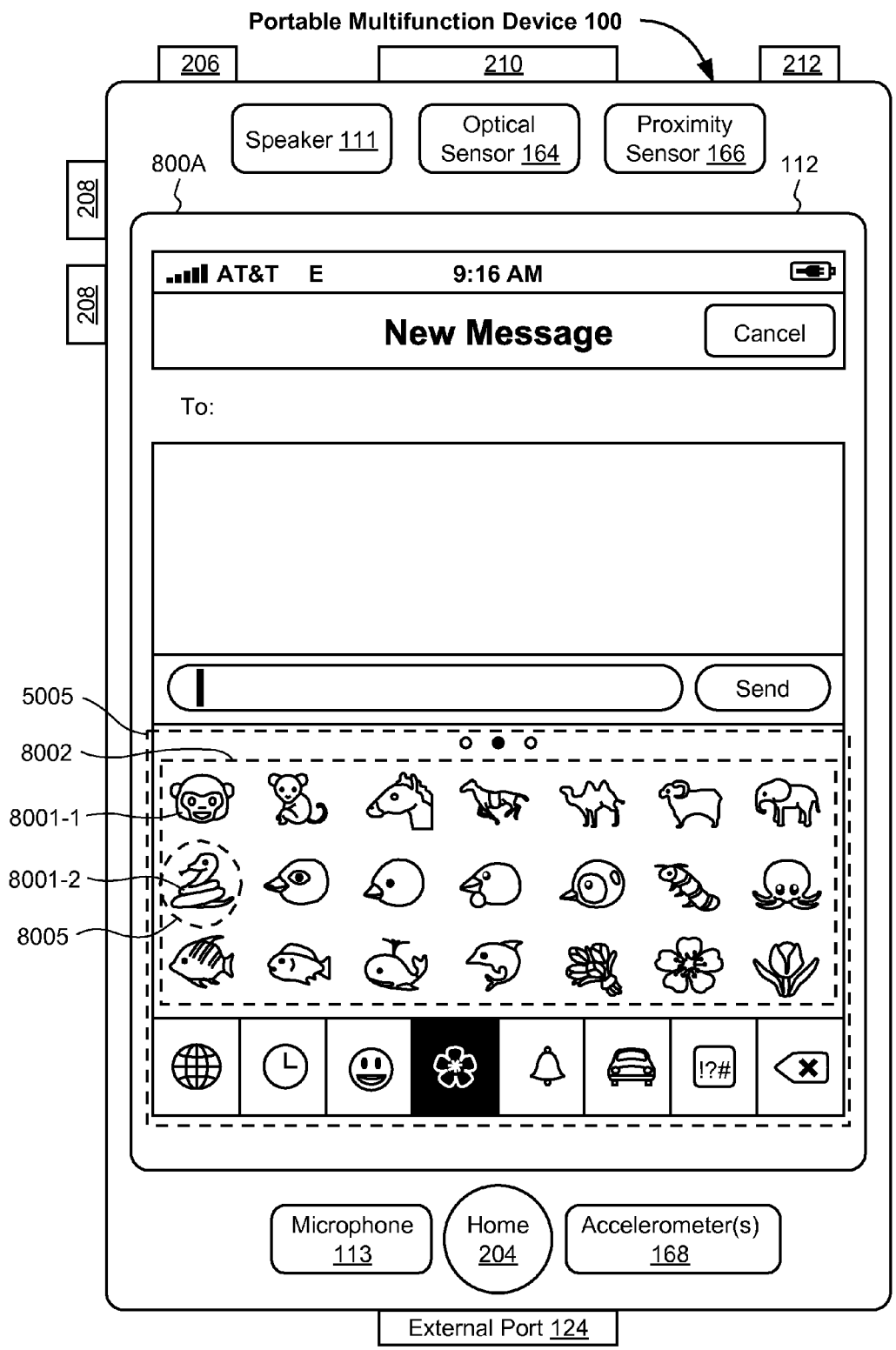
FIGS. 8A-8C illustrate exemplary user interfaces for reconfiguring emoji character keys in a software keyboard on a portable electronic device equipped with a touch-sensitive display in accordance with some embodiments.
Figure 8B:
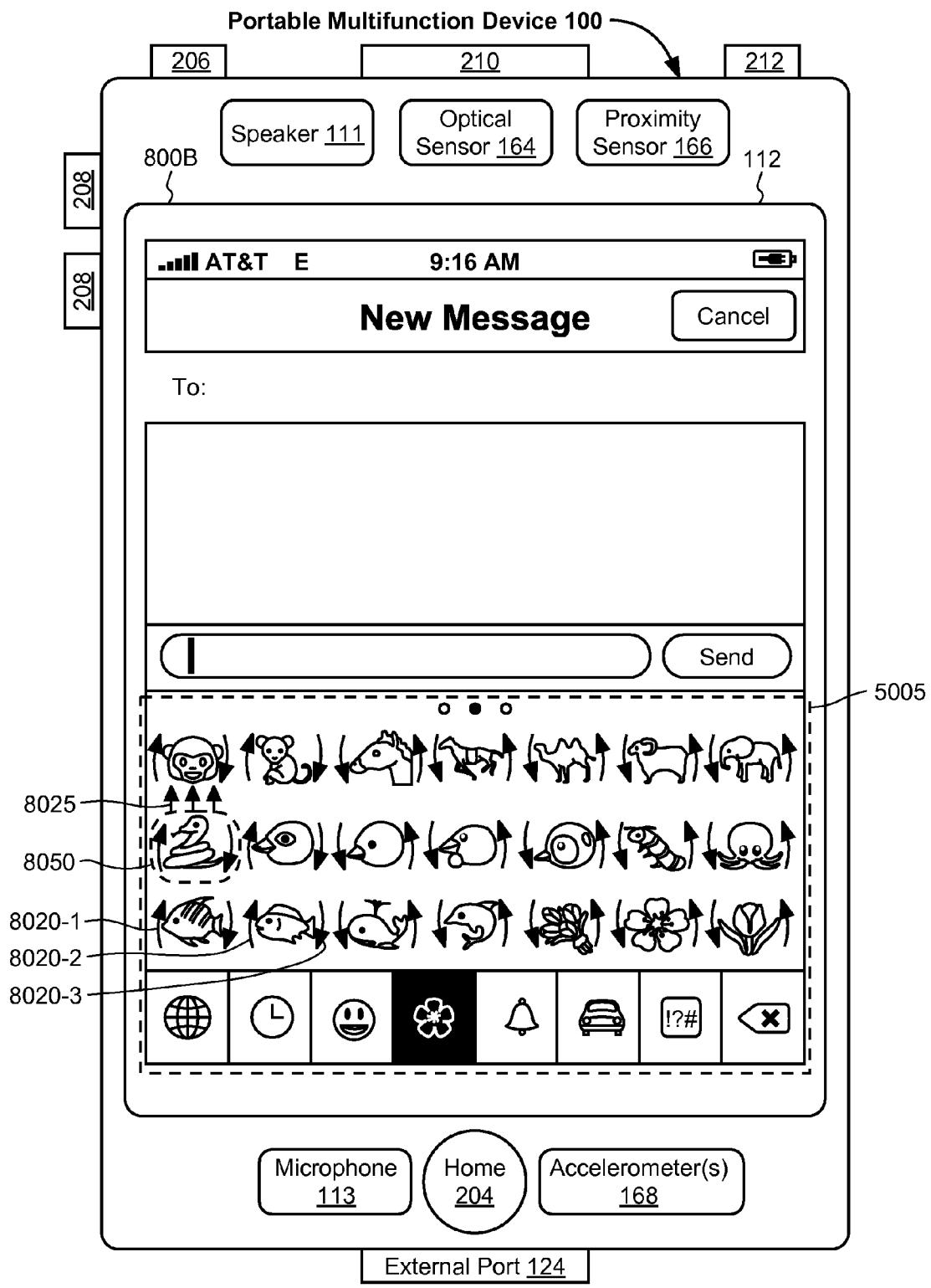
Figure 8C:
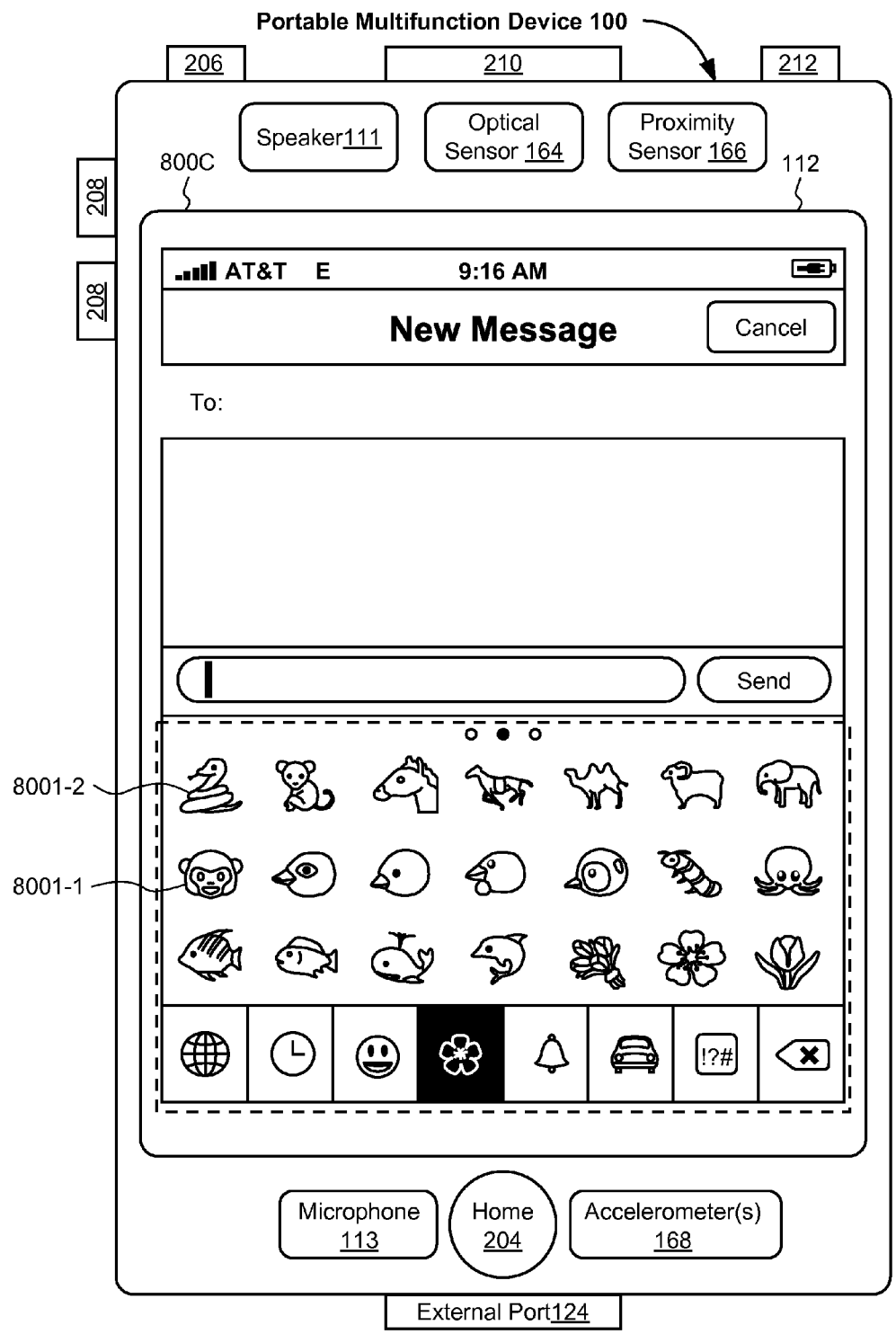

FIGS. 8A-8C illustrate exemplary user interfaces for reconfiguring emoji character keys in a software keyboard on a portable electronic device 100 equipped with a touch-sensitive display 112 in accordance with some embodiments. This process provides a simple, efficient mechanism for a user to rearrange emoji character keys on a portable electronic device (e.g., to optimize the emoji character key positions for more efficient input by the user).

UI 800A (FIG. 8A) depicts a keyboard display area 5005 with a plurality of emoji character keys 8002, including emoji keys 8001-1 and 8001-2. The user interface is configured to detect a predefined user action (e.g., pressing and holding a finger contact 8005 on any emoji character key 8001 for greater than a predetermined time period) for initiating a predefined user interface reconfiguration process.

UI 800B (FIG. 8B) illustrates that in some embodiments, upon detecting the predefined user action 8005, the emoji character keys 8001 within keyboard display area 5005 vibrate (e.g., vibrations 8020-1, 8020-2, 8020-3, etc.) in a region substantially centered on the respective average position of each respective emoji character key. These vibrations provide a simple visual indicator that the device is now in an interface reconfiguration mode and that the vibrating icons may be rearranged.

UI 800B also depicts that, in some embodiments, the device detects the user making a point of contact 8050 with the touch screen display 112 at a first position corresponding to a first emoji character key 8001-2 in the plurality of emoji character keys 8002 and detects movement of the point of contact 8050 to a second position 8025 on the touch screen display 112. In some embodiments, the user interface will display movement of the first emoji character key 8001-2 to the second position 8025 on the touch screen display 112 in accordance with the detected movement of the point of contact 8050.

In UI 800C (FIG. 8C), the user interface fixes a position of the first emoji character key 8001-2 at the second position in response to detecting a second predefined user action for terminating the predefined user interface reconfiguration process (e.g., detecting activation of the home button 204). In the example depicted, the net result is that emoji character keys 8001-1 and 8001-2 have swapped positions in UI 800C when compared with UI 800A.

FIGS. 9A-9H illustrate exemplary user interfaces for responding to messages with emoji while a portable electronic device 100 equipped with a touch-sensitive display 112 is in a user-interface locked mode in accordance with some embodiments. An overview of these figures is provided here.

UI 900A (FIG. 9A) depicts an exemplary user interface that is in a user-interface locked mode. See also the description of FIG. 3 above. In a user-interface unlocked mode, the device 100 is in its normal operating state, detecting and responding to user input corresponding to interaction with the user interface. A device 100 that is in the unlocked mode may be described as an unlocked device 100. An unlocked device 100 detects and responds to user input for navigating between user interfaces, entry of data and activation or deactivation of functions. In contrast to the user-interface unlocked mode, in the user-interface locked mode, only a restricted subset of control icons are displayed and the device 100 only responds to a restricted set of finger gestures. For example, just an unlock image 302, arrow 304, and channel 306 may be displayed (UI 900A), along with a wallpaper image 314. In addition, as described below, a small number of predefined responses may be displayed that include emoji characters and/or a small number of gestures may be used to respond to messages received while in the user-interface locked mode.

UI 900B (FIG. 9B) illustrates receiving an incoming message from a party 2210 (here "Jane Doe") to a user of the portable electronic device while the user interface is in a user-interface locked mode, where at least part of the incoming message 2212 from the party 2210 is displayed to the user on the touch screen display 112.

UI 900C (FIG. 9C) illustrates the user interface detecting one or more predefined finger gestures (e.g., tap gestures 9100-1 and 9100-2 and swipe gesture 9100-3) on the touch screen display 112 that correspond to an emoji character. In some embodiments, the correspondence between these one or more predefined finger gestures and the emoji character is made by assigning the one or more predefined finger gestures to the emoji character, as described below with respect to FIGS. 10A-10E and FIG. 16. In some embodiments, the user interface also detects a predefined user action to initiate sending a response to the incoming message 2212 (e.g., swipe gesture 2213), and then sends a response to the incoming message 2212, wherein the response comprises the emoji character that corresponds to the one or more predefined finger gestures (e.g., 9100-1, 9100-2, and 9100-3) detected on the touch screen display 112.

UI 900D (FIG. 9D) illustrates that in some embodiments, the user interface may display a plurality of predefined responses 9110 to the incoming message 2212, wherein the predefined responses (e.g., 9110-1, 9110-2, and 9110-3) include a plurality of emoji characters (e.g., 9111-1, 9111-2, and 9111-3). In UI 900D, each predefined response 9110 includes a single emoji character 9111. More generally, other predefined responses 9110 may contain more than one emoji character and some predefined responses 9110 may not contain any emoji characters (not shown).

UI 900E (FIG. 9E) illustrates detecting a user action (e.g., tap gesture 9120) to select a predefined response (e.g., response 9110-1). A user can quickly choose from a list of predefined responses that include emoji characters and send the chosen response without unlocking the device. In some embodiments, detecting selection of a predefined response 9110 also initiates sending of the predefined response, without detecting any further action by the user. In some embodiments, after detecting selection of a predefined response 9110, a further predefined user action is detected to initiate sending the response, such as detecting activation of the home button 204, detecting activation of a "send" button (not shown), or detecting a sliding finger gesture 2213, which appears to move the unlock image 302 across channel 306 (in which case the "slide to view" message in channel 306 may be changed to a "slide to send response" message or a similar message, FIG. 9E).

UI 900F (FIG. 9F) illustrates a user interface in the messaging application after the device is subsequently unlocked, which shows the predefined response 9110-1 that was sent while the device was in a locked state.

UI 900G and UI 900H (FIGS. 9G and 9H, respectively) are similar to UI 900E and UI 900F (FIGS. 9E and 9F, respectively), except that predefined responses 9110-4, 9110-5, and 9110-6 consist of just emoji characters, rather than a combination of text characters and emoji characters. Similarly, sent predefined response 9110-4 in FIG. 9H corresponds to predefined response 9110-4 in FIG. 9G, and consists of just an emoji character 9225.

FIGS. 10A-10E illustrate exemplary user interfaces for assigning a user-defined gesture to an emoji character on a portable electronic device 100 equipped with a touch-sensitive display 112 in accordance with some embodiments. An overview of these figures is provided here.

UI 1000A (FIG. 10A) depicts an exemplary user interface for recording user-defined gestures. UI 1000A includes a record icon 1001, an associate icon 1010, a store icon 1015 and a cancel icon 1016. Upon detecting a user gesture 1020 on the record icon 1001, the user interface goes into a gesture-recording mode. UI 1000B (FIG. 10B) illustrates a user-defined gesture 1030 detected on the touch screen 112 while in the gesture-recording mode. In some embodiments, in response to detecting a gesture (e.g., finger tap gesture 1040, FIG. 10C) on the associate icon 1010, a process is initiated for associating a representation of the user-defined gesture 1030 with an emoji character, which may include displaying one or more user interfaces with emoji character keys (e.g., UI 1000D FIG. 10D). In some embodiments, the user interfaces with emoji character keys are analogous to UIs 500A-500F (FIGS. 5A-F), but the user interfaces are used here for associating an emoji with the user-defined gesture 1030, rather than selecting an emoji character for input in an electronic message or document. In response to detecting a gesture on an emoji character key (e.g., finger tap gesture 1070 on emoji key 1060, FIG. 10D), the representation of the user-defined gesture 1030 is associated with (or tentatively associated with, pending user confirmation) the emoji character corresponding to emoji character key 1060. In some embodiments, a confirmation UI (e.g., UI 1000E, FIG. 10E) displays the emoji character 1075 that will be associated with the user-defined gesture 1030 if activation of the store icon 1015 is detected (e.g., by finger tap gesture 1080, FIG. 10E). In response to activation of the cancel icon 1016 (e.g., by finger tap gesture), the process of assigning a user-defined gesture to an emoji character is terminated.

Figure 11A:
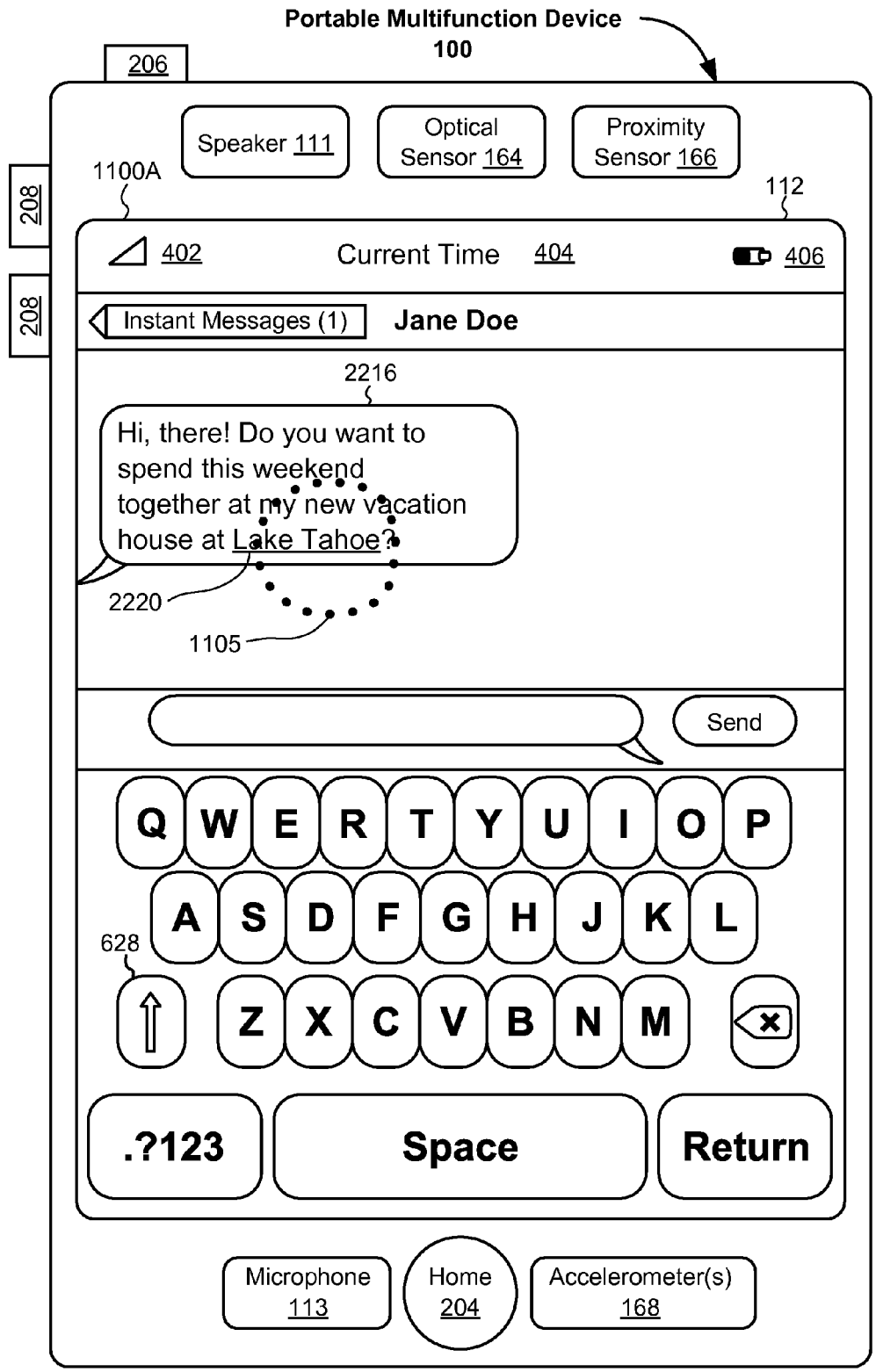
FIGS. 11A-11B illustrate exemplary user interfaces for using an emoji character as a location indicator on a map via an electronic message in accordance with some embodiments.
Figure 11B:
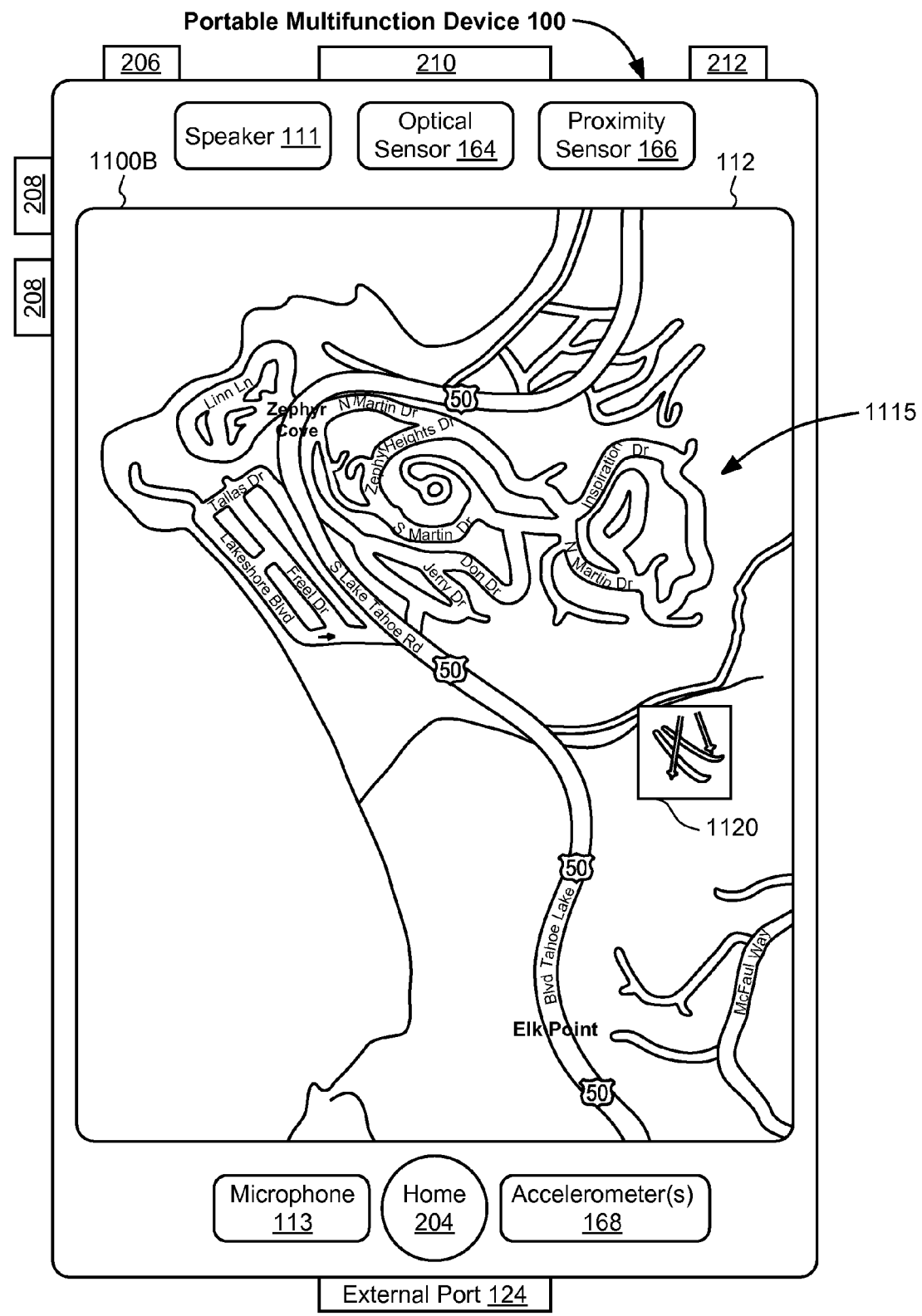
Figure 12A:
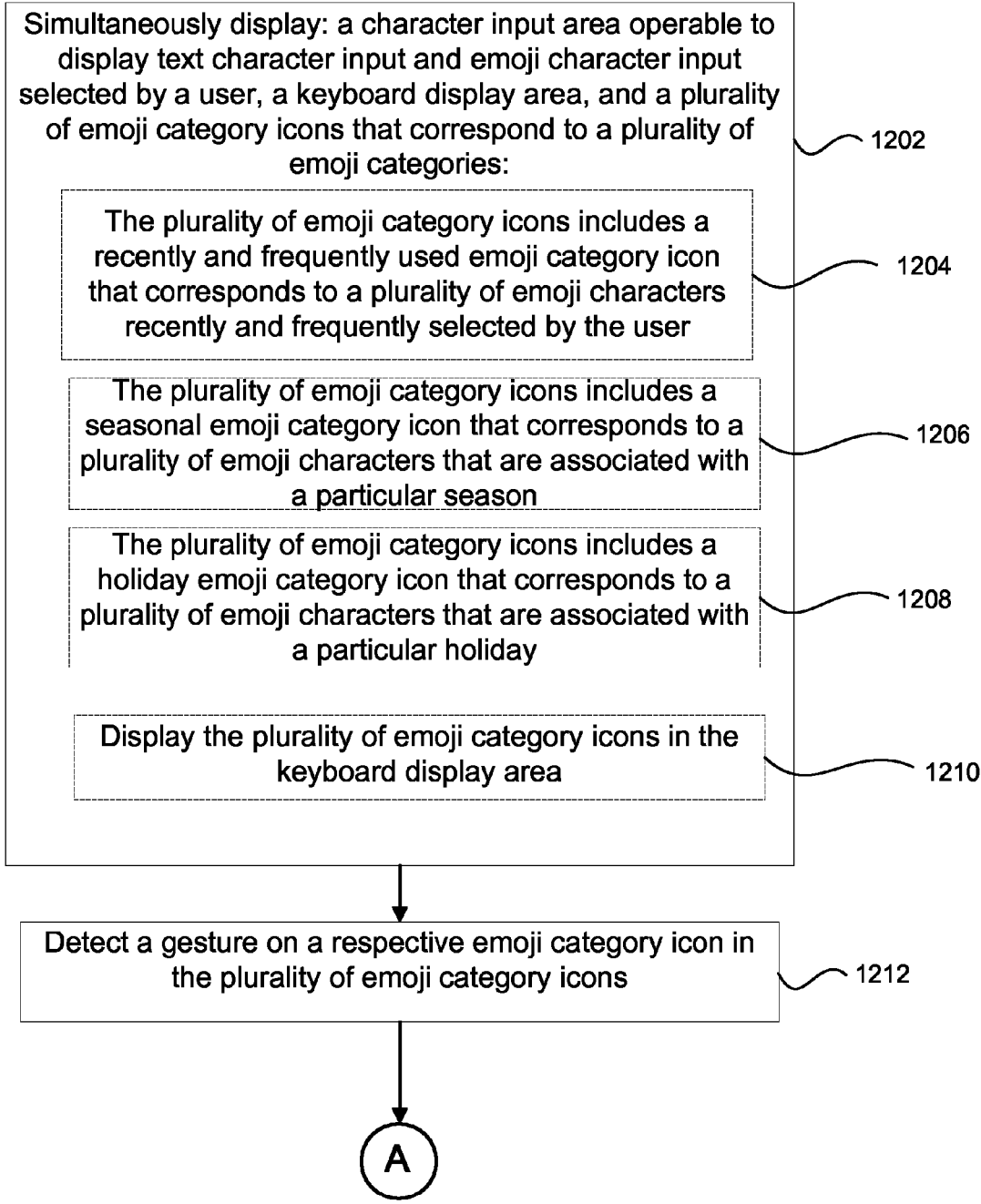
FIGS. 12A-12F are flow diagrams illustrating a method of operating emoji character keyboards on a portable electronic device with a touch-sensitive display in accordance with some embodiments.
Figure 12B:
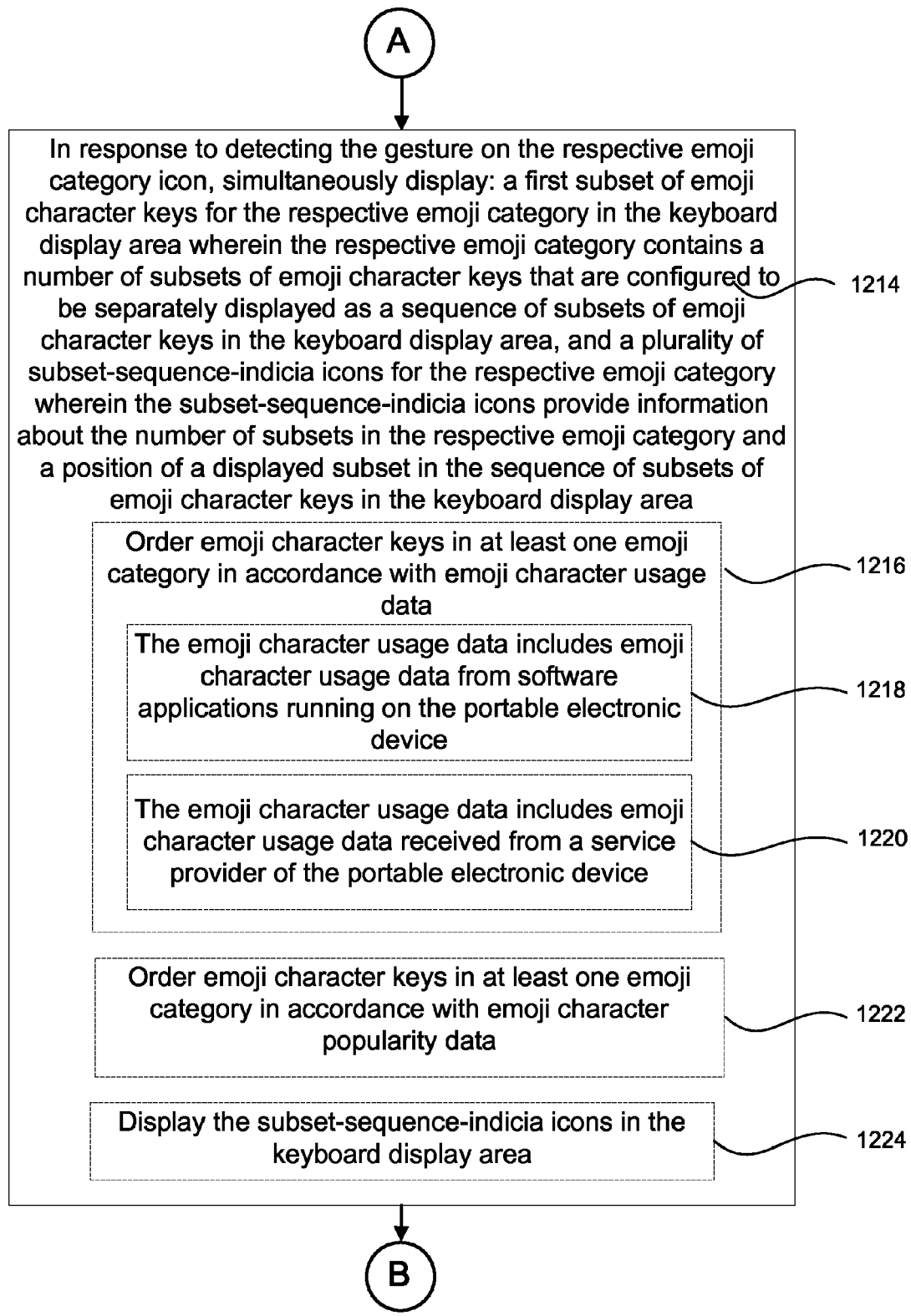
Figure 12C:
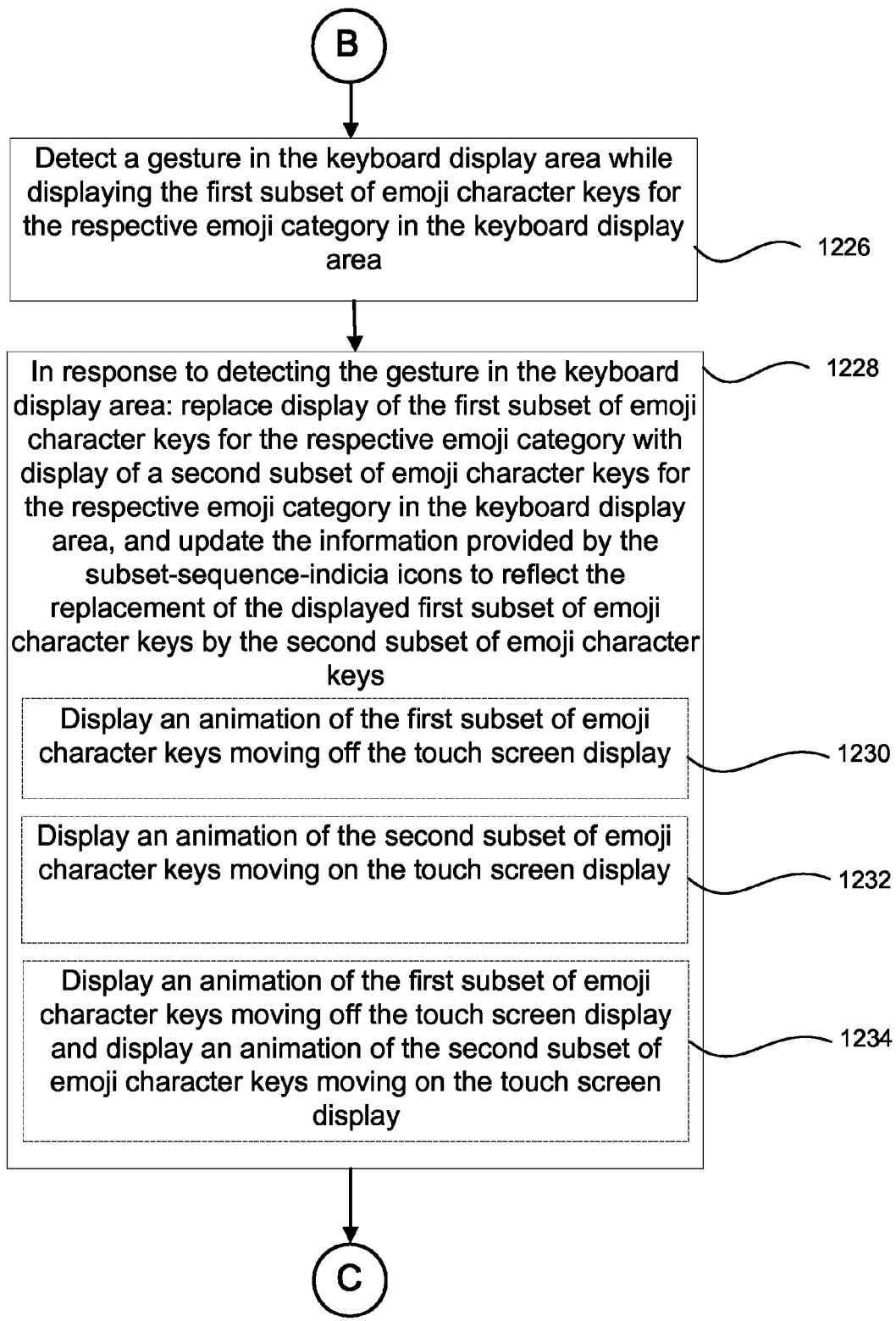
Figure 12D:
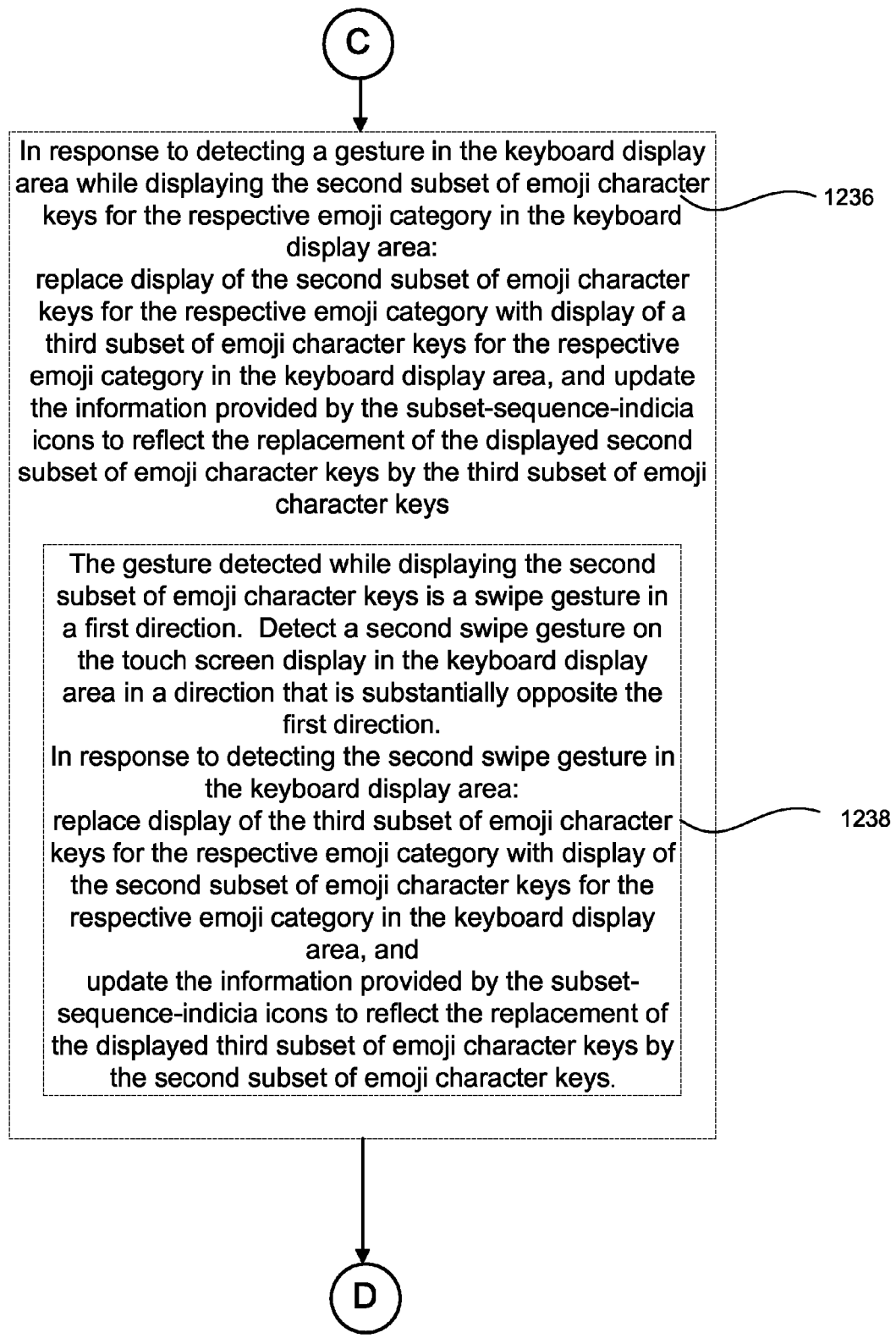
Figure 12E:
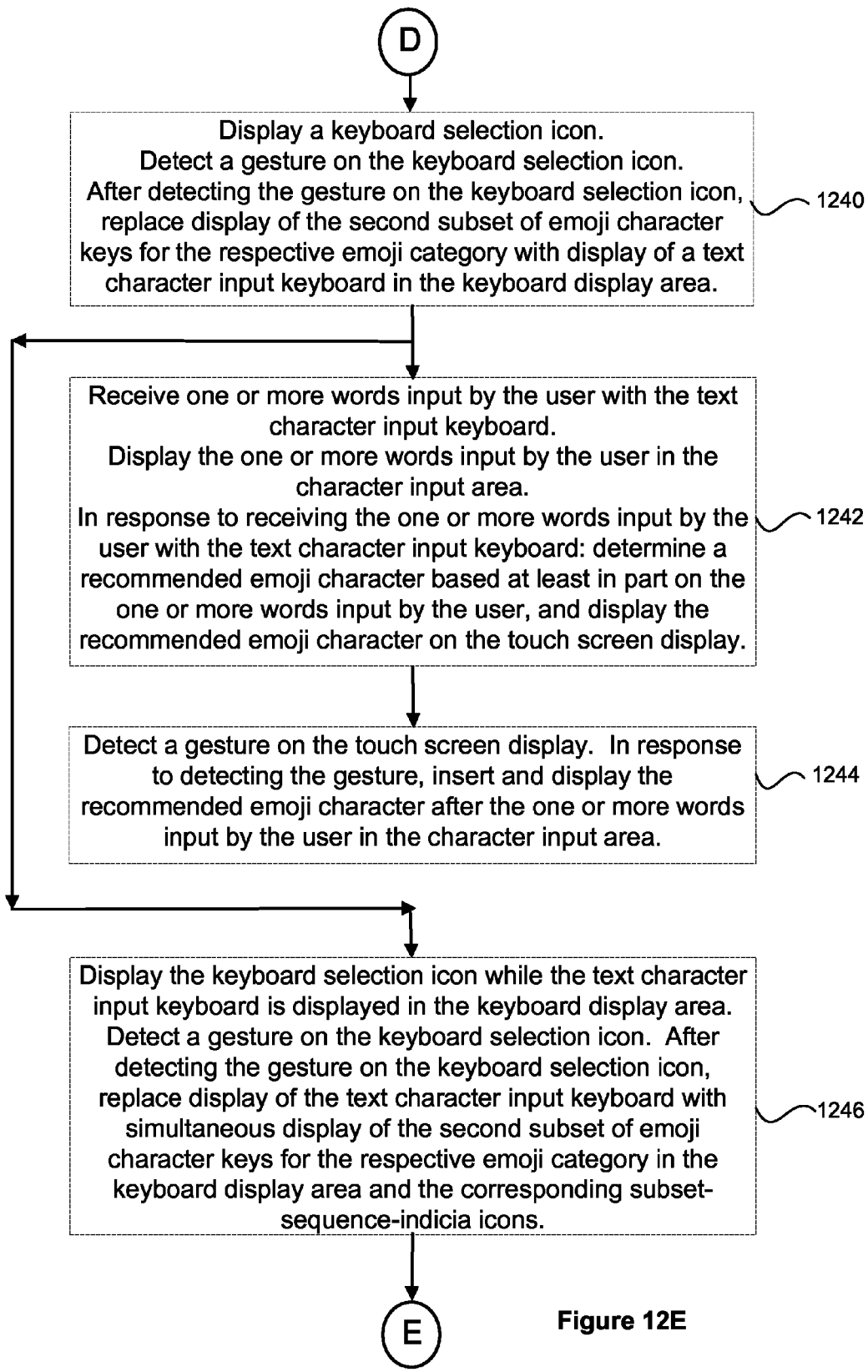
Figure 12F:
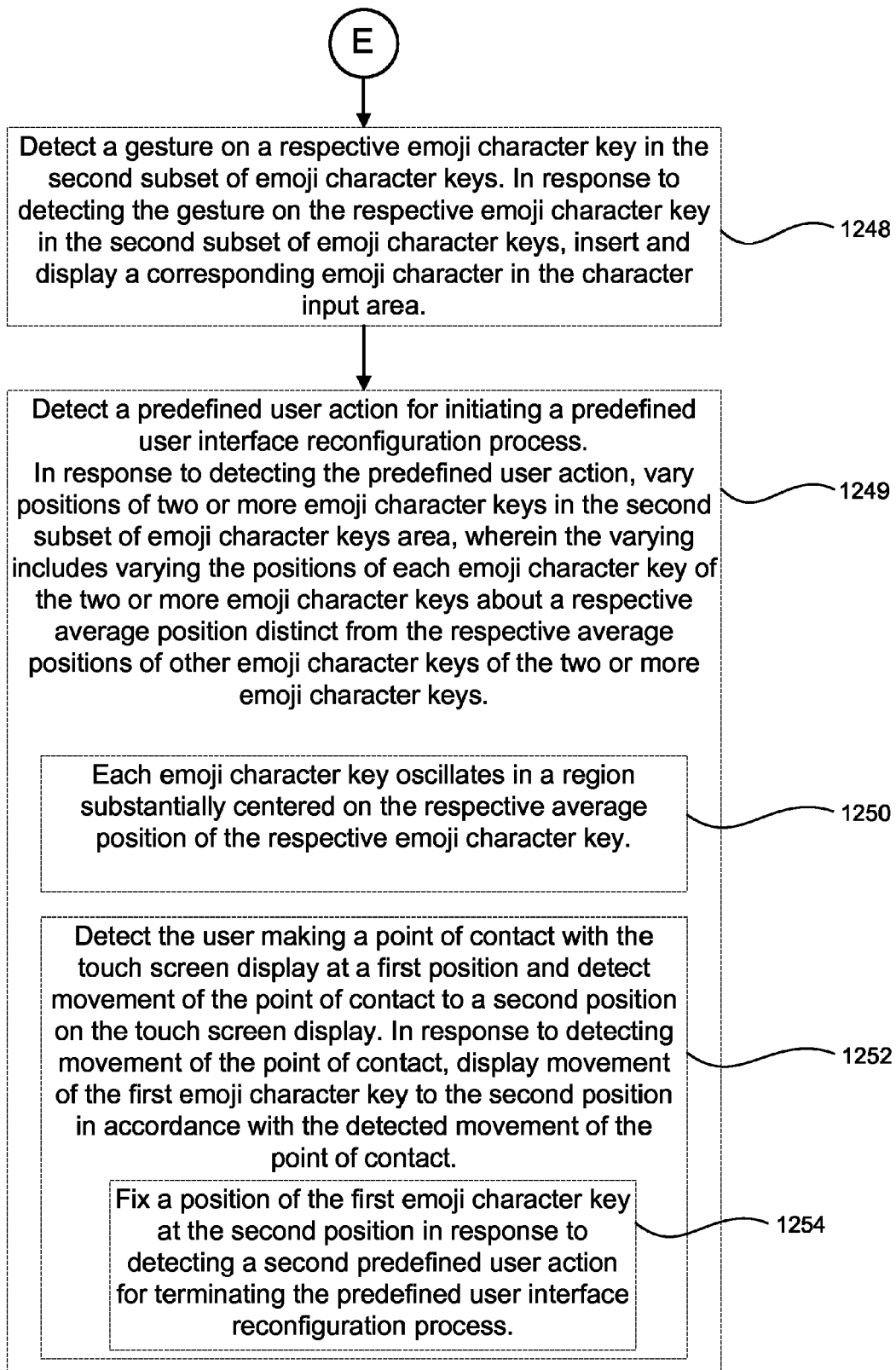

FIGS. 11A-11B illustrate exemplary user interfaces for using an emoji character as a location indicator on a map via an electronic message in accordance with some embodiments. An overview of these figures is provided here.

UI 1100A (FIG. 11A) illustrates an electronic message 2216 displayed in an instant messaging application 141. The electronic message includes: instructions for initiating a geographic mapping application, location data representing a location on a geographic map, and emoji data representing an emoji character. The emoji data is associated with the location data. In response to detecting a predefined user action on the message (e.g., a finger tap gesture 1105 on the link 2220 to Lake Tahoe), the device displays the geographic map (e.g., map 1115, FIG. 11B) in the geographic mapping application 154, and the device displays the emoji character 1120 (FIG. 11B) at the location on the geographic map 1115 that corresponds to the location data.

Some of the user interfaces in FIGS. 5A-11C are used to illustrate the processes described in FIGS. 12A-12F and FIGS. 13-17 below.

FIGS. 12A-12F are flow diagrams illustrating a method of operating emoji character keyboards on a portable electronic device with a touch-sensitive display in accordance with some embodiments. The method 1200 is performed on a portable electronic device having a touch screen display (e.g., portable multifunction device 100). The method provides a more efficient way to organize and select emoji characters on a portable electronic device, thereby conserving power, increasing the time between battery charges, and increasing user satisfaction with the device.

Figure 6A:
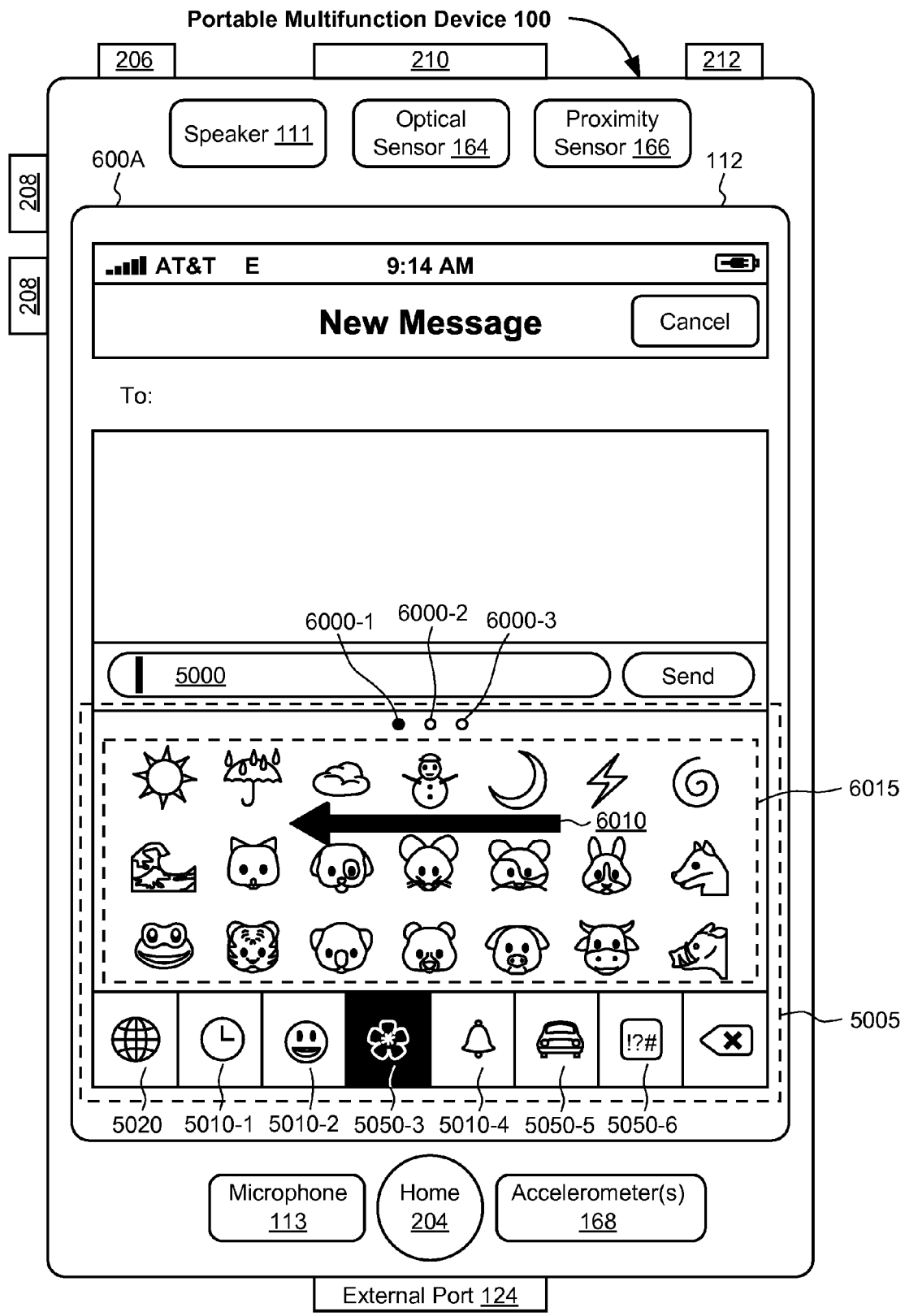
FIGS. 6A-6E illustrate exemplary user interfaces for navigating between emoji character subsets in a particular emoji category and inputting an emoji character on a portable electronic device equipped with a touch-sensitive display in accordance with some embodiments.
Figure 6B:
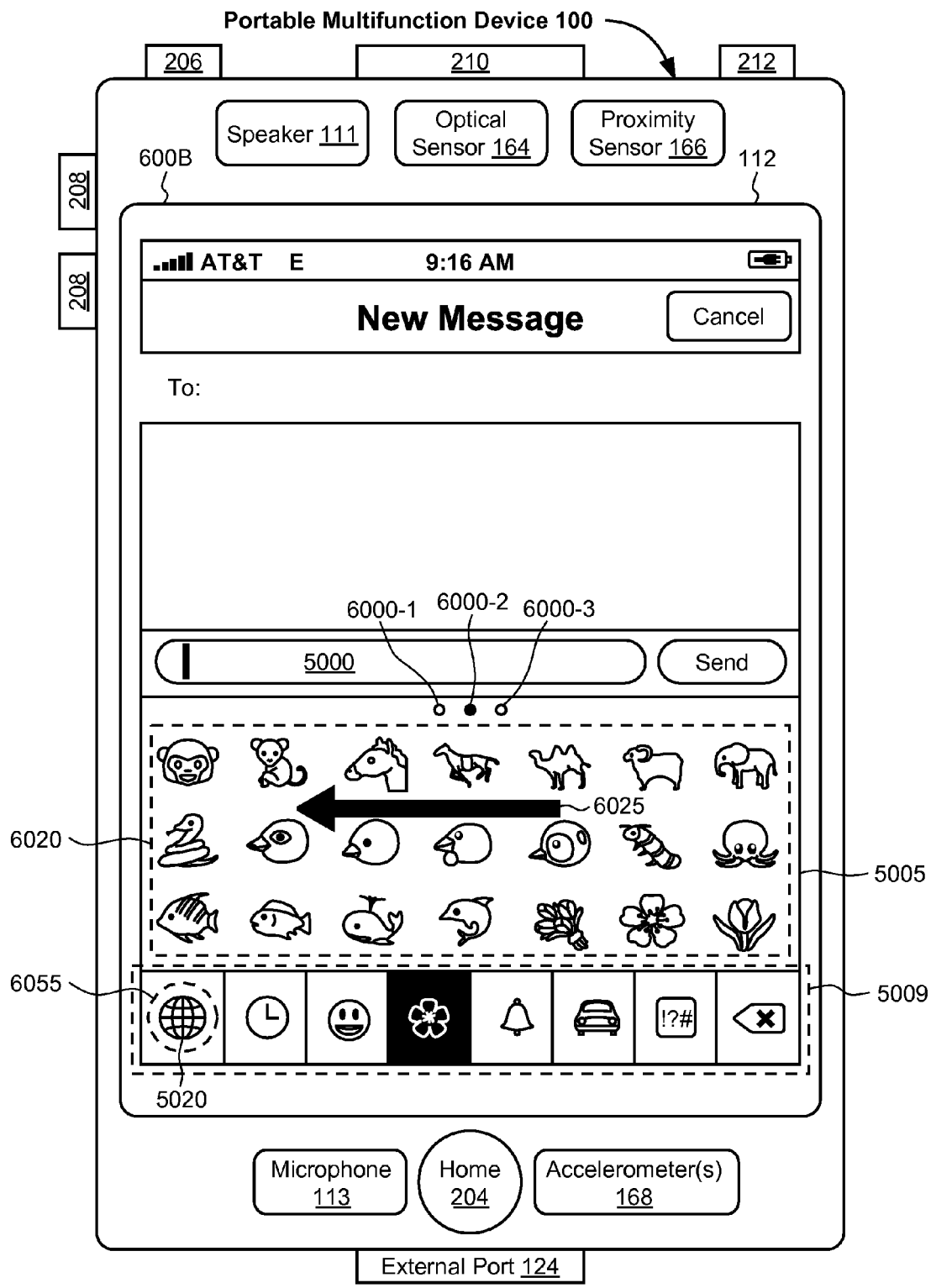

The portable electronic device simultaneously displays (1202) a character input area (e.g., area 5000, FIG. 6A) a keyboard display area (e.g., area 5005, FIG. 6A), and a plurality of emoji category icons (e.g., icons 5010, FIG. 6A). The character input area 5005 is for displaying or is operable to display text character input and emoji character input selected by a user.

The emoji category icons correspond to a plurality of emoji categories (e.g., 5010-1 through 5010-6, FIG. 6A). In some embodiments, the plurality of emoji category icons includes a recently and frequently used emoji category icon (1204) that corresponds to a plurality of emoji characters recently and frequently selected by the user (e.g., recently and frequently used emoji category icon 5010-1, FIG. 6A). In some embodiments, the plurality of emoji category icons includes a seasonal emoji category icon (1206) that corresponds to a plurality of emoji characters that are associated with a particular season (e.g., spring, summer, fall, or winter). In some embodiments, the plurality of emoji category icons includes a holiday emoji category icon (1208) that corresponds to a plurality of emoji characters that are associated with a particular holiday (e.g., Christmas or New Years).

In some embodiments, the plurality of emoji category icons 5010 is displayed (1210) in the keyboard display area 5005 (FIG. 6A).

The device detects (1212) a gesture on a respective emoji category icon 5010 in the plurality of emoji category icons. In some embodiments, the gesture may be a finger tap gesture (e.g., tap gesture 5007 on category icon 5010-3, FIG. 5A).

In response to detecting the gesture on the respective emoji category icon, the device simultaneously displays (1214) a first subset of emoji character keys (e.g., subset 6015, FIG. 6A) for the respective emoji category in the keyboard display area 5005 and a plurality of subset-sequence-indicia icons for the respective emoji category (e.g., subset-sequence-indicia icons 6000, FIG. 6A).

The respective emoji category contains a number of subsets of emoji character keys that are configured to be separately displayed as a sequence of subsets of emoji character keys in the keyboard display area. For example, the nature emoji category in FIGS. 6A-6C contains three subsets of emoji character keys that are configured to be separately displayed as a sequence of subsets of emoji character keys in the keyboard display area 5005, namely first subset 6015 in FIG. 6A, second subset 6020 in FIG. 6B, and third subset 6040 in FIG. 6C.

Figure 6C:
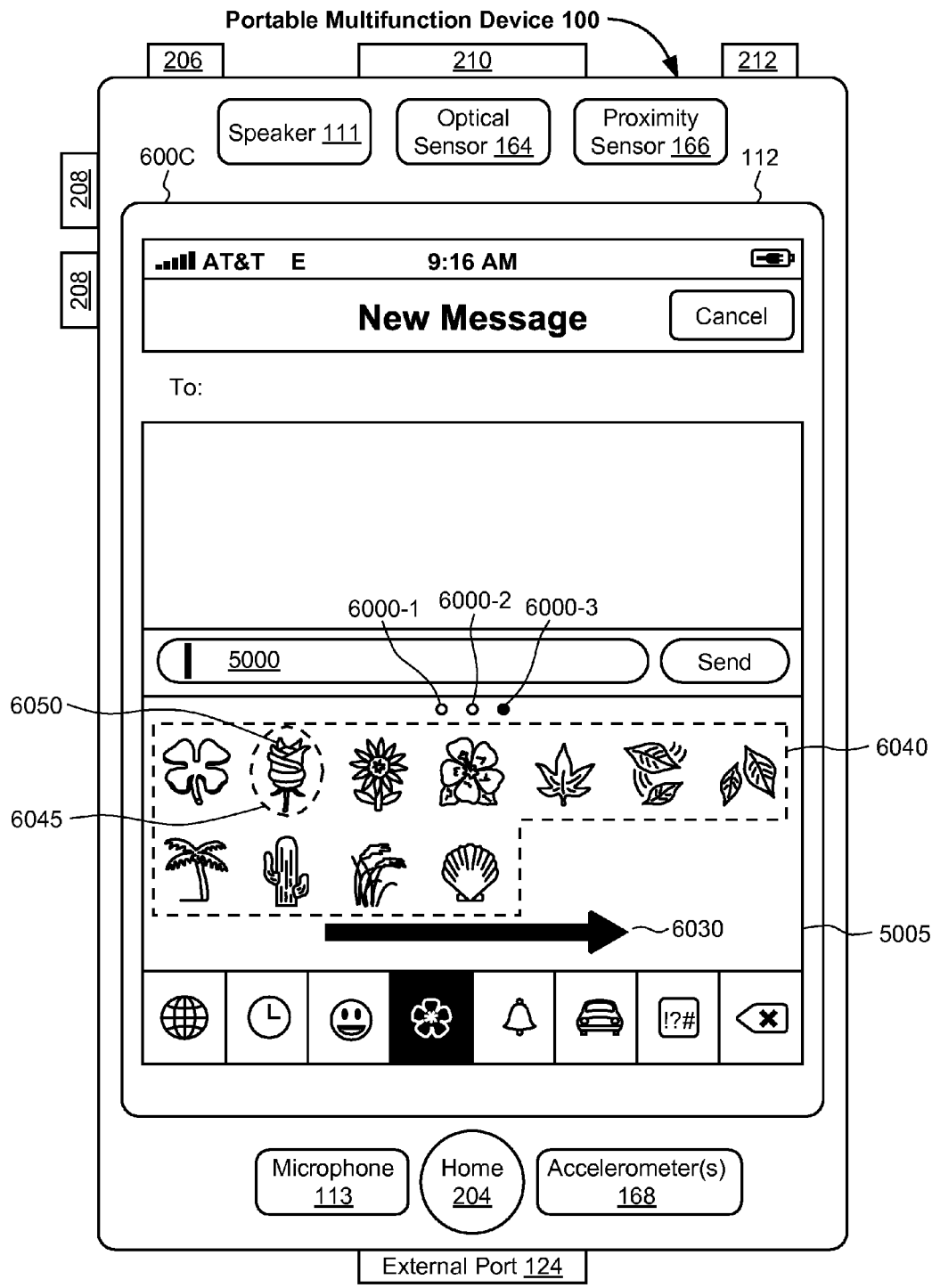

The subset-sequence-indicia icons provide information about the number of subsets in the respective emoji category, as well as a position of a displayed subset in the sequence of subsets of emoji character keys in the keyboard display area. For example, in FIGS. 6A-6C, subset-sequence-indicia icons 6000-1, 6000-2, and 6000-3 indicate that are three subsets of emoji character keys in the nature emoji category 5010-3. In addition, icon 6000-1 is highlighted when the first subset 6015 is displayed (FIG. 6A); icon 6000-2 is highlighted when the second subset 6020 is displayed (FIG. 6B); and icon 6000-3 is highlighted when the third subset 6040 is displayed (FIG. 6C). In some embodiments, the subset-sequence-indicia icons have simple geometric shapes, such as circles, squares, rectangles, or stars.

In some embodiments, the emoji character keys in at least one emoji category are ordered (1216) in accordance with emoji character usage data. In some embodiments, the emoji character usage data includes emoji character usage data from software applications running on the portable electronic device (1218). In some embodiments, the emoji character usage data includes emoji character usage data received (e.g., downloaded) from a service provider of the portable electronic device (1220). In some embodiments, emoji character keys in at least one emoji category are ordered in accordance with emoji character popularity data (1222).

In some embodiments, the subset-sequence-indicia icons are displayed (1224) in the keyboard display area (e.g., subset-sequence-indicia icons 6000 are displayed in area 5005, FIG. 6A).

While displaying the first subset of emoji character keys for the respective emoji category in the keyboard display area, the device detects (1226) a gesture in the keyboard display area. For example, the device detects a horizontal or substantially horizontal finger swipe gesture 6010 in area 5005 (FIG. 6A).

In response to detecting the gesture in the keyboard display area, the device replaces the display of the first subset of emoji character keys for the respective emoji category with a display of a second subset of emoji character keys for the respective emoji category in the keyboard display area and updates the information provided by the subset-sequence-indicia icons to reflect the replacement of the displayed first subset of emoji character keys by the second subset of emoji character keys (1228). For example, in response to detecting horizontal finger swipe gesture 6010 in the keyboard display area 5005, the device replaces the display of the first subset of emoji character keys 6015 (FIG. 6A) for the nature emoji category with a display of a second subset of emoji character keys 6020 for the nature emoji category (FIG. 6B) in the keyboard display area 5005 and updates the information provided by the subset-sequence-indicia icons 6000 to reflect the replacement of the displayed first subset of emoji character keys 6015 by the second subset of emoji character keys 6020. Updating the information provided by the subset-sequence-indicia icons may include, without limitation, highlighting or otherwise visually distinguishing a subset-sequence-indicia icon that corresponds to the second subset of emoji character keys and ceasing to highlight or otherwise visually distinguish another subset-sequence-indicia icon that corresponds to the first subset of emoji character keys (e.g., highlighting icon 6000-2 and ceasing to highlight icon 6000-1 in FIG. 6B).

In some embodiments, replacing the display of the first subset of emoji character keys for the respective emoji category with a display of the second subset of emoji character keys for the respective emoji category in the keyboard display area comprises displaying (1230) an animation of the first subset of emoji character keys moving off the touch screen display. For example, between FIGS. 6A and 6B, an animation may be displayed of subset 6015 moving off the touch screen display 112.

In some embodiments, replacing the display of the first subset of emoji character keys for the respective emoji category with a display of the second subset of emoji character keys for the respective emoji category in the keyboard display area comprises displaying (1232) an animation of the second subset of emoji character keys moving on the touch screen display. For example, between FIGS. 6A and 6B, an animation may be displayed of subset 6020 moving on the touch screen display 112.

In some embodiments, replacing the display of the first subset of emoji character keys for the respective emoji category with a display of the second subset of emoji character keys for the respective emoji category in the keyboard display area comprises displaying an animation of the first subset of emoji character keys moving off the touch screen display and displaying an animation of the second subset of emoji character keys moving on the touch screen display (1234). For example, between FIGS. 6A and 6B, an animation may be displayed of subset 6015 moving off the touch screen display 112 and subset 6020 moving on the touch screen display 112.

In some embodiments, the device detects a gesture in the keyboard display area while displaying the second subset of emoji character keys for the respective emoji category in the keyboard display area. For example, the device detects a horizontal or substantially horizontal finger swipe gesture 6025 in area 5005 while displaying subset 6020 (FIG. 6B). In response to detecting the gesture (e.g., gesture 6025) in the keyboard display area, the device replaces the display of the second subset of emoji character keys for the respective emoji category with a display of a third subset of emoji character keys for the respective emoji category in the keyboard display area (1236). Also in response to detecting the gesture (e.g., gesture 6025) in the keyboard display area, the device updates the information provided by the subset-sequence-indicia icons to reflect the replacement of the displayed second subset of emoji character keys by the third subset of emoji character keys (1236). For example, in response to detecting horizontal finger swipe gesture 6025 in the keyboard display area 5000, the device replaces the display of the second subset of emoji character keys 6020 (FIG. 6B) for the nature emoji category with a display of a third subset of emoji character keys 6040 for the nature emoji category (FIG. 6C) in the keyboard display area 5005 and updates the information provided by the subset-sequence-indicia icons 6000 to reflect the replacement of the displayed second subset of emoji character keys 6020 by the third subset of emoji character keys 6040. Updating the information may include, without limitation, highlighting or otherwise visually distinguishing a subset-sequence-indicia icon that corresponds to the third subset of emoji character keys and ceasing to highlight or otherwise visually distinguish another subset-sequence-indicia icon that corresponds to the second subset of emoji character keys (e.g., highlighting icon 6000-3 and ceasing to highlight icon 6000-2 in FIG. 6C).

In some embodiments, the gesture detected while displaying the second subset of emoji character keys is a swipe gesture in a first direction (e.g., right-to-left swipe gesture 6025, FIG. 6B). In response to the device detecting a second swipe gesture on the touch screen display in the keyboard display area in a direction that is substantially opposite the first direction (e.g., left-to-right swipe gesture 6030, FIG. 6C), the device replaces display of the third subset of emoji character keys for the respective emoji category with display of the second subset of emoji character keys for the respective emoji category in the keyboard display area and updates the information provided by the subset-sequence-indicia icons to reflect the replacement of the displayed third subset of emoji character keys by the second subset of emoji character keys (e.g., highlighting or otherwise visually distinguishing a subset-sequence-indicia icon that corresponds to the second subset of emoji character keys and ceasing to highlight or otherwise visually distinguish another subset-sequence-indicia icon that corresponds to the third subset of emoji character keys) (1238). For example, in response to detecting a swipe gesture 6030 (FIG. 6C) on the touch screen display in the keyboard display area 5005 in a direction that is substantially opposite the direction of gesture 6025 (FIG. 6B), the device replaces display of the third subset of emoji character keys 6040 for the nature emoji category with display of the second subset of emoji character keys 6020 for the nature emoji category in the keyboard display area 5005 and updates the information provided by the subset-sequence-indicia icons 6000 to reflect the replacement of the displayed third subset of emoji character keys by the second subset of emoji character keys (e.g., highlighting or otherwise visually distinguishing subset-sequence-indicia icon 6000-2 that corresponds to the second subset of emoji character keys 6020 and ceasing to highlight or otherwise visually distinguish subset-sequence-indicia icon 6000-3 that corresponds to the third subset of emoji character keys 6040).

Figure 5G:
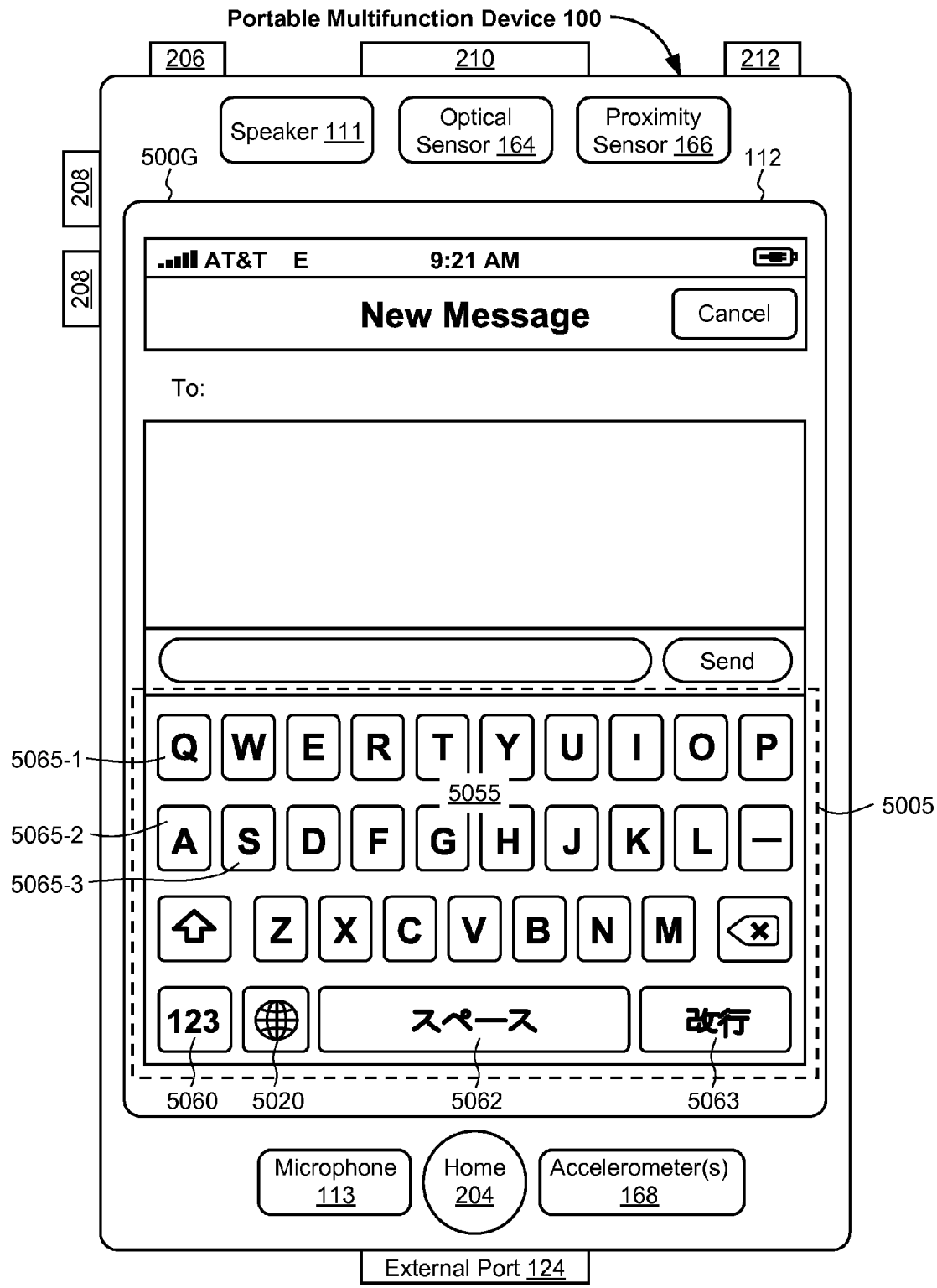

In some embodiments, the device displays a keyboard selection icon (e.g., icon 5020, FIG. 6B). In some embodiments, the keyboard selection icon 5020 is simultaneously displayed with the plurality of emoji category icons 5010 (e.g., in a predefined area 5009 along the bottom of the touch screen display). The device detects a gesture on the keyboard selection icon (e.g., finger tap gesture 6055, FIG. 6B). After detecting the gesture on the keyboard selection icon, the devices replaces display of the second subset of emoji character keys for the respective emoji category with display of a text character input keyboard in the keyboard display area (1240). For example, after detecting tap gesture 6055 on the keyboard selection icon 5020, the device replaces display of the second subset of emoji character keys 6020 (FIG. 6B) for the nature emoji category with display of a text character input keyboard 5055 in the keyboard display area 5005 (FIG. 5G). In some embodiments, the second subset of emoji character keys 6020 is replaced by the text character input keyboard 5055 in response to detecting the gesture 6055. In some embodiments, one or more intermediate text character input keyboard selection UIs are shown before a particular text character input keyboard (e.g., an alphanumeric keyboard, a kana keyboard, or a kanji keyboard) is selected and displayed in area 5005.

In some embodiments, the device receives one or more words input by the user with the text character input keyboard (e.g., keyboard 5055, FIG. 5G). The device displays the one or more words input by the user in the character input area 5000. In response to receiving the one or more words input by the user with the text character input keyboard, the device determines a recommended emoji character based at least in part on the one or more words input by the user, and the device displays the recommended emoji character on the touch screen display (1242). The determination of the recommended emoji character is based on words input by a user, not punctuation input by the user. For example, if the user types the word "rain," an emoji character of an umbrella and/or raindrops may be recommended. Similarly, if the user types the word "fly," an emoji character of an airplane may be recommended. In some embodiments, a single emoji character is recommended. In other embodiments, a plurality of emoji characters are recommended. In some embodiments, the device detects a gesture on the touch screen display (e.g., a tap gesture on a space bar in the text character input keyboard or a tap gesture on the recommended emoji character). In response to detecting that gesture, the device inserts and displays the recommended emoji character after the one or more words input by the user in the character input area (1244).

In some embodiments, the device displays the keyboard selection icon 5020 while the text character input keyboard 5055 is displayed in the keyboard display area 5005 (FIG. 5G). Then, after detecting a gesture on the keyboard selection icon 5020, such as a finger tap gesture, the device replaces the display of the text character input keyboard 5055 with a simultaneous display of the second subset of emoji character keys 6020 (FIG. 6B) for the respective emoji category in the keyboard display area and the corresponding subset-sequence-indicia icons 6000 (1246). In some embodiments, the text character input keyboard 5055 is replaced by the second subset of emoji character keys 6020 in response to detecting the gesture. In some embodiments, one or more intermediate emoji keyboard selection UIs are shown before a particular subset of emoji character keys is selected and displayed in area 5005. In some embodiments, in response to detecting a gesture on the keyboard selection icon 5020, the device toggles between displaying a text character input keyboard and the most recently displayed subset of emoji character keys.

Figure 6D:
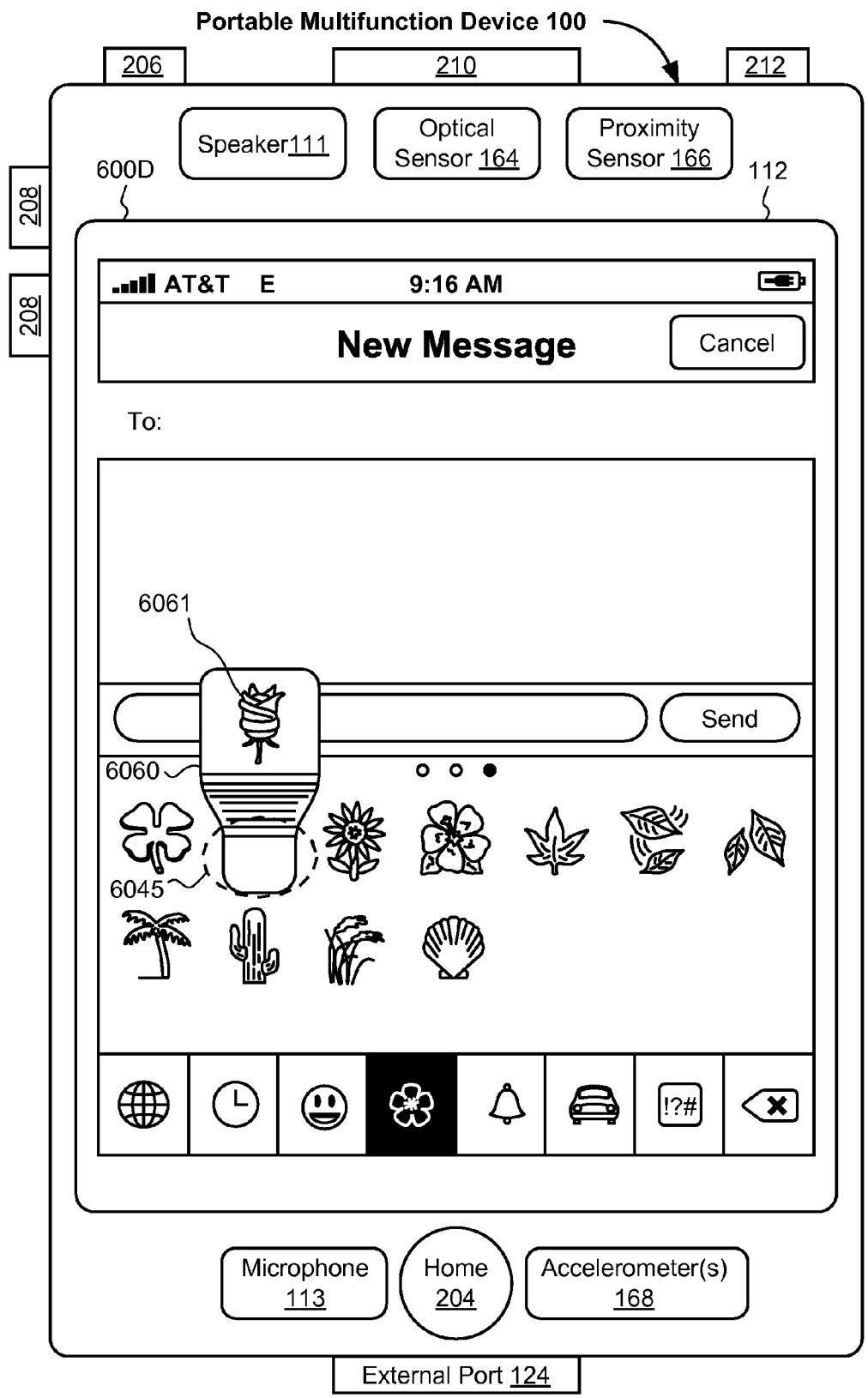
Figure 6E:
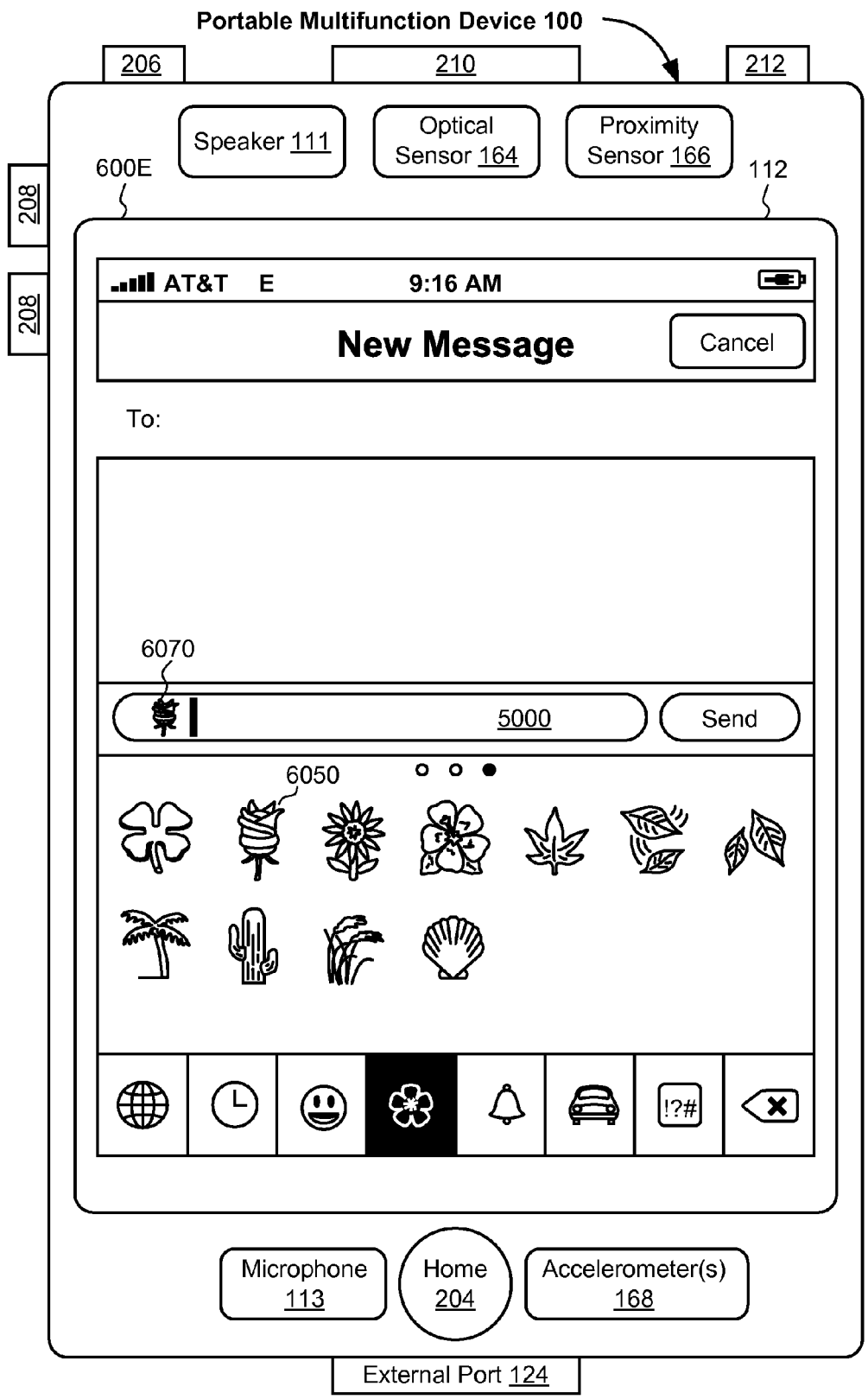
Figure 7A:
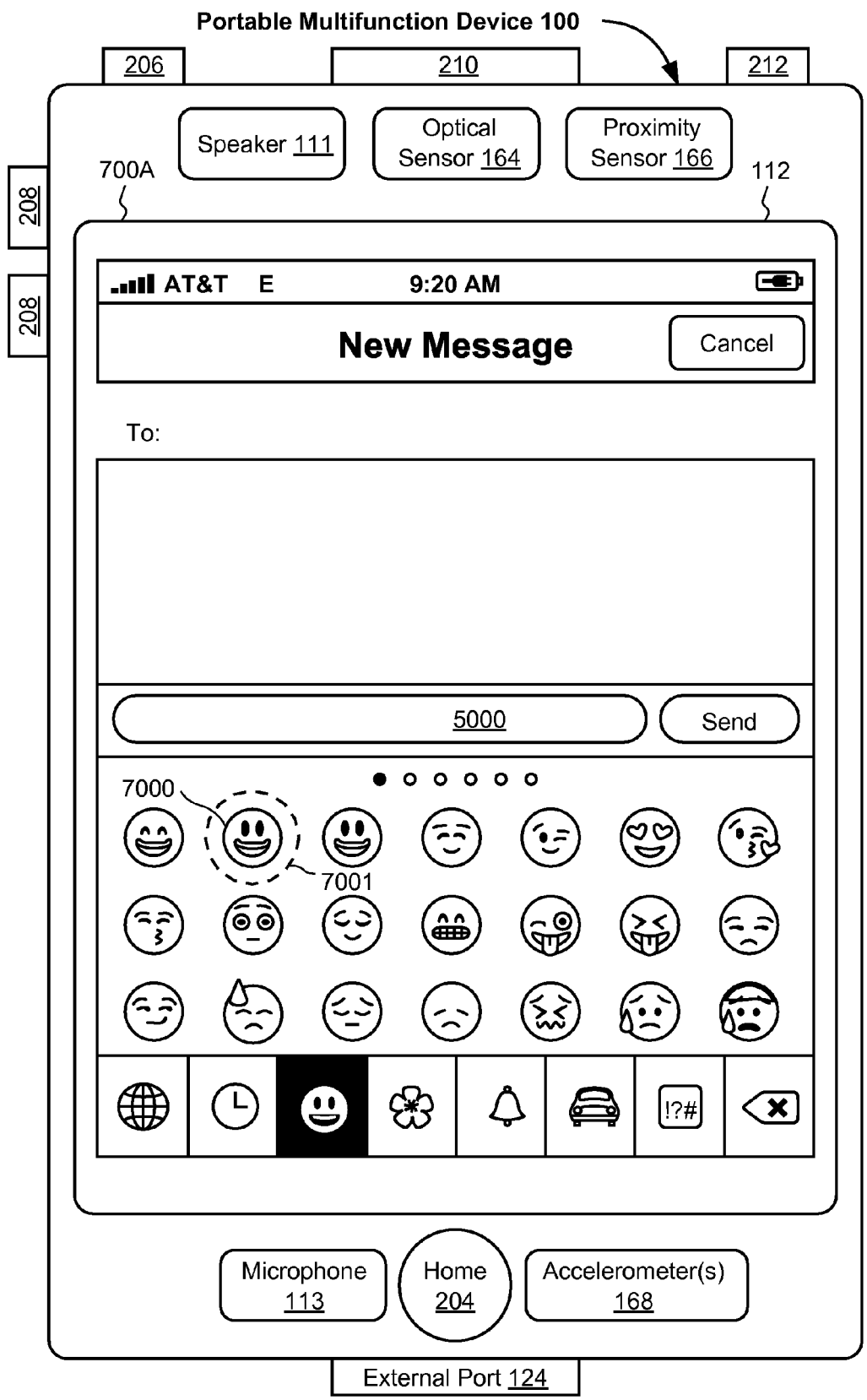
FIGS. 7A-7E illustrate exemplary user interfaces for inputting an emoji character and sending an electronic message that includes the emoji character on a portable electronic device equipped with a touch-sensitive display in accordance with some embodiments.
Figure 7B:
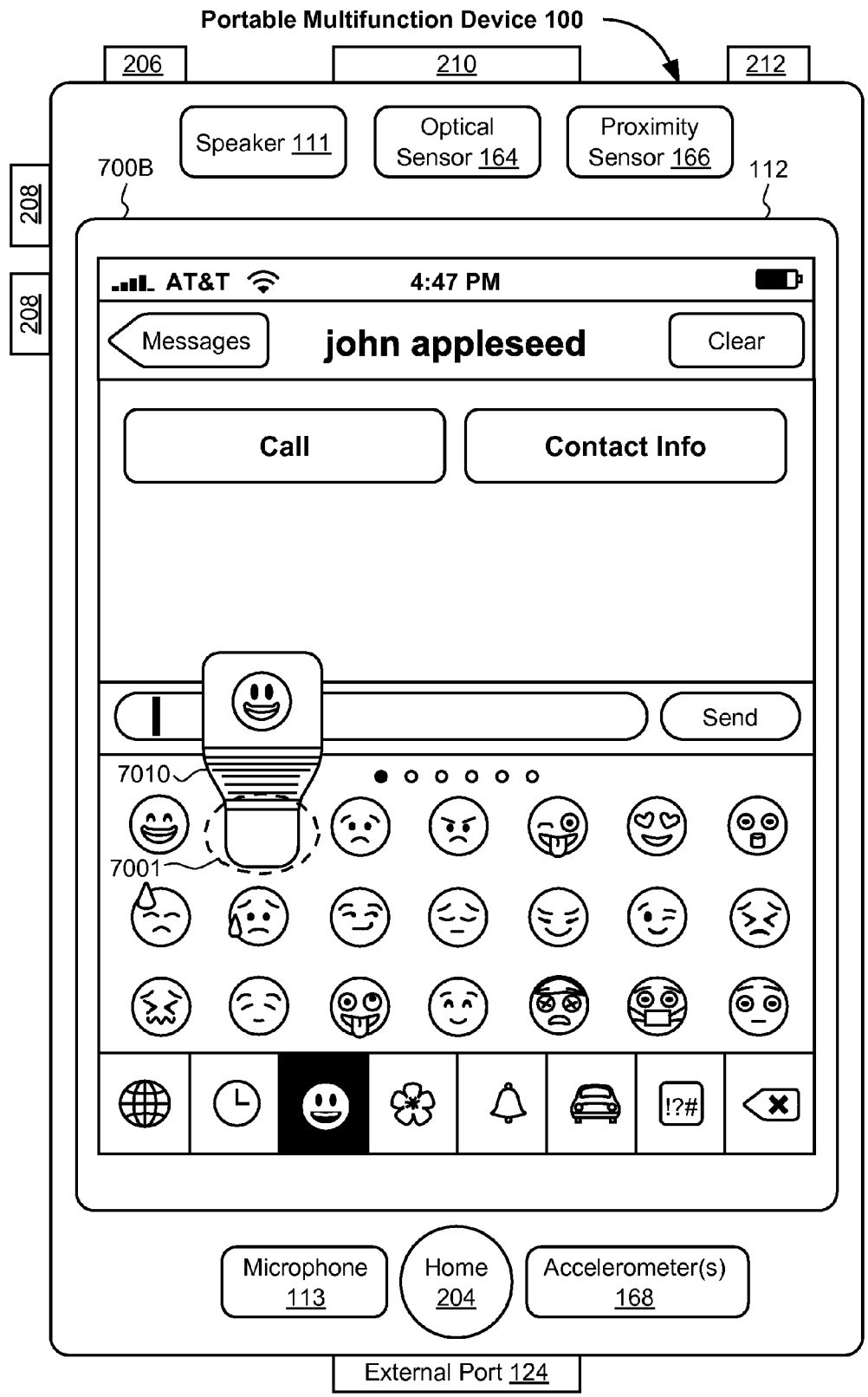
Figure 7C:
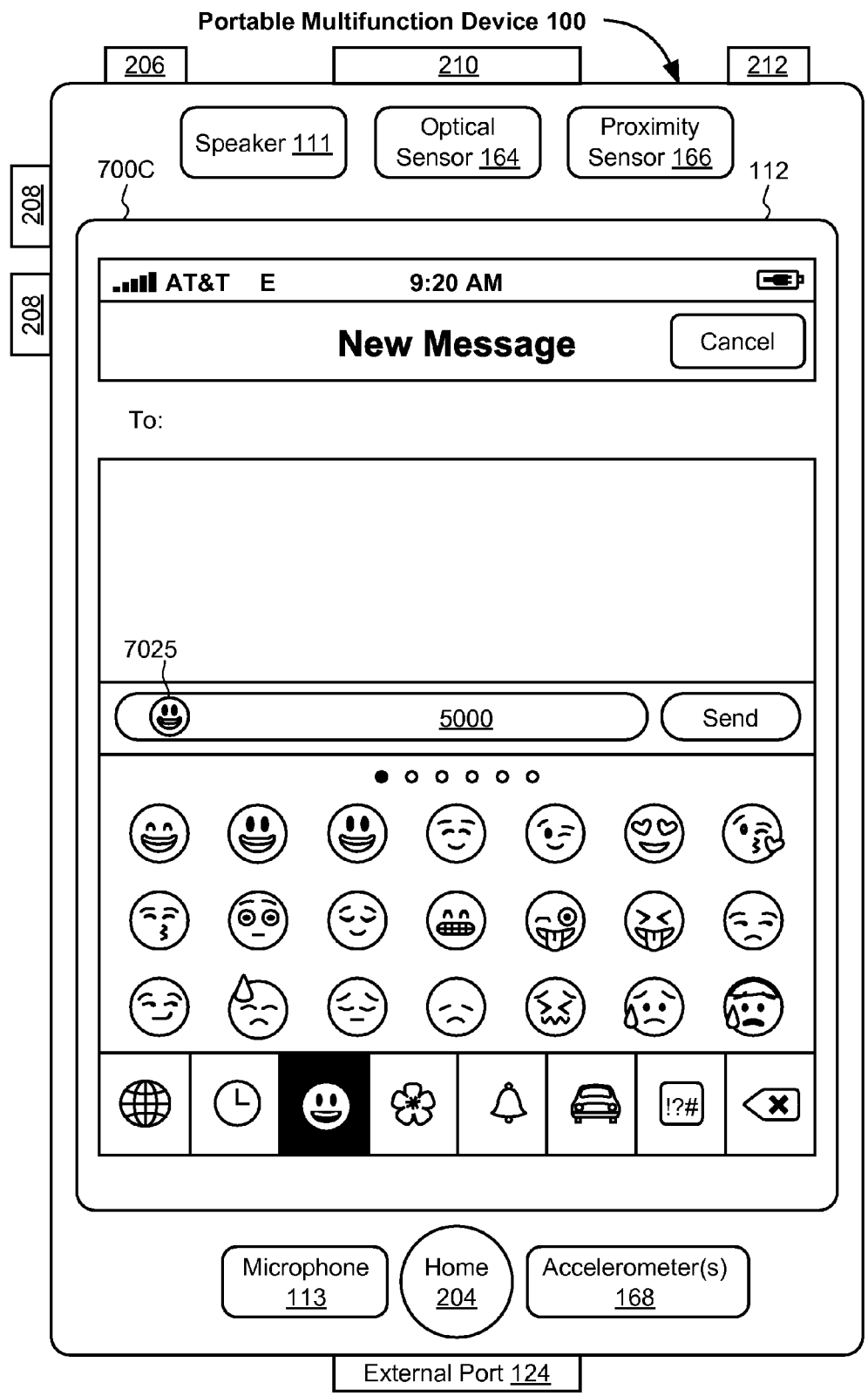
Figure 7D:
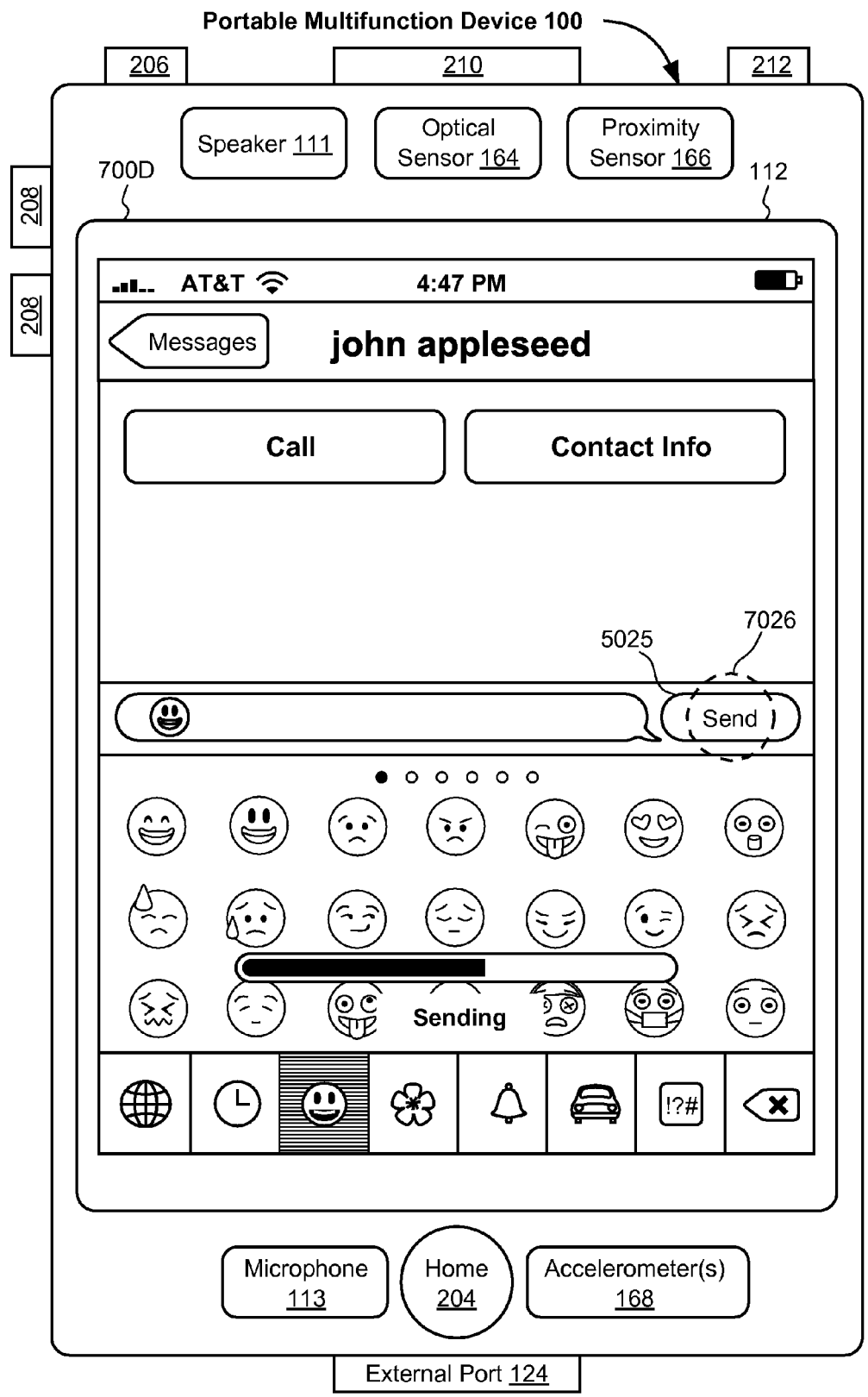
Figure 7E:
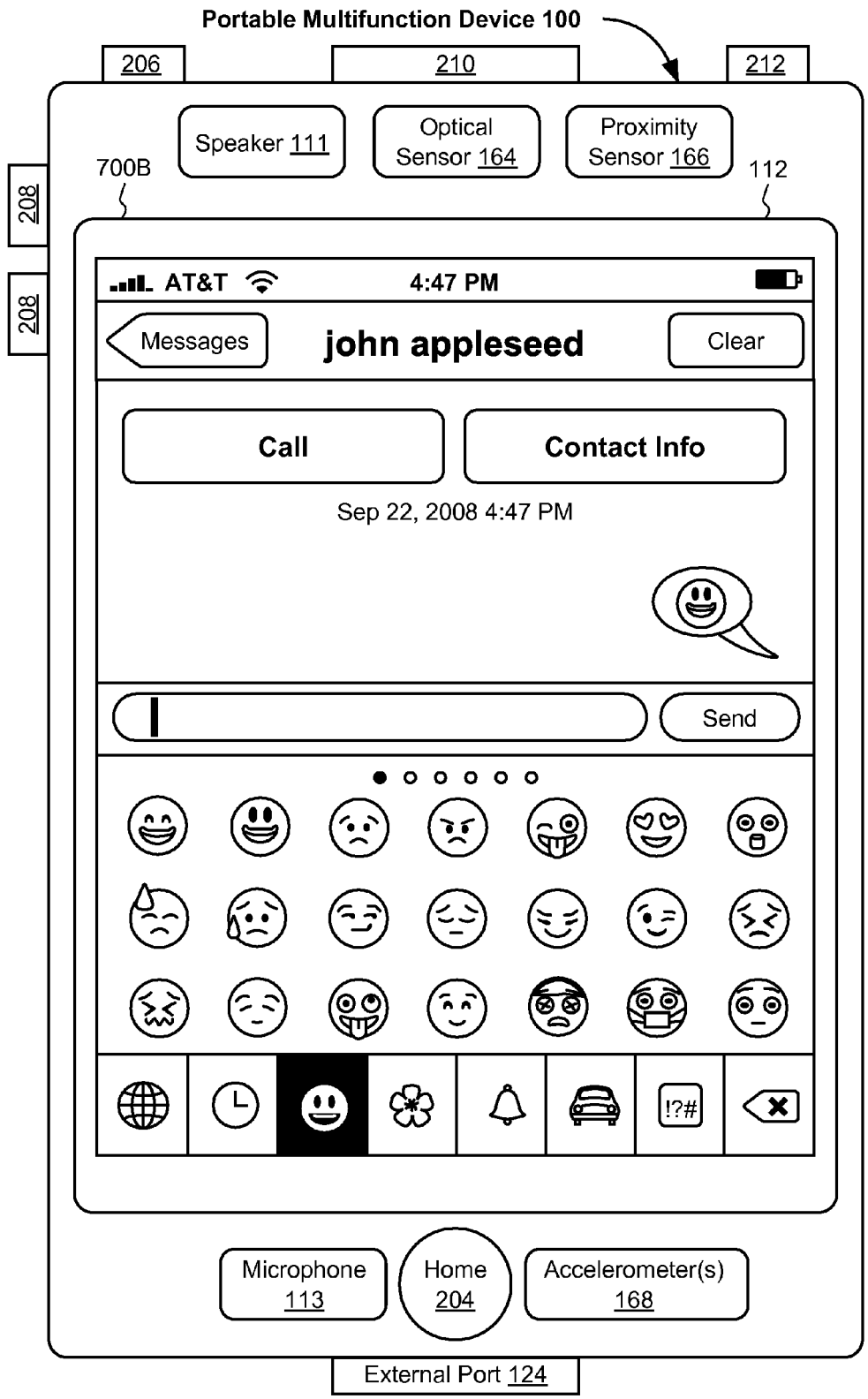

In some embodiments, the device detects a gesture on a respective emoji character key in the second subset of emoji character keys. In response to detecting the gesture on the respective emoji character key in the second subset of emoji character keys, the device inserts and displays a corresponding emoji character in the character input area (1248). For example, in response to detecting a tap gesture on an emoji character key in the second subset of emoji character keys 6020, the device inserts and displays a corresponding emoji character in the character input area 5000. FIGS. 6C-6E illustrate an analogous insertion and display of an emoji character in input area 5000 from the third subset of emoji characters 6040. Additional emoji characters may be inserted and displayed in the character input area 5000 in response to detecting gestures on additional emoji character keys.

In some embodiments, the device detects a predefined user action for initiating a predefined user interface reconfiguration process (e.g., pressing and holding a finger contact on an emoji character key for greater than a predetermined time period). In response to detecting the predefined user action, the device varies the positions of two or more emoji character keys in the second subset of emoji character keys. The varying includes varying the positions of each emoji character key of the two or more emoji character keys about a respective average position distinct from the respective average positions of other emoji character keys of the two or more emoji character keys (1249). For example, in response to detecting a finger contact on any emoji character key 8001 (FIG. 8A) for greater than a predetermined time period (e.g., 1 second), the device varies the positions of all the emoji character keys in the subset of emoji character keys 8002 (FIG. 8A, which corresponds to subset 6020 in FIG. 6B).

In some embodiments, each respective emoji character key of the two or more emoji character keys oscillates (1250) in a region substantially centered on the respective average position of the respective emoji character key (as illustrated in FIG. 8B).

In some embodiments, the device detects the user making a point of contact with the touch screen display at a first position corresponding to a first emoji character key in the second subset of emoji character keys, and also detects movement of the point of contact to a second position on the touch screen display. In response to these two detections, the device displays movement of the first emoji character key to the second position on the touch screen display in accordance with the detected movement of the point of contact (1252). For example, in response to detecting the user making a point of contact 8050 (FIG. 8B) with the touch screen display at a position corresponding to emoji character key 8001-2, and also detecting movement of the point of contact 8050 to a second position 825 on the touch screen display, the device displays movement of emoji character key 8001-2 to the second position 825 on the touch screen display in accordance with the detected movement of the point of contact.

In some embodiments, the device fixes (1254) a position of the first emoji character key (e.g., 8000-2, FIG. 8C) at the second position in response to detecting a second predefined user action for terminating the predefined user interface reconfiguration process (e.g., detecting activation of the home button 204).

Figure 13:
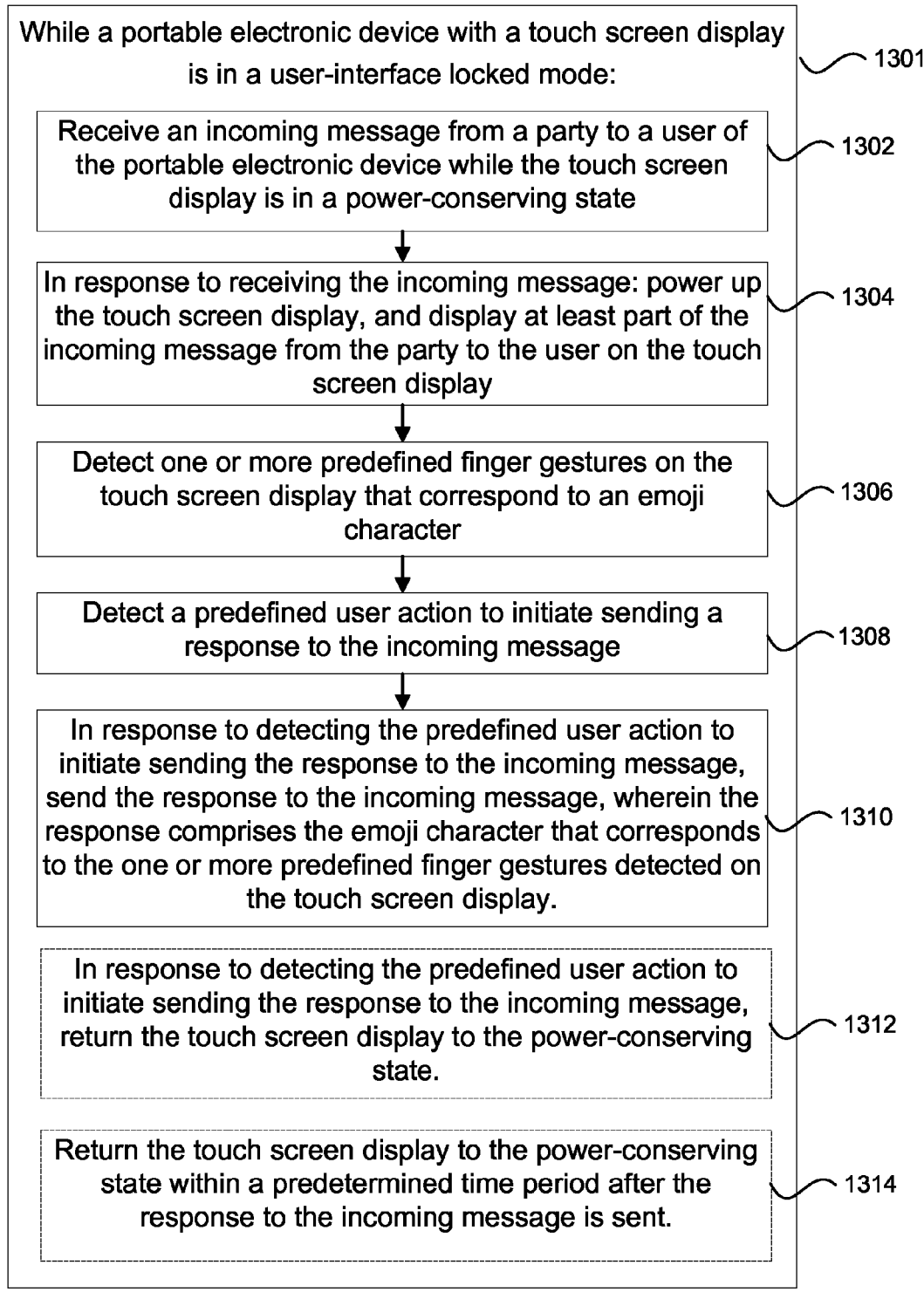
FIG. 13 is a flow diagram illustrating a method for responding to messages with emoji while a portable electronic device equipped with a touch-sensitive display is in a user-interface locked mode in accordance with some embodiments.

FIG. 13 is a flow diagram illustrating a method for responding to messages with emoji while a portable electronic device 100 equipped with a touch-sensitive display 112 is in a user-interface locked mode in accordance with some embodiments. The method 1300 provides a simple and intuitive way for a user to quickly respond to an incoming message while the device is in a locked state, thereby conserving power and increasing the time between battery charges.

Operations 1302-1314 are performed while the portable electronic device 100 is in a user-interface locked mode (1301). The device receives (1302) an incoming message from a party to a user of the portable electronic device while the touch screen display is in a power-conserving state. In the power-conserving state, the touch screen is blank (nothing is displayed) and not touch sensitive.

Figure 9A:
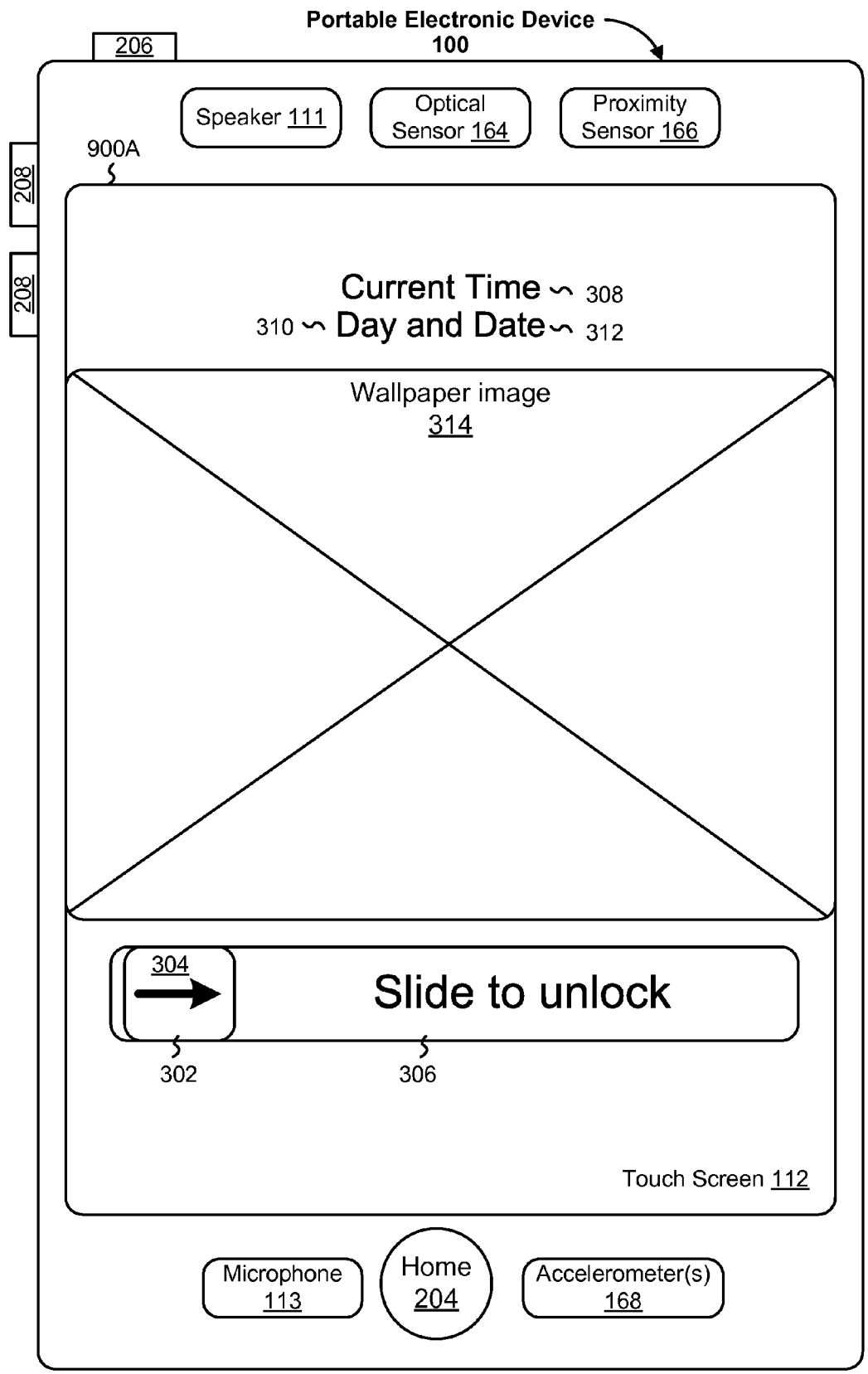
FIGS. 9A-9H illustrate exemplary user interfaces for responding to messages with emoji while a portable electronic device equipped with a touch-sensitive display is in a user-interface locked mode in accordance with some embodiments.
Figure 9B:
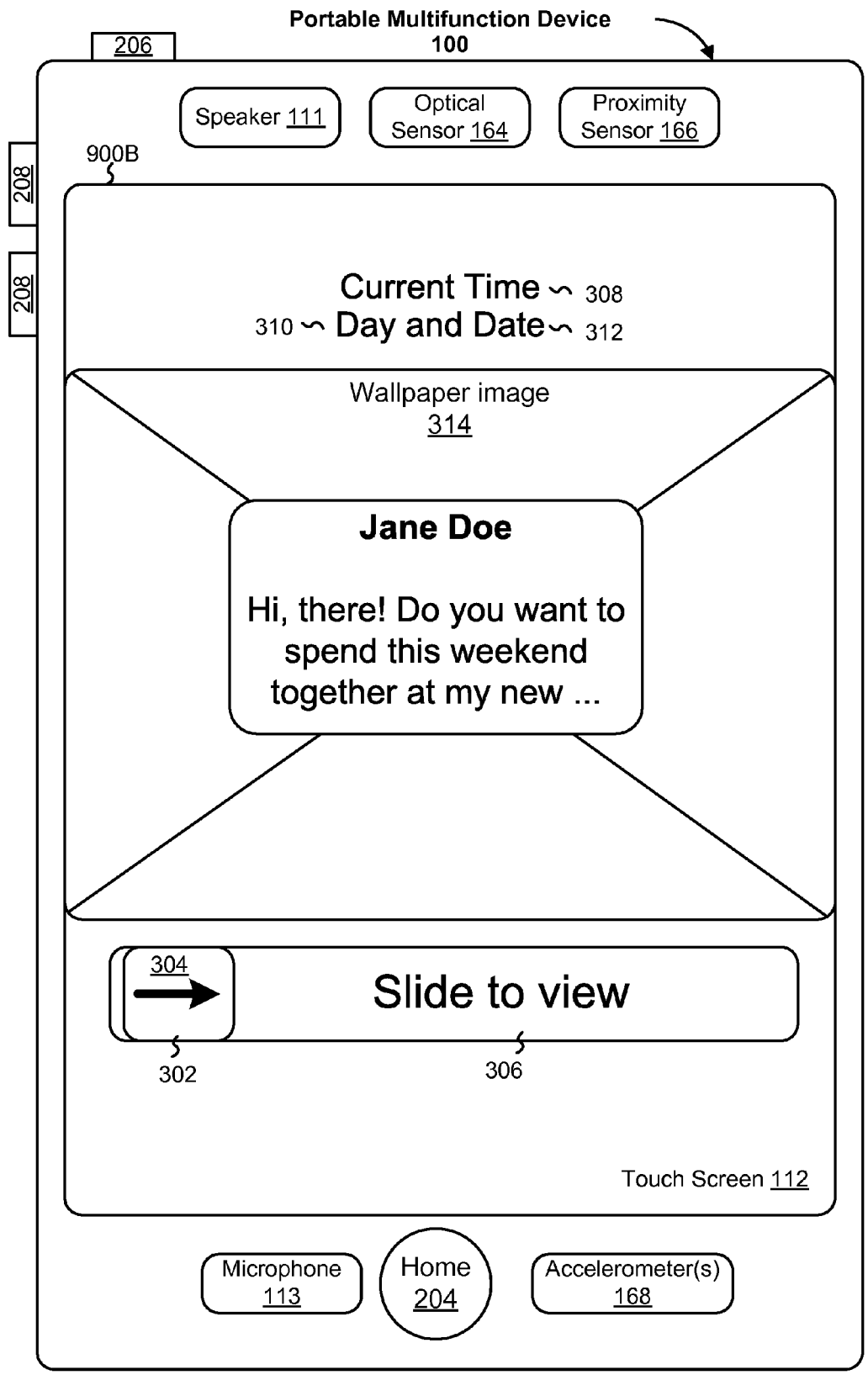
Figure 9C:
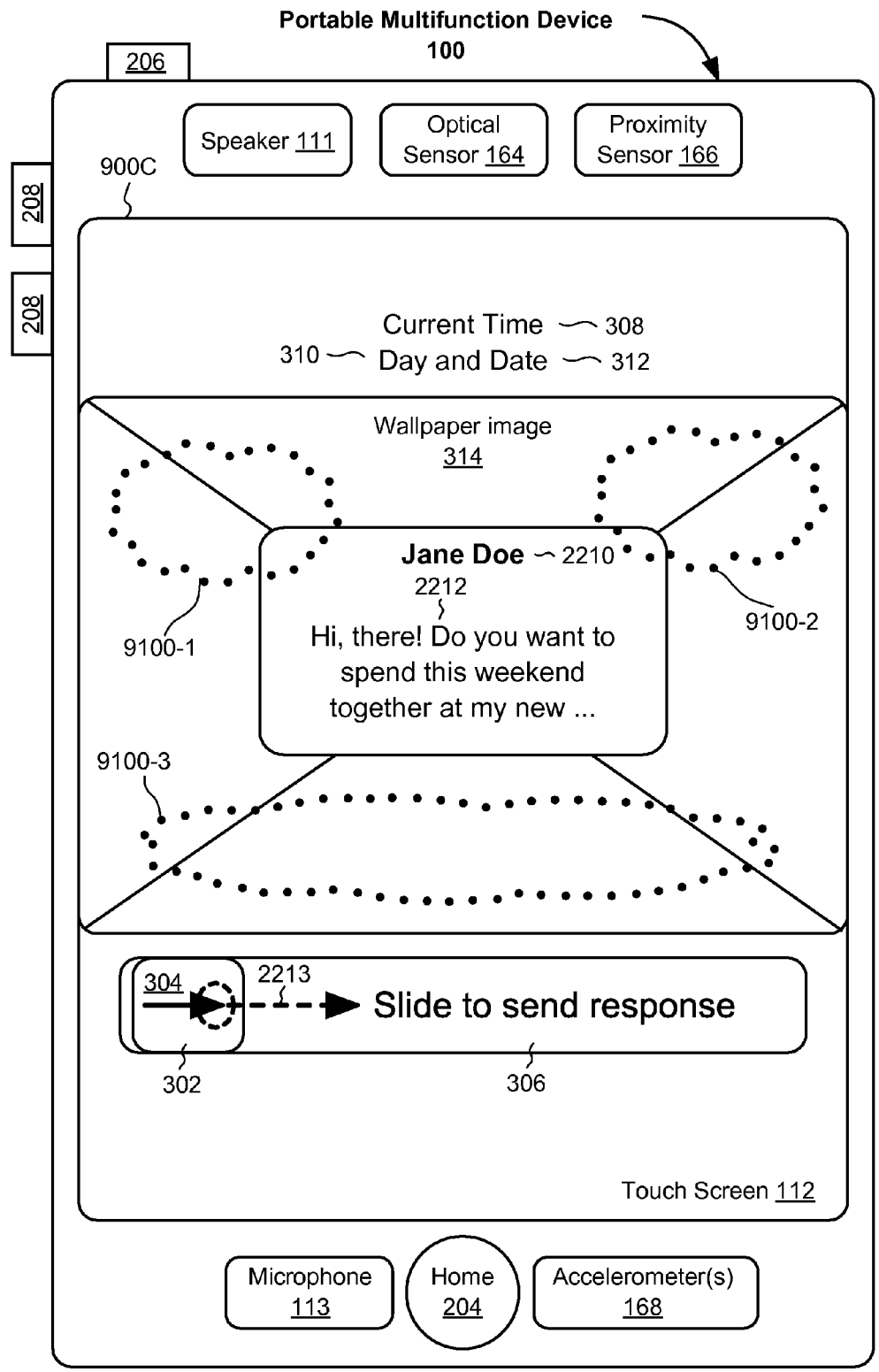
Figure 9D:
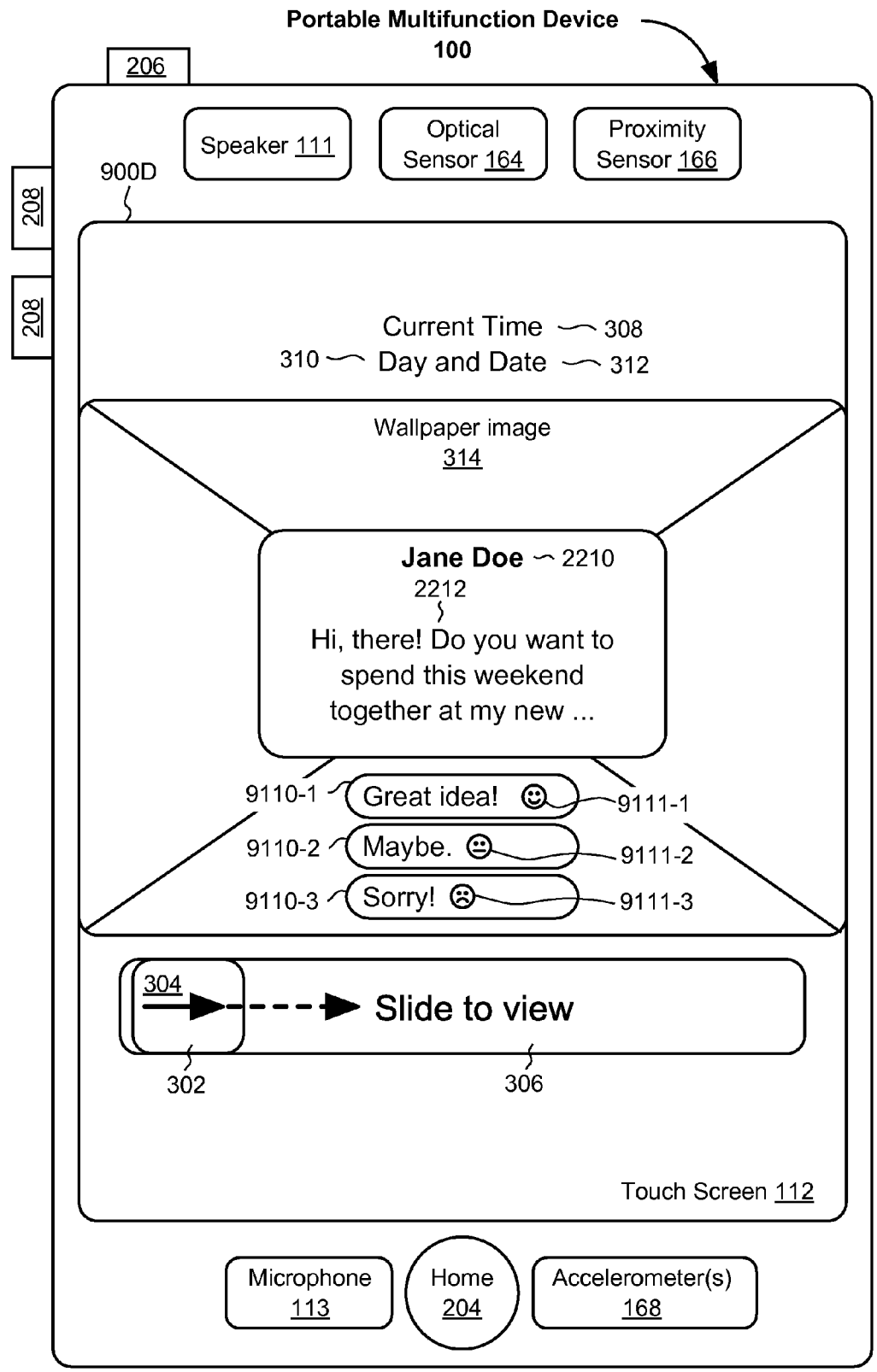

In response to receiving the incoming message, the device powers up (1304) the touch screen display and displays at least part of the incoming message from the party to the user on the touch screen display (e.g., message portion 2212, FIG. 9B). The device detects (1306) one or more predefined finger gestures on the touch screen display that correspond to an emoji character (e.g., gestures 9100-1, 9100-2, and 9100-3 in FIG. 9C). The device detects (1308) a predefined user action to initiate sending a response to the incoming message (e.g., such as detecting activation of the home button 204, detecting activation of a "send" button (not shown), or detecting swipe gesture 2213, FIG. 9C). In response to detecting the predefined user action to initiate sending the response to the incoming message, the device sends (1310) the response to the incoming message. The response comprises the emoji character that corresponds to the one or more predefined finger gestures detected on the touch screen display. For example, the predefined finger gestures 9100-1, 9100-2, and 9100-3 in FIG. 9C may correspond to a smiley face emoji character. One method of associating an emoji with one or more predefined finger gestures is described with respect to FIGS. 10A-10E and FIG. 16 below.

In some embodiments, in response to detecting the predefined user action to initiate sending the response to the incoming message, the device returns (1312) the touch screen display to the power-conserving state. In some embodiments, the device returns (1314) the touch screen display to the power-conserving state within a predetermined time period (e.g., 5-15 seconds) after the response to the incoming message is sent.

Figure 14:
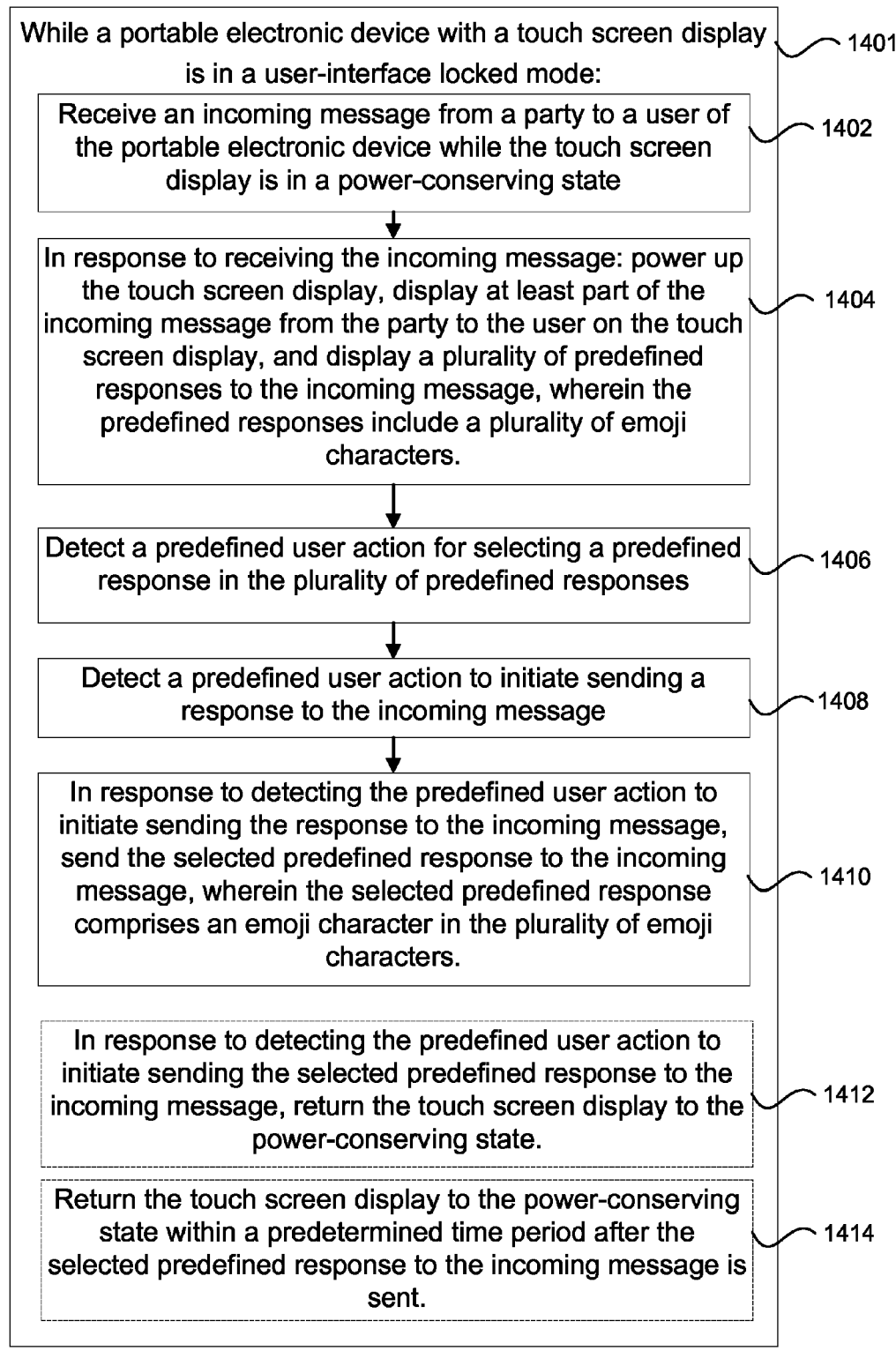
FIG. 14 is a flow diagram illustrating a method for responding to messages with emoji while a portable electronic device equipped with a touch-sensitive display is in a user-interface locked mode in accordance with some embodiments.

FIG. 14 is a flow diagram illustrating another method for responding to messages with emoji while a portable electronic device 100 equipped with a touch-sensitive display 112 is in a user-interface locked mode in accordance with some embodiments. The method 1400 provides a simple and intuitive way for a user to quickly respond to an incoming message while the device is in a locked state, thereby conserving power and increasing the time between battery charges.

Operations 1402-1414 are performed while the portable electronic device 100 is in a user-interface locked mode (1401). The device receives (1402) an incoming message from a party to the user of the portable electronic device while the touch screen display is in a power-conserving state. In the power-conserving state, the touch screen is blank (nothing is displayed) and not touch sensitive.

In response to receiving the incoming message, the device powers up the touch screen display, displays at least part of the incoming message from the party to the user on the touch screen display (e.g., message portion 2212, FIG. 9D), and displays a plurality of predefined responses (e.g., responses 9110 in FIG. 9D or FIG. 9G) to the incoming message (1404). The predefined responses 9110 include a plurality of emoji characters (e.g., emoji characters 9111 in FIG. 9D or just emoji characters in responses 9110 in FIG. 9G).

Figure 9E:
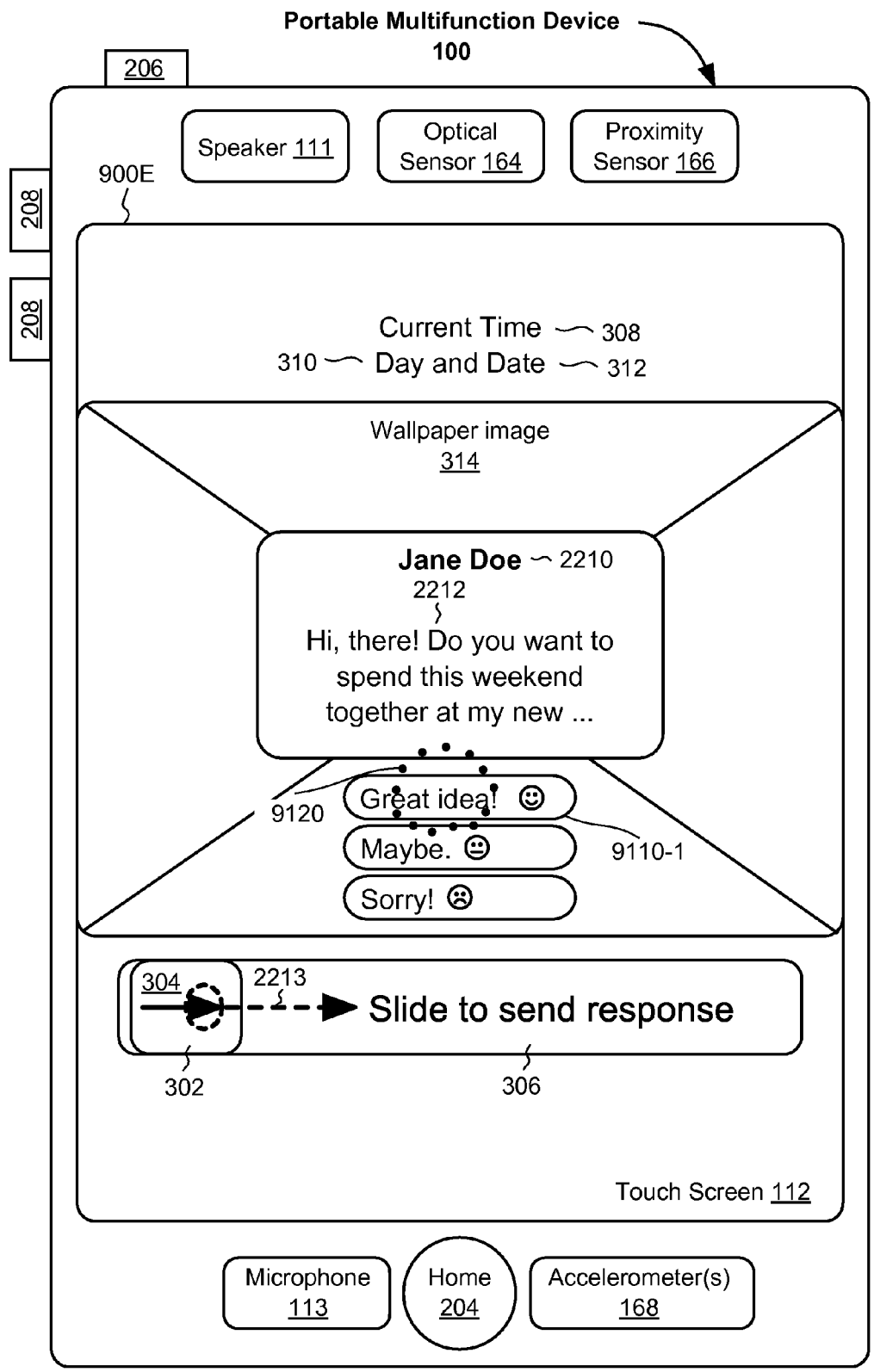
Figure 9F:
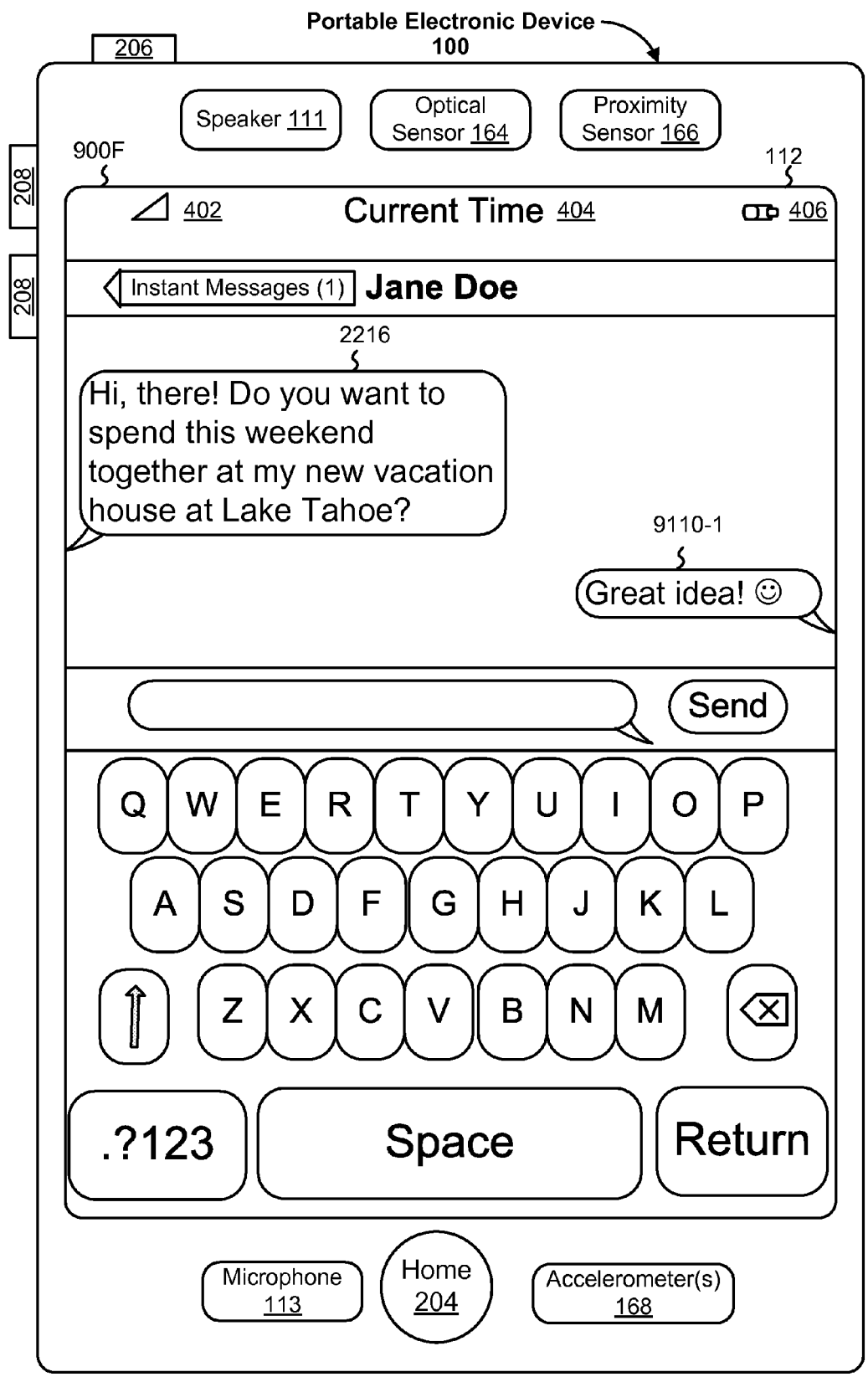
Figure 9G:
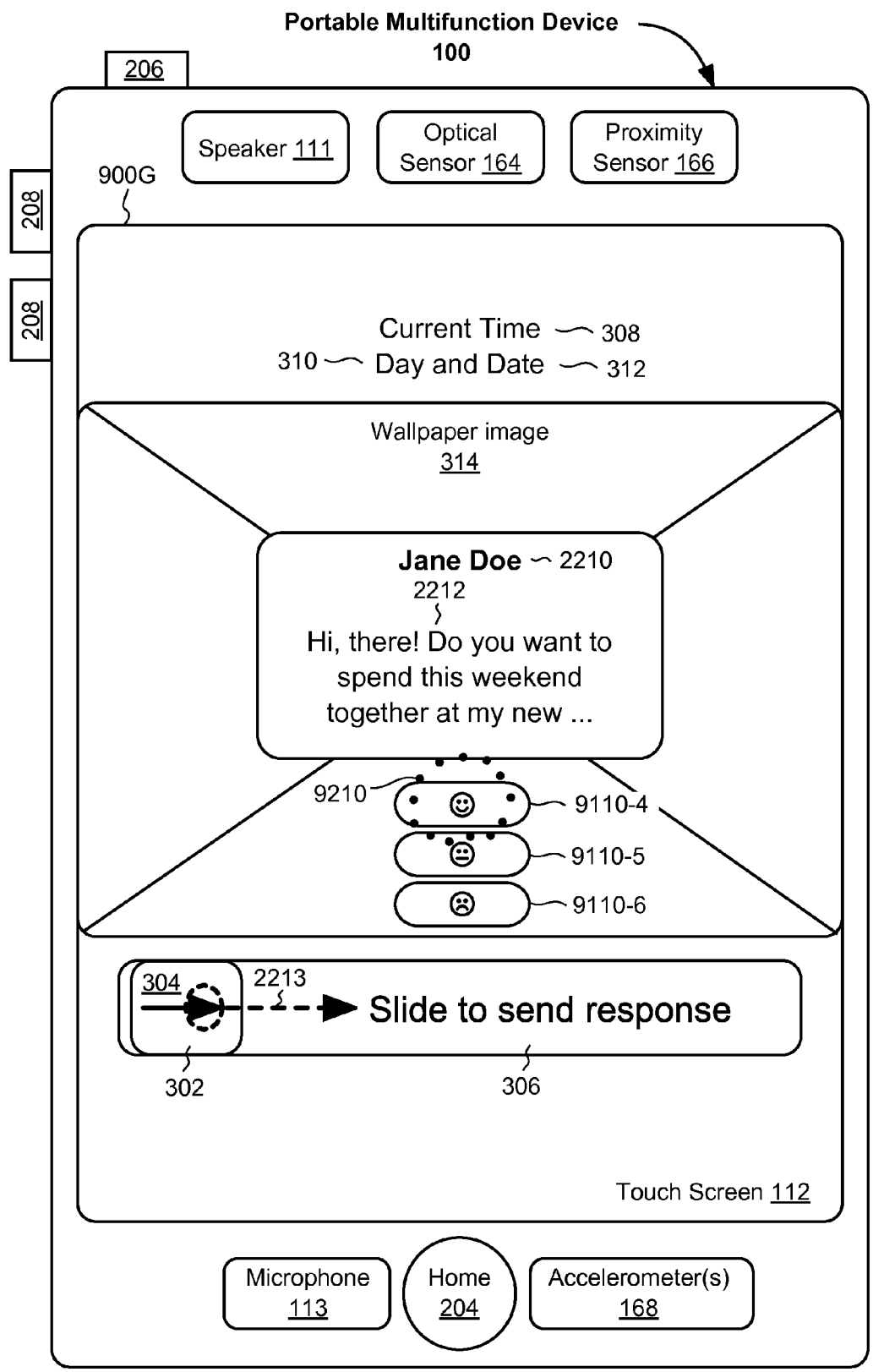
Figure 9H:
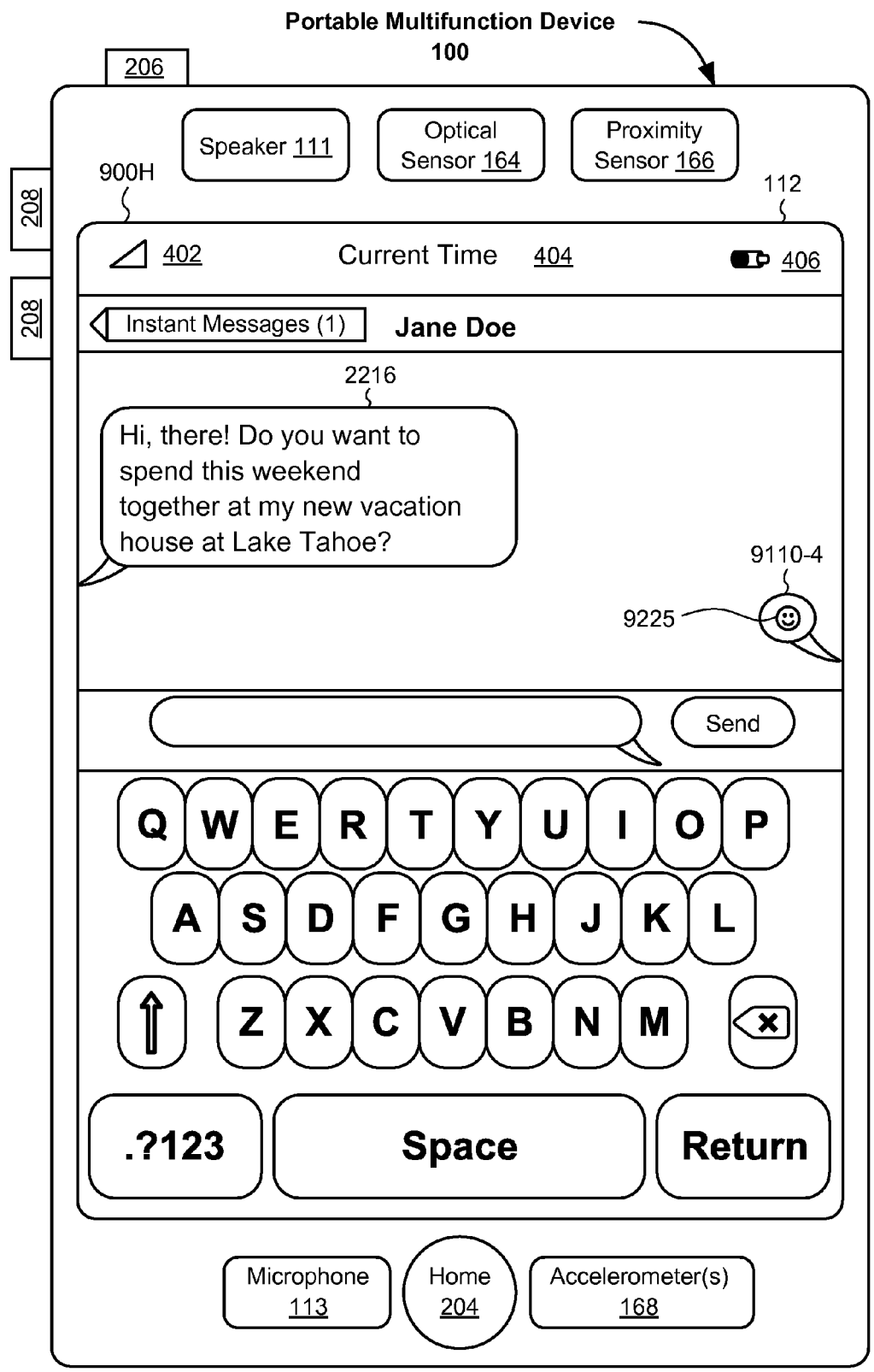

The device detects (1406) a predefined user action for selecting a predefined response in the plurality of predefined responses (e.g., finger tap gesture 9120 on response 9110-1 in FIG. 9E or finger tap gesture 9210 on response 9110-4 in FIG. 9G). The device detects (1408) a predefined user action to initiate sending a response to the incoming message. In some embodiments, detecting selection of a predefined response 9110 also initiates sending of the predefined response, without detecting any further action by the user. In some embodiments, after detecting selection of a predefined response 9110, a further predefined user action is detected to initiate sending the response, such as detecting activation of the home button 204, detecting activation of a "send" button (not shown), or detecting a sliding finger gesture 2213, which appears to move the unlock image 302 across channel 306 (in which case the "slide to view" message in channel 306 may be changed to a "slide to send response" message or a similar message, FIG. 9E).

In response to detecting the predefined user action to initiate sending the response to the incoming message, the device sends (1410) the response to the incoming message. The selected predefined response 9110 comprises an emoji character (e.g., 9111) in the plurality of emoji characters (1410).

In some embodiments, in response to detecting the predefined user action to initiate sending the selected predefined response to the incoming message, the device returns (1412) the touch screen display to the power-conserving state. In some embodiments, the device returns (1414) the touch screen display to the power-conserving state within a predetermined time period (e.g., 5-15 seconds) after the selected predefined response to the incoming message is sent.

Figure 15:
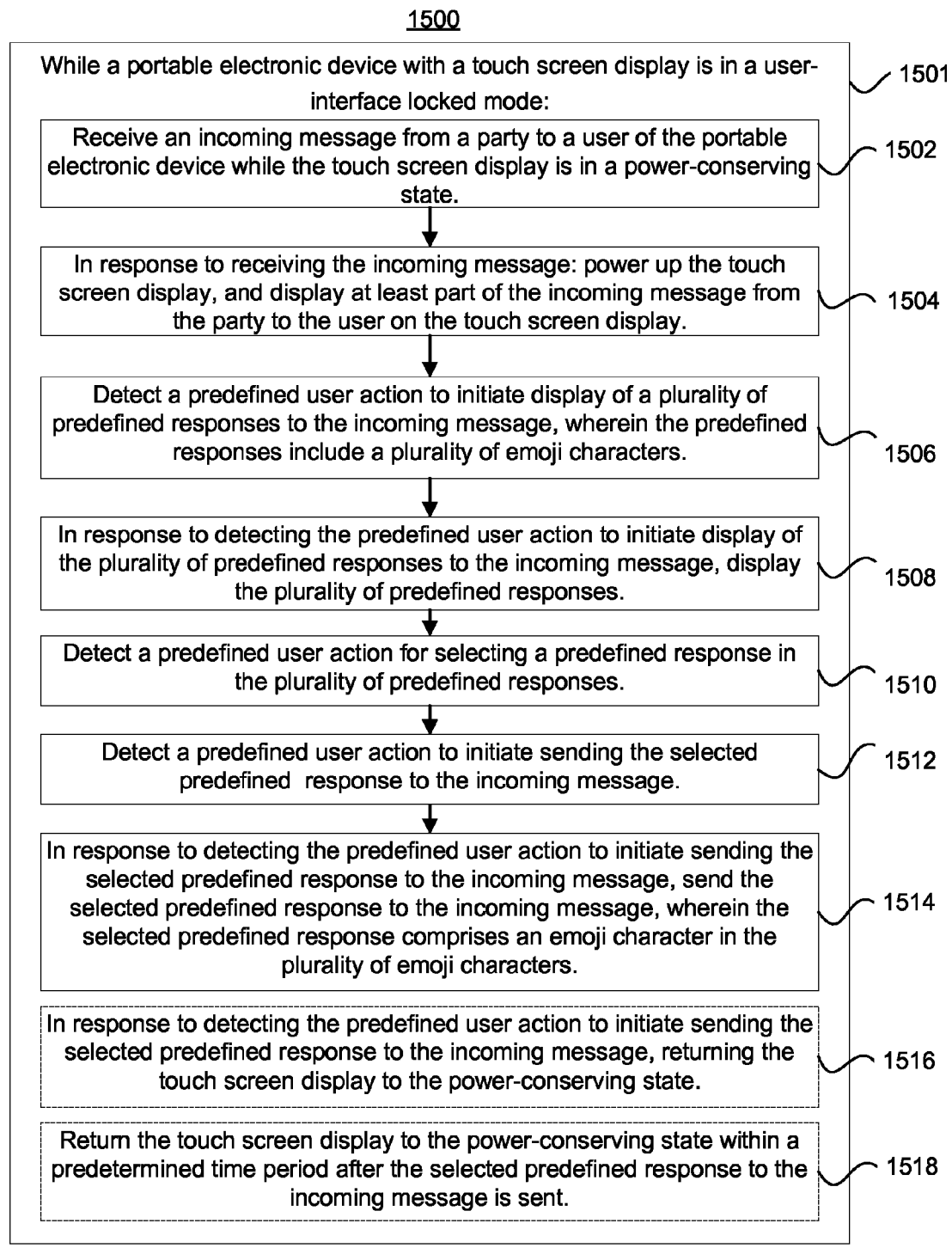
FIG. 15 is a flow diagram illustrating a method for responding to messages with emoji while a portable electronic device equipped with a touch-sensitive display is in a user-interface locked mode in accordance with some embodiments.

FIG. 15 is a flow diagram illustrating another method for responding to messages with emoji while a portable electronic device 100 equipped with a touch-sensitive display 112 is in a user-interface locked mode in accordance with some embodiments. The method 1500 provides a simple and intuitive way for a user to quickly respond to an incoming message while the device is in a locked state, thereby conserving power and increasing the time between battery charges.

Operations 1502-1518 are performed while the portable electronic device 100 is in a user-interface locked mode (1501). The device receives (1502) an incoming message from a party to the user of the portable electronic device while the touch screen display is in a power-conserving state. In the power-conserving state, the touch screen is blank (nothing is displayed) and not touch sensitive.

In response to receiving the incoming message, the device powers up (1504) the touch screen display and displays at least part of the incoming message from the party to the user on the touch screen display (e.g., message portion 2212, FIG. 9B).

The device detects (1506) a predefined user action to initiate display of a plurality of predefined responses 9110 to the incoming message (e.g., a finger tap on a reply icon (not shown) or a double tap gesture on the touch screen 112). The predefined responses include a plurality of emoji characters (e.g., emoji characters 9111 in FIG. 9D and just emoji characters in responses 9110 in FIG. 9G). In response to detecting the predefined user action to initiate display of the plurality of predefined responses to the incoming message, the device displays (1508) the plurality of predefined responses (e.g., responses 9110 in FIG. 9D or FIG. 9G).

The device detects (1510) a predefined user action for selecting a predefined response in the plurality of predefined responses (e.g., finger tap gesture 9120 on response 9110-1 in FIG. 9E or finger tap gesture 9210 on response 9110-4 in FIG. 9G).

The device detects (1512) a predefined user action to initiate sending the selected predefined response to the incoming message. In some embodiments, detecting selection of a predefined response 9110 also initiates sending of the predefined response, without detecting any further action by the user. In some embodiments, after detecting selection of a predefined response 9110, a further predefined user action is detected to initiate sending the response, such as detecting activation of the home button 204, detecting activation of a "send" button (not shown), or detecting a sliding finger gesture 2213, which appears to move the unlock image 302 across channel 306 (in which case the "slide to view" message in channel 306 may be changed to a "slide to send response" message or a similar message, FIG. 9E).

In response to detecting the predefined user action to initiate sending the selected predefined response to the incoming message, the device sends (1514) the selected predefined response to the incoming message. The selected predefined response comprises an emoji character in the plurality of emoji characters.

In some embodiments, in response to detecting the predefined user action to initiate sending the selected predefined response to the incoming message, the device returns (1516) the touch screen display to the power-conserving state. In some embodiments, the device returns (1518) the touch screen display to the power-conserving state within a predetermined time period (e.g., 5-15 seconds) after the selected predefined response to the incoming message is sent.

Figure 16:
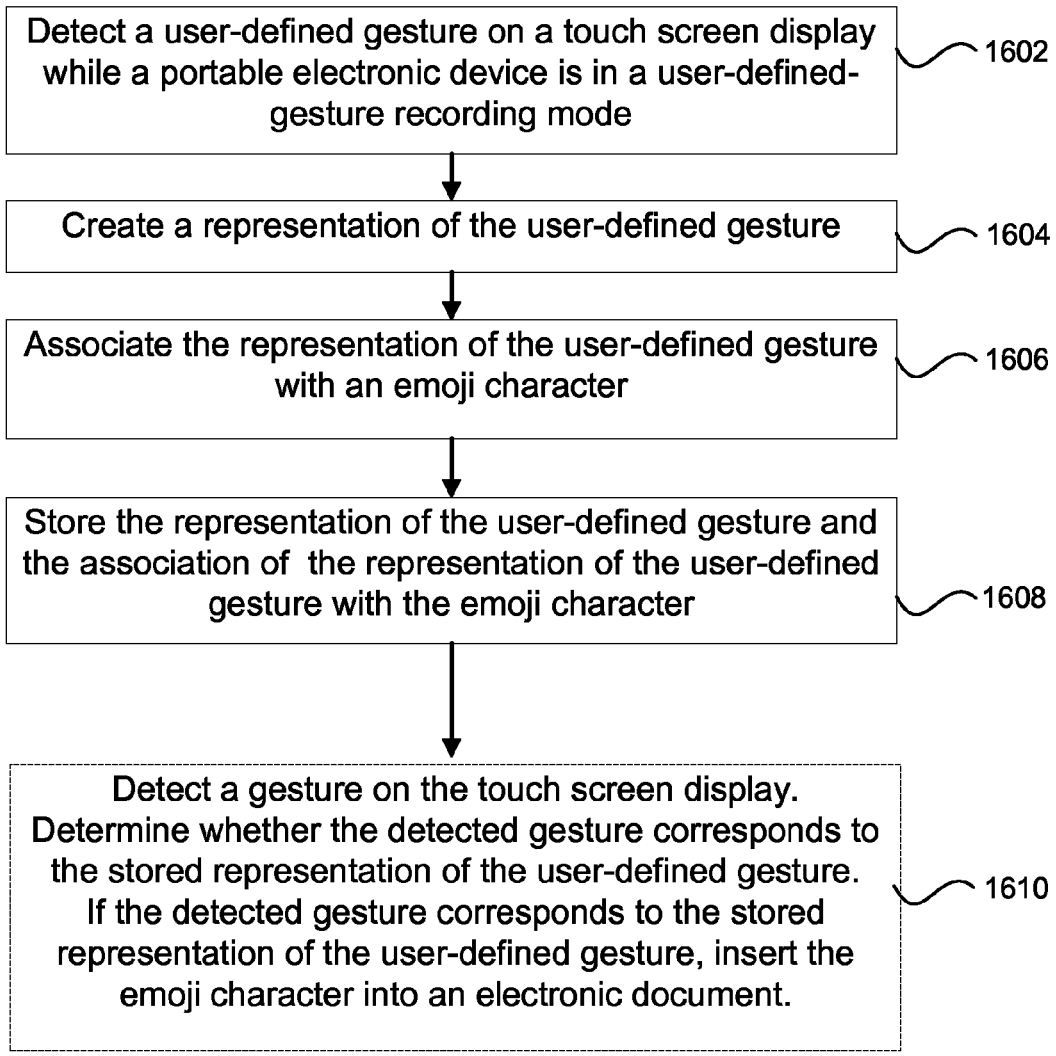
FIG. 16 is a flow diagram illustrating a method of assigning a user-defined gesture to an emoji on a portable electronic device equipped with a touch-sensitive display in accordance with some embodiments.

FIG. 16 is a flow diagram illustrating a method of assigning a user-defined gesture to an emoji on a portable electronic device 100 equipped with a touch-sensitive display 112 in accordance with some embodiments. The method 1600 provides a simple and intuitive way for a user to associate a user-defined gesture with an emoji character for later recall, thereby enabling users to enter emoji characters (e.g., the user's frequently used emoji characters) on the device without having to use emoji keyboards.

Figure 10A:
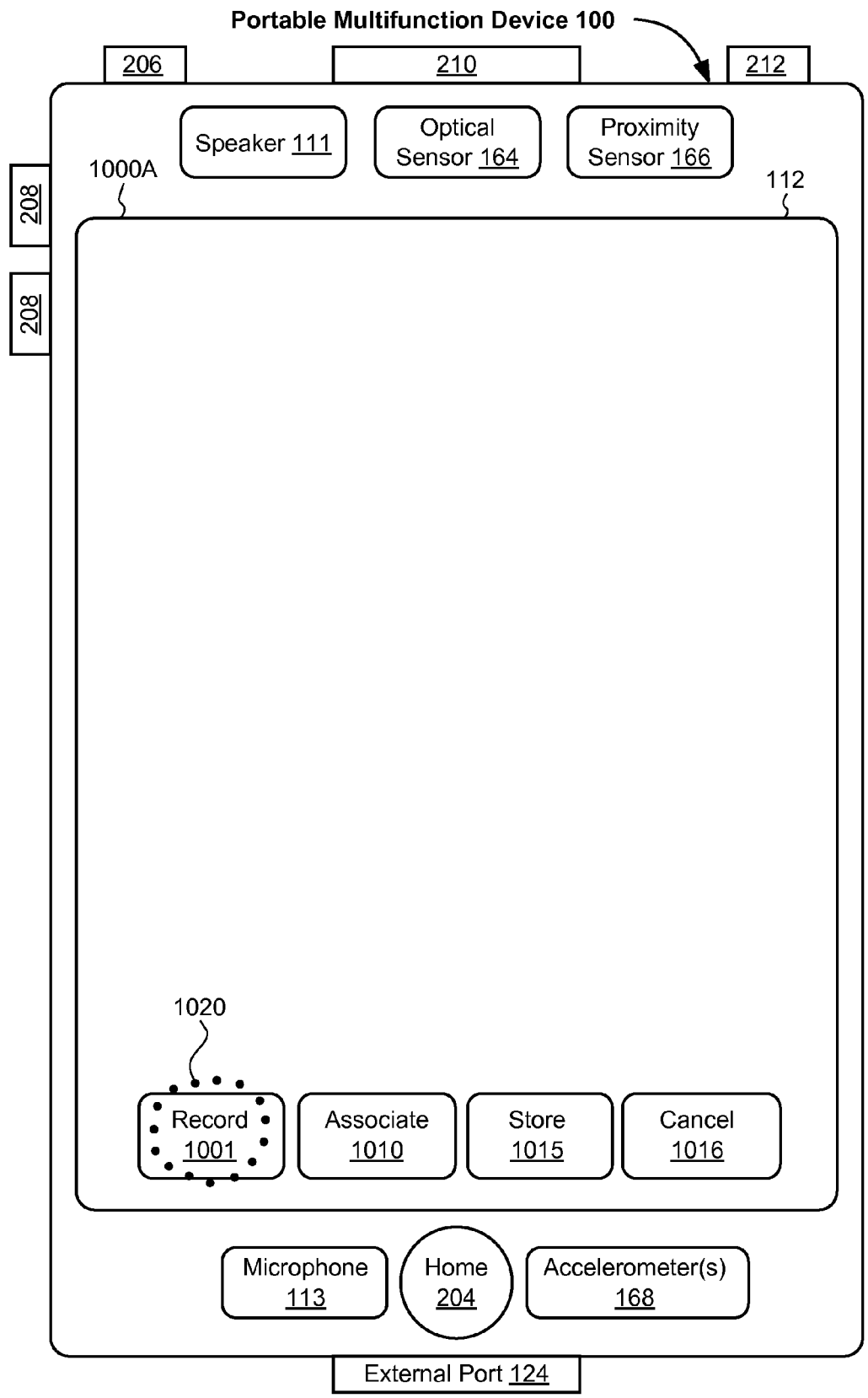
FIGS. 10A-10E illustrate exemplary user interfaces for assigning a user-defined gesture to an emoji character on a portable electronic device equipped with a touch-sensitive display in accordance with some embodiments.
Figure 10B:
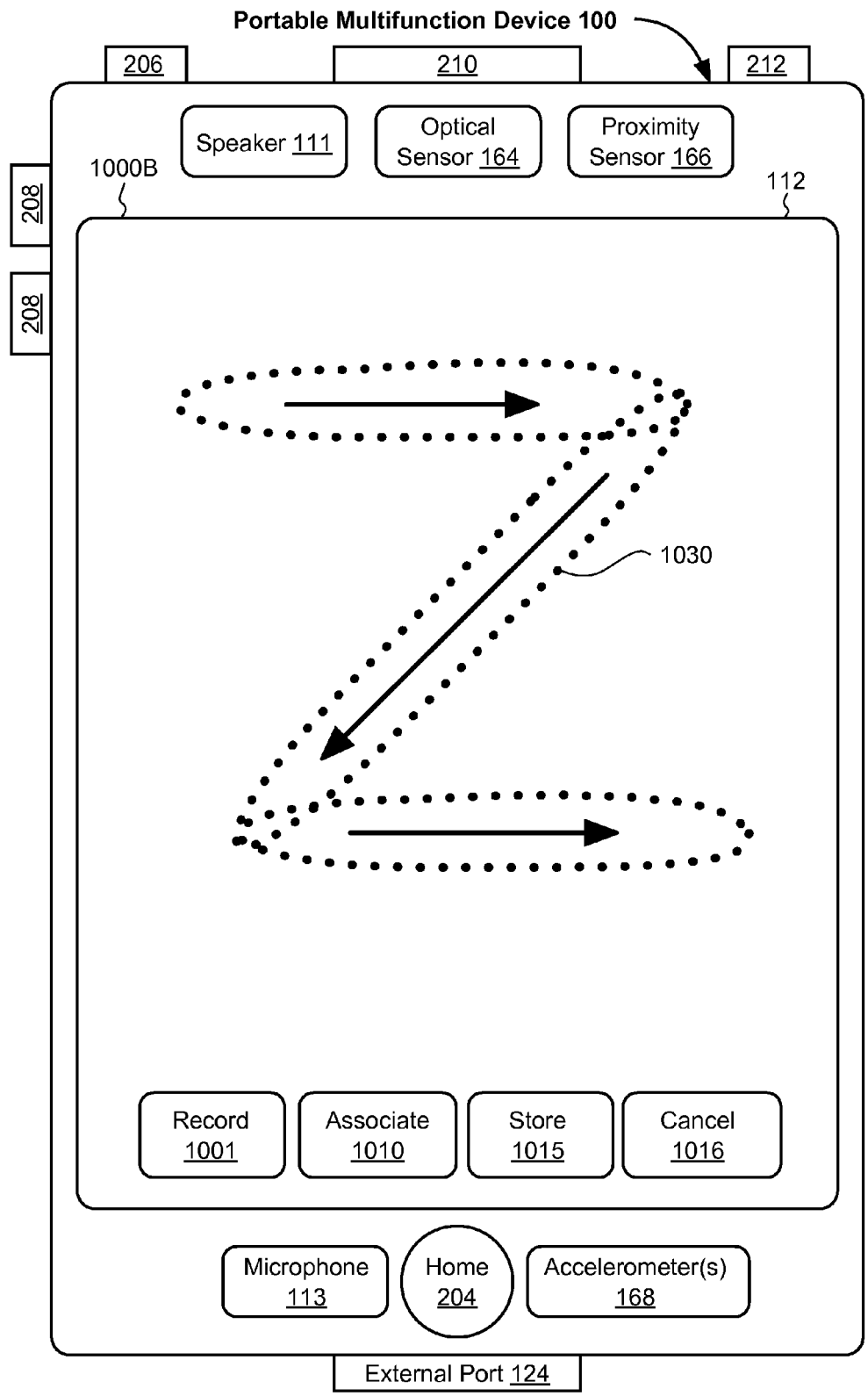
Figure 10C:
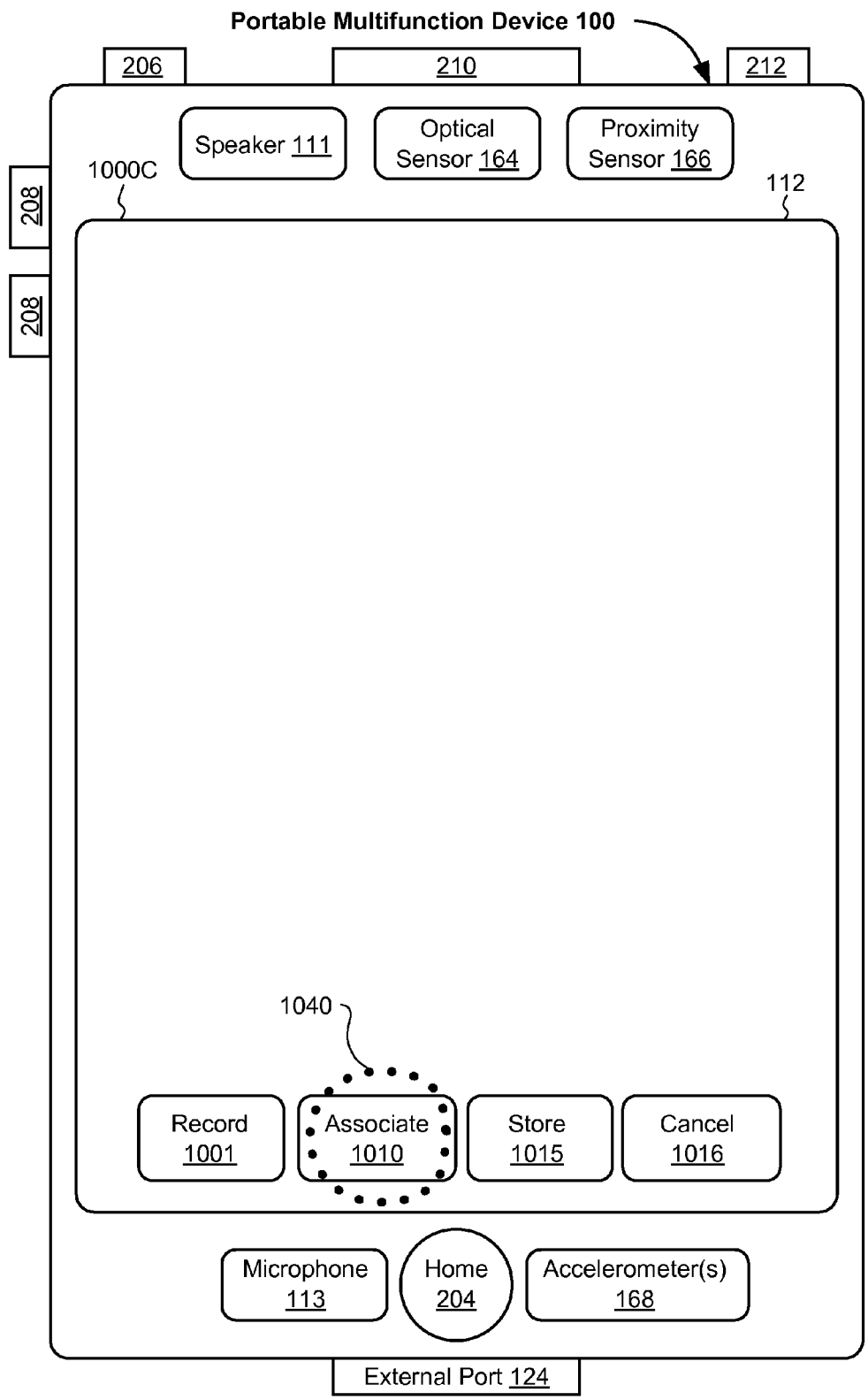
Figure 10D:
Figure 10E:
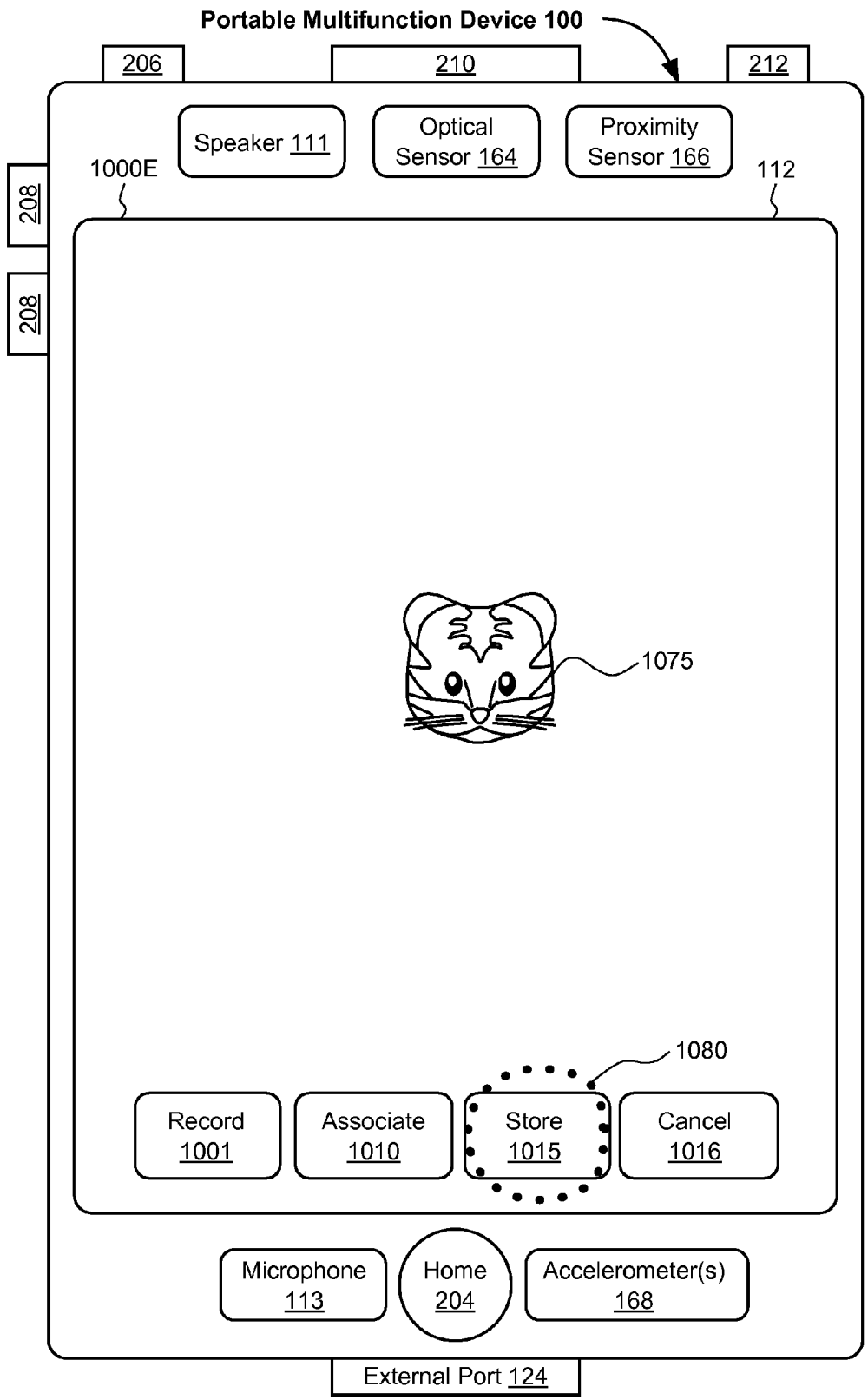

The device detects (1602) a user-defined gesture on the touch screen display while the portable electronic device is in a user-defined-gesture recording mode (e.g. gesture 1030, FIG. 10B). The device creates (1604) a representation of the user-defined gesture. The representation may include the absolute or relative positions of finger contacts in the gesture, and the relative or absolute movements of the finger contacts in the gesture. The device associates (1606) the representation of the user-defined gesture with an emoji character (e.g., as described above with respect to FIGS. 10C-10E). The device stores (1608) the representation of the user-defined gesture, as well as the association of the representation of the user-defined gesture with the emoji character.

In some embodiments, after storing the representation of the user-defined gesture and the association of the representation of the user-defined gesture with the emoji character, the device detects a gesture on the touch screen display, and determines whether the detected gesture corresponds to the stored representation of the user-defined gesture. If the detected gesture corresponds to the stored representation of the user-defined gesture, the device inserts the emoji character into an electronic message or document, such as an instant message (e.g., a text message) or an email message (1610).

Figure 17:
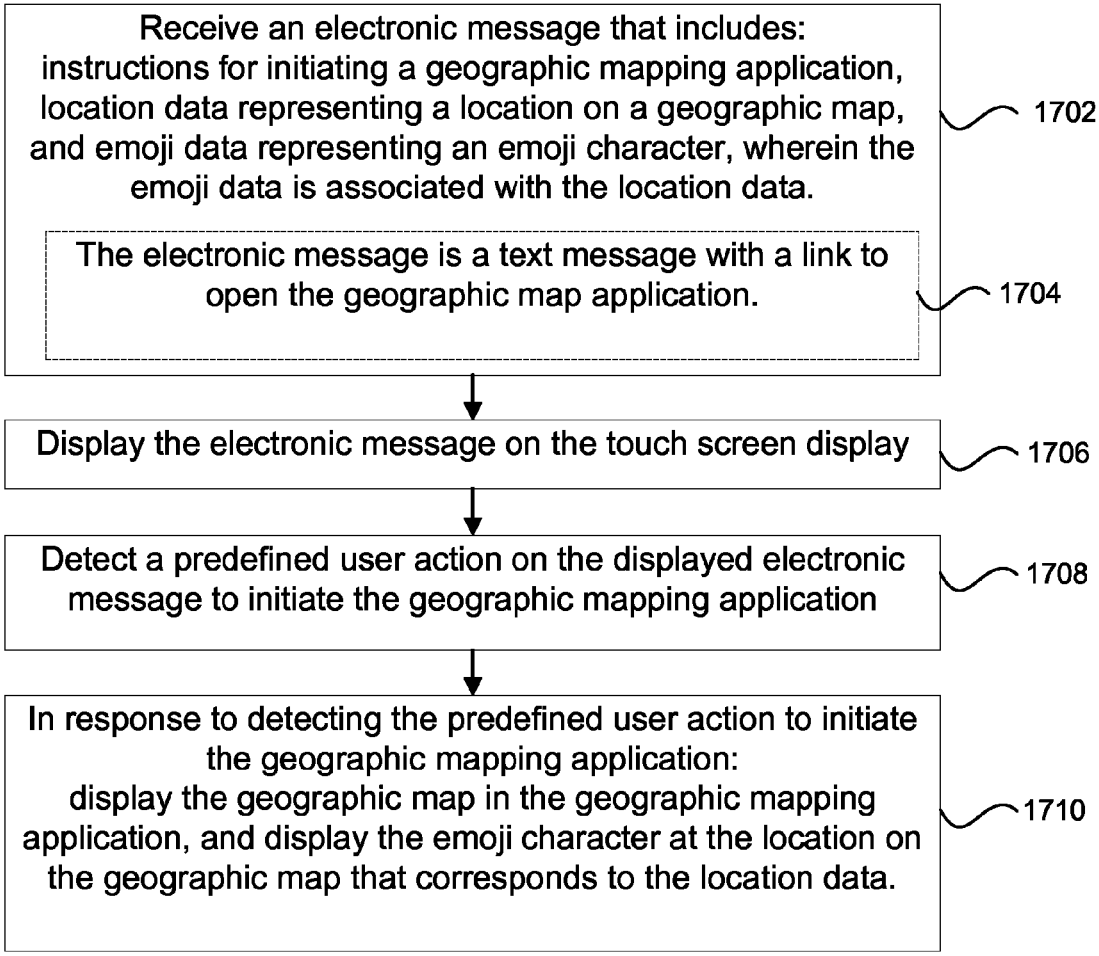
FIG. 17 is a flow diagram illustrating a method of using an emoji as a location indicator on a map via an electronic message in accordance with some embodiments.

FIG. 17 is a flow diagram illustrating a method of using an emoji as a location indicator on a map via an electronic message in accordance with some embodiments. The method 1700 is a fast and simple way to provide location data with emoji on a map that augments information in a corresponding electronic message.

The device (e.g., portable device 100 or a desktop computing device) receives (1702) an electronic message that includes: instructions for initiating or operable to initiate a geographic mapping application 154, location data representing a location on a geographic map, and emoji data representing an emoji character. The emoji data is associated with the location data (e.g., so that an emoji character that corresponds to the emoji data will be displayed on a map at a location that corresponds to the location data). In some embodiments, the electronic message is a text message with a link to open the geographic map application (1704).

The device displays (1706) the electronic message on the touch screen display (e.g., message 2216, FIG. 11A). The device detects (1708) a predefined user action on the displayed electronic message to initiate the geographic mapping application (e.g., tap gesture 1105 on the link 2220 to Lake Tahoe in message 2216, FIG. 11A). In response to detecting the predefined user action to initiate the geographic mapping application, the device displays (1710) the geographic map in the geographic mapping application 154 (e.g. map 1115, FIG. 11B), and displays the emoji character at the location on the geographic map that corresponds to the location data (e.g., emoji character 1120, FIG. 11B).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a portable electronic device with a touch screen display, while the portable electronic device is in a user-interface locked mode:
receiving an incoming message from a party to a user of the portable electronic device while the touch screen display is in a power-conserving state;
in response to receiving the incoming message:
powering up the touch screen display, and
displaying at least part of the incoming message from the party to the user on the touch screen display;
detecting one or more predefined finger gestures on the touch screen display, performed without using an emoji keyboard, that correspond to an emoji character;
detecting a predefined user action to initiate sending a response to the incoming message; and
in response to detecting the predefined user action to initiate sending the response to the incoming message, sending the response to the incoming message, wherein the response comprises the emoji character that corresponds to the one or more predefined finger gestures detected on the touch screen display.

2. The computer-implemented method of claim 1, including in response to detecting the predefined user action to initiate sending the response to the incoming message, returning the touch screen display to the power-conserving state.

3. The computer-implemented method of claim 1, including returning the touch screen display to the power-conserving state within a predetermined time period after the response to the incoming message is sent.

4. A portable electronic device, comprising:
a touch screen display;
one or more processors;
memory; and
one or more programs, wherein the one or more programs are stored in the memory and configured to be executed by the one or more processors, the one or more programs including instructions for, while the portable electronic device is in a user-interface locked mode:
receiving an incoming message from a party to a user of the portable electronic device while the touch screen display is in a power-conserving state;
in response to receiving the incoming message:
powering up the touch screen display, and
displaying at least part of the incoming message from the party to the user on the touch screen display;
detecting one or more predefined finger gestures on the touch screen display, performed without using an emoji keyboard, that correspond to an emoji character;
detecting a predefined user action to initiate sending a response to the incoming message; and
in response to detecting the predefined user action to initiate sending the response to the incoming message, sending the response to the incoming message, wherein the response comprises the emoji character that corresponds to the one or more predefined finger gestures detected on the touch screen display.

5. The portable electronic device of claim 4, including instructions for, in response to detecting the predefined user action to initiate sending the response to the incoming message, returning the touch screen display to the power-conserving state.

6. A non-transitory computer readable storage medium having stored therein instructions, which when executed by a portable electronic device with a touch screen display, cause the device to, while the portable electronic device is in a user-interface locked mode:
    receive an incoming message from a party to a user of the portable electronic device while the touch screen display is in a power-conserving state;
    in response to receiving the incoming message:
        power up the touch screen display, and
        display at least part of the incoming message from the party to the user on the touch screen display;
    detect one or more predefined finger gestures on the touch screen display, performed without using an emoji keyboard, that correspond to an emoji character;
    detect a predefined user action to initiate sending a response to the incoming message; and
    in response to detecting the predefined user action to initiate sending the response to the incoming message, send the response to the incoming message, wherein the response comprises the emoji character that corresponds to the one or more predefined finger gestures detected on the touch screen display.

7. The computer readable storage medium of claim 6, including instructions that cause the portable electronic device to return the touch screen display to the power-conserving state within a predetermined time period after the response to the incoming message is sent.

8. A computer-implemented method, comprising:
at a portable electronic device with a touch screen display, while the portable electronic device is in a user-interface locked mode:
    receiving an incoming message from a party to a user of the portable electronic device while the touch screen display is in a power-conserving state;
    in response to receiving the incoming message:
        immediately powering up the touch screen display,
        immediately displaying at least part of the incoming message from the party to the user on the touch screen display, and
        immediately displaying a plurality of predefined responses to the incoming message, wherein the predefined responses include a plurality of emoji characters;
    detecting a predefined user action for selecting a predefined response in the plurality of predefined responses;
    detecting a predefined user action to initiate sending the selected predefined response to the incoming message; and
    in response to detecting the predefined user action to initiate sending the selected predefined response to the incoming message, sending the selected predefined response to the incoming message, wherein the selected predefined response comprises an emoji character in the plurality of emoji characters.

9. The computer-implemented method of claim 8, including in response to detecting the predefined user action to initiate sending the selected predefined response to the incoming message, returning the touch screen display to the power-conserving state.

10. The computer-implemented method of claim 8, including returning the touch screen display to the power-conserving state within a predetermined time period after the selected predefined response to the incoming message is sent.

11. A portable electronic device, comprising:
a touch screen display;
one or more processors;
memory; and
one or more programs, wherein the one or more programs are stored in the memory and configured to be executed by the one or more processors, the one or more programs including instructions for, while the portable electronic device is in a user-interface locked mode:
    receiving an incoming message from a party to a user of the portable electronic device while the touch screen display is in a power-conserving state;
    in response to receiving the incoming message:
        immediately powering up the touch screen display,
        immediately displaying at least part of the incoming message from the party to the user on the touch screen display, and
        immediately displaying a plurality of predefined responses to the incoming message, wherein the predefined responses include a plurality of emoji characters;
    detecting a predefined user action for selecting a predefined response in the plurality of predefined responses;
    detecting a predefined user action to initiate sending the selected predefined response to the incoming message; and
    in response to detecting the predefined user action to initiate sending the selected predefined response to the incoming message, sending the selected predefined response to the incoming message, wherein the selected predefined response comprises an emoji character in the plurality of emoji characters.

12. The portable electronic device of claim 11, including instructions for, in response to detecting the predefined user action to initiate sending the selected predefined response to the incoming message, returning the touch screen display to the power-conserving state.

13. A non-transitory computer readable storage medium having stored therein instructions, which when executed by a portable electronic device with a touch screen display, cause the device to, while the portable electronic device is in a user-interface locked mode:
    receive an incoming message from a party to a user of the portable electronic device while the touch screen display is in a power-conserving state;
    in response to receiving the incoming message:
        immediately power up the touch screen display,
        immediately display at least part of the incoming message from the party to the user on the touch screen display, and
        immediately display a plurality of predefined responses to the incoming message, wherein the predefined responses include a plurality of emoji characters;
    detect a predefined user action for selecting a predefined response in the plurality of predefined responses;
    detect a predefined user action to initiate sending the selected predefined response to the incoming message; and
    in response to detecting the predefined user action to initiate sending the selected predefined response to the incoming message, send the selected predefined response to the incoming message, wherein the selected predefined response comprises an emoji character in the plurality of emoji characters.

14. The computer readable storage medium of claim 13, including instructions that cause the portable electronic device to return the touch screen display to the power-conserving state within a predetermined time period after the selected predefined response to the incoming message is sent.

\* \* \* \* \*